United States Patent
Yoshizawa et al.

(10) Patent No.: US 7,715,042 B2
(45) Date of Patent: May 11, 2010

(54) COLOR SEPARATION INTO A PLURALITY OF INK COMPONENTS INCLUDING PRIMARY COLOR INK AND SPOT COLOR INK

(75) Inventors: Koichi Yoshizawa, Nagano-ken (JP); Yuko Yamamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1829 days.

(21) Appl. No.: 10/773,087

(22) Filed: Feb. 4, 2004

(65) Prior Publication Data

US 2004/0223172 A1    Nov. 11, 2004

(30) Foreign Application Priority Data

Feb. 6, 2003   (JP)   ............................. 2003-029900
Apr. 17, 2003  (JP)   ............................. 2003-112999

(51) Int. Cl.
*G06K 15/10*   (2006.01)
*G06F 3/12*    (2006.01)

(52) U.S. Cl. ......................................... 358/1.8; 358/1.1

(58) Field of Classification Search ...................... None
See application file for complete search history.

(56) References Cited

U.S. PATENT DOCUMENTS 5,502,579 A * 3/1996 Kita et al. ................... 358/518

7,251,058 B2 * 7/2007 Pop ............................ 358/1.9

FOREIGN PATENT DOCUMENTS

| JP | 08-085219   | 4/1996  |
| JP | 10-191089   | 7/1998  |
| JP | 2001-069361 | 3/2001  |
| JP | 2001-232860 | 8/2001  |
| JP | 2001-354886 | 12/2001 |
| JP | 2002-154239 | 5/2002  |
| JP | 2002-335413 | 11/2002 |

OTHER PUBLICATIONS

Abstract of Japanese Patent Publication No. 2001-354886, Pub. Date: Dec. 25, 2001, Patent Abstracts of Japan.

(Continued)

*Primary Examiner*—Twyler L Haskins
*Assistant Examiner*—Marcus T Riley
(74) *Attorney, Agent, or Firm*—Martine Penilla & Gencarella, LLP

(57) ABSTRACT

Utilizing an ink set that includes a plurality of chromatic primary color inks that, when used in combination, can reproduce achromatic color, and at least one spot color ink of hue different from any of the plurality of chromatic primary color inks. Color to be reproduced on a print medium according to any one input color is termed "reproduction color", and the combination of ink quantities in the ink set for reproducing the reproduction color on the print medium is termed the "color separation ink quantity set." The ink quantity of the spot color ink included in the color separation ink quantity set is adjusted in accordance with a lightness parameter value which is correlated to lightness of reproduction color, so as to reduce ink quantity at a rate of change greater than the rate of change of the lightness parameter in the direction of increasing brightness.

15 Claims, 32 Drawing Sheets

OTHER PUBLICATIONS

Abstract of Japanese Patent Publication No. 2002-335413, Pub. Date: Nov. 22, 2002, Patent Abstracts of Japan.
Abstract of Japanese Patent Publication No. 08-085219, Pub. Date: Apr. 2, 1996, Patent Abstracts of Japan.
Abstract of Japanese Patent Publication No. 2001-232860, Pub. Date: Aug. 28, 2001, Patent Abstracts of Japan.
Abstract of Japanese Patent Publication No. 10-191089, Pub. Date: Jul. 21, 1998, Patent Abstracts of Japan.
Abstract of Japanese Patent Publication No. 2001-069361, Pub. Date: Mar. 16, 2001, Patent Abstracts of Japan.
Abstract of Japanese Patent Publication No. 2002-154239, Pub. Date: May 28, 2002, Patent Abstracts of Japan.

* cited by examiner

Fig.5(a)

| Colorant | Ink | Y | M | C | R | V | K |
|---|---|---|---|---|---|---|---|
| Colorant | Type (C.I.) | PY128 | PR122 | PB15:3 | PO43 | PV23 | PBk7 |
| Colorant | Density | 2.0 | 2.0 | 1.5 | 2.0 | 2.0 | 2.0 |
| Dispersant | | 1.0 | 1.0 | 1.0 | 1.0 | 1.0 | 1.0 |
| Glycerin | | 15.0 | 15.0 | 15.0 | 15.0 | 15.0 | 15.0 |
| Ethylene glycol | | 5.0 | 5.0 | 5.0 | 5.0 | 5.0 | 5.0 |
| 2-pyrrolidone | | 2.0 | 2.0 | 2.0 | 2.0 | 2.0 | 2.0 |
| 1,2-hexanediol | | 5.0 | 5.0 | 5.0 | 5.0 | 5.0 | 5.0 |
| SURFYNOL E1010 | | 0.5 | 0.5 | 0.5 | 0.5 | 0.5 | 0.5 |
| Ion exchange water | | q.v. | q.v. | q.v. | q.v. | q.v. | q.v. |

(wt%)

Dispersant: styrene/acrylic acid copolymer

PY: Pigment Yellow
PR: Pigment Red
PB: Pigment Blue
PO: Pigment Orange
PV: Pigment Violet
PBk: Pigment Black

Fig.5(b)

| R | wCR | wMR | wYR | CMY Total |
|---|---|---|---|---|
| 1.0 | 0.0 | 0.71 | 2.86 | 3.57 |

Fig.5(c)

| V | wCV | wMV | wYV | CMY Total |
|---|---|---|---|---|
| 1.0 | 0.68 | 2.89 | 0.0 | 3.57 |

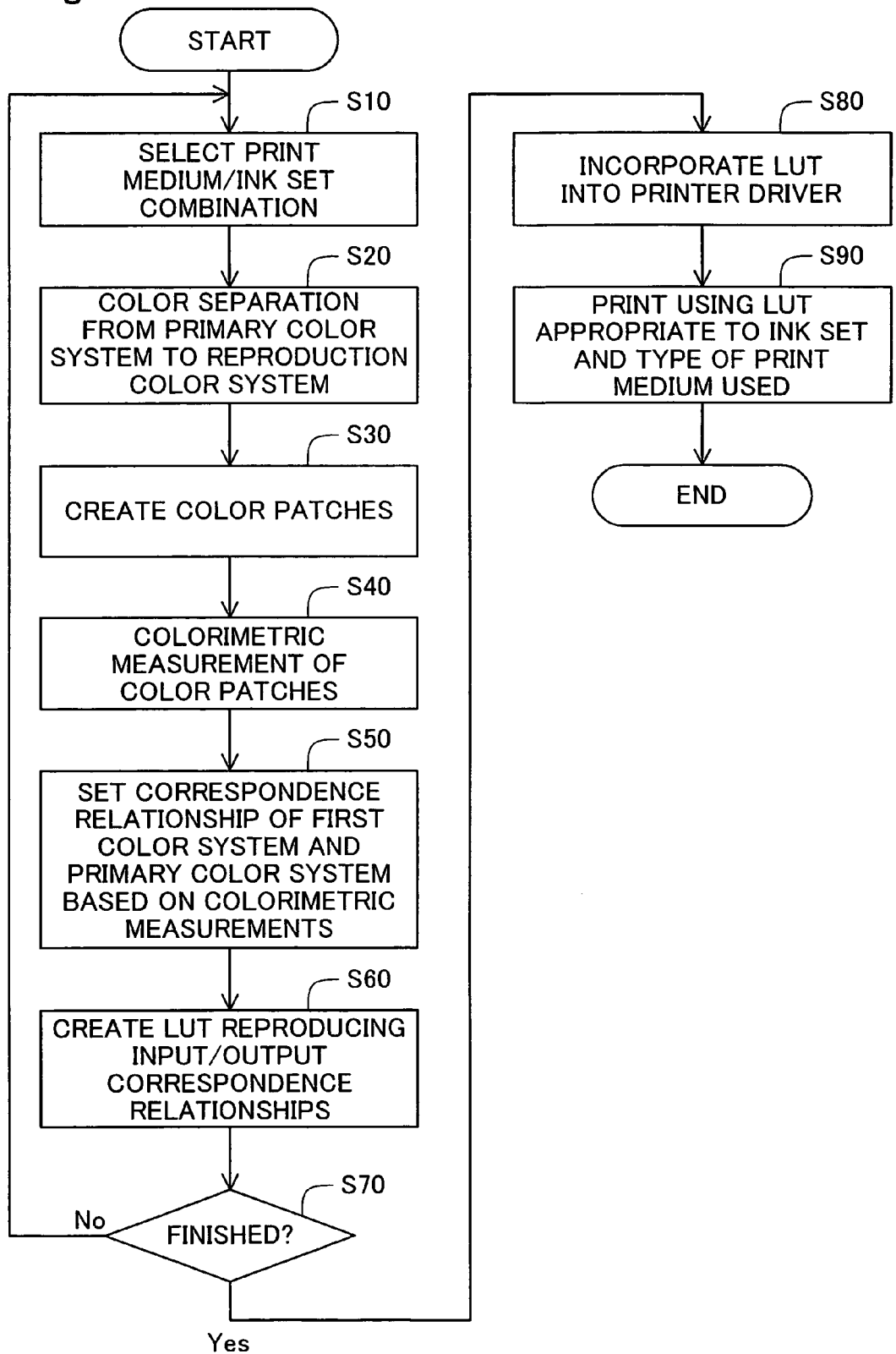

$$k = \frac{Rtmp}{Rmax}$$

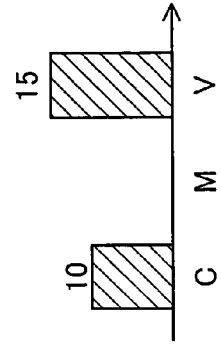
Fig.25(d) Ink quantities for reproducing color ColB (V ink max.: 100% usage rate)
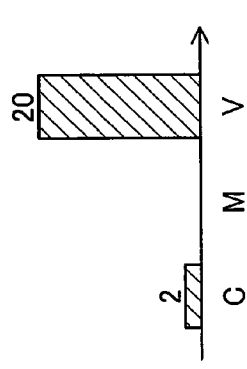
Fig.25(e) Ink quantities for reproducing color ColB (graininess improvement: 67% usage rate)
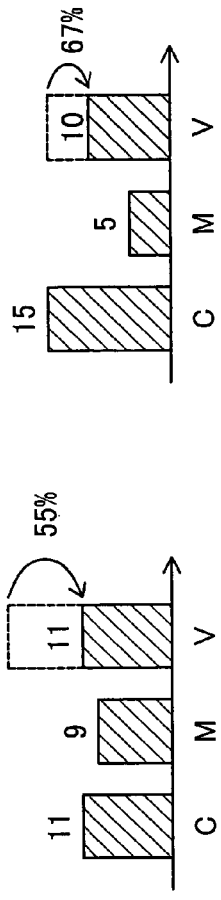
Fig.25(b) Ink quantities for reproducing color ColA (V ink max.: 100% usage rate)
Fig.25(c) Ink quantities for reproducing color ColA (graininess improvement: 55% usage rate)
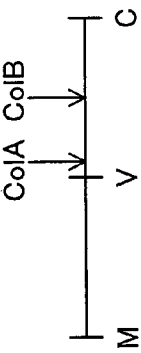
Fig.25(a)

$$k = \frac{Rtmp}{Rmax}$$

Fig.30(a)

| Ink | | Y | M | C | R | V |
|---|---|---|---|---|---|---|
| Colorant | Type (C.I.) | PY128 | PR122 | PB15:3 | PR178 | PB60 |
| | Density | 2.0 | 2.0 | 1.5 | 2.0 | 4.0 |

| R | wCR | wMR | wYR | CMY Total |
|---|---|---|---|---|
| 1.0 | 0.0 | 1.58 | 1.05 | 2.63 |

Fig.30(c)

| V | wCV | wMV | wYV | CMY Total |
|---|---|---|---|---|
| 1.0 | 1.25 | 0.83 | 0.0 | 2.08 |

Fig.31(a)

| Ink | | Y | M | C | R | V |
|---|---|---|---|---|---|---|
| Colorant | Type (C.I.) | PY74 | PR122 | PB15:3 | PO43 | PV23 |
| | Density | 4.0 | 4.0 | 5.0 | 2.0 | 2.0 |

| R | wCR | wMR | wYR | CMY Total |
|---|---|---|---|---|
| 1.0 | 0.0 | 0.44 | 1.38 | 1.82 |

Fig.31(c)

| V | wCV | wMV | wYV | CMY Total |
|---|---|---|---|---|
| 1.0 | 1.28 | 4.28 | 0.0 | 5.56 |

Fig.32(a)

| Ink | | Y | M | C | R | V |
|---|---|---|---|---|---|---|
| Colorant | Type (C.I.) | PY74 | PR122 | PB15:3 | PR178 | PB60 |
| | Density | 4.0 | 4.0 | 5.0 | 2.0 | 4.0 |

| R | wCR | wMR | wYR | CMY Total |
|---|---|---|---|---|
| 1.0 | 0.0 | 1.31 | 0.41 | 1.72 |

Fig.32(c)

| V | wCV | wMV | wYV | CMY Total |
|---|---|---|---|---|
| 1.0 | 2.20 | 0.30 | 0.0 | 2.50 |

Fig.33(a)

| Ink | | Y | M | C | R | V |
|---|---|---|---|---|---|---|
| Colorant | Type (C.I.) | PY128 | PR122 | PB15:3 | PO43 | PV23 |
| | Density | 4.0 | 3.0 | 2.0 | 2.0 | 2.0 |

| R | wCR | wMR | wYR | CMY Total |
|---|---|---|---|---|
| 1.0 | 0.0 | 0.81 | 1.89 | 2.70 |

Fig.33(c)

| V | wCV | wMV | wYV | CMY Total |
|---|---|---|---|---|
| 1.0 | 0.70 | 2.24 | 0.0 | 2.94 |

Fig.34(a)

| Ink | | Y | M | C | R | V |
|---|---|---|---|---|---|---|
| Colorant | Type (C.I.) | PY128 | PR122 | PB15:3 | PR178 | PB60 |
| | Density | 4.0 | 3.0 | 2.0 | 2.0 | 4.0 |

| R | wCR | wMR | wYR | CMY Total |
|---|---|---|---|---|
| 1.0 | 0.0 | 1.26 | 0.62 | 1.88 |

Fig.34(c)

| V | wCV | wMV | wYV | CMY Total |
|---|---|---|---|---|
| 1.0 | 1.33 | 0.70 | 0.0 | 2.03 |

Fig.35(a)

| Ink | | Y | M | C | R | V |
|---|---|---|---|---|---|---|
| Colorant | Type (C.I.) | PY128 | PR122 | PB15:3 | PR178 | PV23 |
| | Density | 2.0 | 2.0 | 1.5 | 2.0 | 2.0 |

| R | wCR | wMR | wYR | CMY Total |
|---|---|---|---|---|
| 1.0 | 0.0 | 1.58 | 1.05 | 2.63 |

Fig.35(c)

| V | wCV | wMV | wYV | CMY Total |
|---|---|---|---|---|
| 1.0 | 0.68 | 2.89 | 0.0 | 3.57 |

Fig.36

| Ink | | Y | M | C | R | V |
|---|---|---|---|---|---|---|
| Colorant | Type (C.I.) | PY74 | PR202 | PB15:3 | PR178 | PV23 |
| | Density | 3.0 | 1.5 | 1.5 | 2.0 | 2.0 |

| Ink | | Y | M | C | R | V |
|---|---|---|---|---|---|---|
| Colorant | Type (C.I.) | PY74 | PV19 | PB15:3 | PR177 | PV23 |
| | Density | 3.0 | 2.0 | 1.5 | 2.5 | 2.0 |

(wt%)

COLOR SEPARATION INTO A PLURALITY OF INK COMPONENTS INCLUDING PRIMARY COLOR INK AND SPOT COLOR INK

BACKGROUND OF THE INVENTION

1. Field of the Invention

This invention relates to a color printing technique employing a plurality of inks.

2. Description of the Related Art

In recent years, color ink jet printers have come to enjoy widespread use as image output devices. A typical color ink jet printer employs, in addition to black (K) ink, several kinds of ink of the hues cyan C, magenta M, and yellow Y. Any color in a color image can be reproduced using these several kinds of ink.

In a printer of this kind, ink amounts of each useable ink are determined according to an arbitrary color of the color image. Herein, the process of determining ink amount of each ink used in printing for color reproduction in this manner will be referred to as a "color separation process" or "ink color separation process." Relationships among color data of a color image and ink amounts of each color are pre-stored in a color conversion look up table (LUT); during printing, ink amounts of each color at each pixel position are determined with reference to the LUT (see, for example, JP10-191089A).

Color reproduction by a particular printer is determined by the particular types of ink useable by the printer. Typically, any color can be reproduced by combining three chromatic primary color inks (e.g., cyan C, magenta M, and yellow Y). In some instances, spot color inks of different hues from these chromatic primary colors ink are used. "Spot color" refers to a color that can be separated into two chromatic primary colors. Where spot color inks are used, the range of color reproduction can be expanded. However, to date, in instances where use of such chromatic primary color inks and spot color inks is possible, no feature has been devised whereby color separation may be performed in consideration of image graininess caused by spot color ink dots, or in consideration of graininess and ink savings.

SUMMARY OF THE INVENTION

It is therefore an object of the present invention to perform color separation in consideration of image graininess caused by spot color ink dots when use of chromatic primary color inks and spot color inks is possible.

The invention in a first aspect thereof provides a color separation method for determining ink quantity of each ink, in order to reproduce any color using a plurality of color inks on a printing medium. This method comprises the steps of (a) defining an ink set that includes as useable inks a plurality of chromatic primary color inks that, when used in combination, can reproduce achromatic color, and at least one spot color ink of hue different from any of the plurality of chromatic primary color inks; (b) where color reproduced on the print medium according to any one input color is termed "reproduction color", the combination of ink quantities in the ink set for reproducing the reproduction color on the print medium is termed the "color separation ink quantity set", and the color space representing ink quantities of the plurality of chromatic primary color inks as a base vector is termed the "chromatic primary color space", determining a plurality of reproduction colors to be reproduced on the print medium according to a plurality of input colors in the chromatic primary color space; and (c) determining a plurality of color separation ink quantity sets for reproducing the plurality of reproduction colors. The step (c) includes executing, for each reproduction color, the steps of (c1) calculating a lightness parameter correlated to lightness of the reproduction color; and (c2) adjusting the ink quantity of the spot color ink included in the color separation ink quantity set in accordance with the lightness parameter so that ink quantity decreases at a rate of change greater than the rate of change of the lightness parameter in the direction of increasing lightness.

According to this method, ink quantity of the spot color ink is adjusted so as to be reduced at a rate of change greater than the rate of change of the lightness parameter, whereby standing out of the spot color ink in lighter areas can be reduced, and graininess in the image improved.

The invention in a second aspect thereof provides a color separation method for determining ink quantity of each ink, in order to reproduce any color using a plurality of color inks on a printing medium. This method comprises the steps of (a) defining an ink set that includes as useable inks a plurality of chromatic primary color inks that, when used in combination, can reproduce achromatic color, and at least one spot color ink of hue different from any of the plurality of chromatic primary color inks; (b) where color reproduced on the print medium according to any one input color is termed "reproduction color", the combination of ink quantities in the ink set for reproducing the reproduction color on the print medium is termed the "color separation ink quantity set", and the color space representing ink quantities of the plurality of chromatic primary color inks as a base vector is termed the "chromatic primary color space", determining a plurality of reproduction colors to be reproduced on the print medium according to a plurality of input colors in the chromatic primary color space; and (c) determining a plurality of color separation ink quantity sets for reproducing the plurality of reproduction colors. The proportion of actual ink quantity of the spot color ink to the maximum ink quantity of the spot color ink determined according to the reproduction color is termed "spot color ink usage rate." When the hue of the reproduction color is reproduced by means of a combination of one chromatic primary color ink and one spot color ink, the one chromatic primary color ink is termed the "primary color component ink", and the one spot color ink is termed the "spot color component ink." The step (c) includes executing, for each reproduction color, the steps of: (c1) calculating a lightness parameter value correlated to lightness of the reproduction color; and (c2) providing first and second reproduction colors, the first and second reproduction colors having a lightness parameter value within a first high lightness range including a brightest portion of the lightness parameter value, the first and second reproduction colors having a same primary color component ink, a same spot color component ink, and a same lightness parameter value, the first reproduction color having hue relatively close to that of the primary color component ink, the second reproduction color having hue relatively close to that of the spot color component ink; and determining ink quantity of the spot color ink included in the color separation ink quantity set so that a usage rate of the spot color ink for the second reproduction color is smaller than a usage rate of the spot color ink for the first reproduction color.

According to this method, in bright image areas, the ink quantity of spot color ink is determined in such a way that the usage rate of spot color ink in areas of hue relatively close to the spot color ink is smaller than the usage rate of spot color ink in areas of hue relatively close to the chromatic primary color ink. Accordingly, in areas of hue relatively close to the spot color ink, the usage rate of spot color ink is lower, whereby standing out of the spot color ink in lighter areas can be reduced, and graininess in the image improved. In areas of hue relatively close to the chromatic primary color ink, the usage rate of spot color ink is higher, and ink quantities of the plurality of chromatic primary color inks are smaller, providing savings in the amounts of ink used.

The present invention may take any of a number of different embodiments, for example, an image data conversion method and device, printing method and printing device, or color conversion lookup table creation method and device employing the color separation method; a computer program for realizing the functions of such methods or devices; a storage medium having such a computer program recorded thereon; a data signal containing such a computer program and embodied in a carrier wave, or the like.

These another other objects, features, aspects, and advantages of the invention will be understood from the following description of the preferred embodiments with reference to the accompanying drawings.

BRIEF DESCRIPTION OF THE DRAWINGS

FIGS. 5(a)-5(c) depict ink sets.
FIG. 6 is a flowchart depicting the color reproduction processing routine.
FIGS. 25(a)-25(e) illustrate relationships between spot color ink usage rate and ink quantities of other inks.

FIGS. 30(a)-30(c) illustrate another example of ink components.
FIGS. 31(a)-31(c) illustrate another example of ink components.
FIGS. 32(a)-32(c) illustrate another example of ink components.
FIGS. 33(a)-33(c) illustrate another example of ink components.
FIGS. 34(a)-34(c) illustrate another example of ink components.
FIGS. 35(a)-35(c) illustrate another example of ink components.
FIG. 36 illustrates another example of ink components.
FIG. 37 illustrates another example of ink components.

DESCRIPTION OF THE PREFERRED EMBODIMENTS

The embodiments of the invention are described hereinbelow, in the following order.

A. Device Arrangement

B. Method for Creating Color Conversion Lookup Table

C. Embodiment 1
  C1. Example 1 of Color Separation Process in Embodiment 1
  C2. Example 2 of Color Separation Process in Embodiment 1
  C3. Examples 1-3 of Final Color Separation Ink Quantity Calculation Process in Embodiment 1
  C4. Example 3 of Color Separation Process in Embodiment 1

D. Embodiment 2
  D1. Example 1 of Color Separation Process in Embodiment 2
  D2. Examples 1-3 of Final Color Separation Ink Quantity Calculation Process in Embodiment 2
  D3. Other Example of Color Separation Process in Embodiment 2

E. Ink Set Variations

F. Variations

A. Device Arrangement

Figure 1:
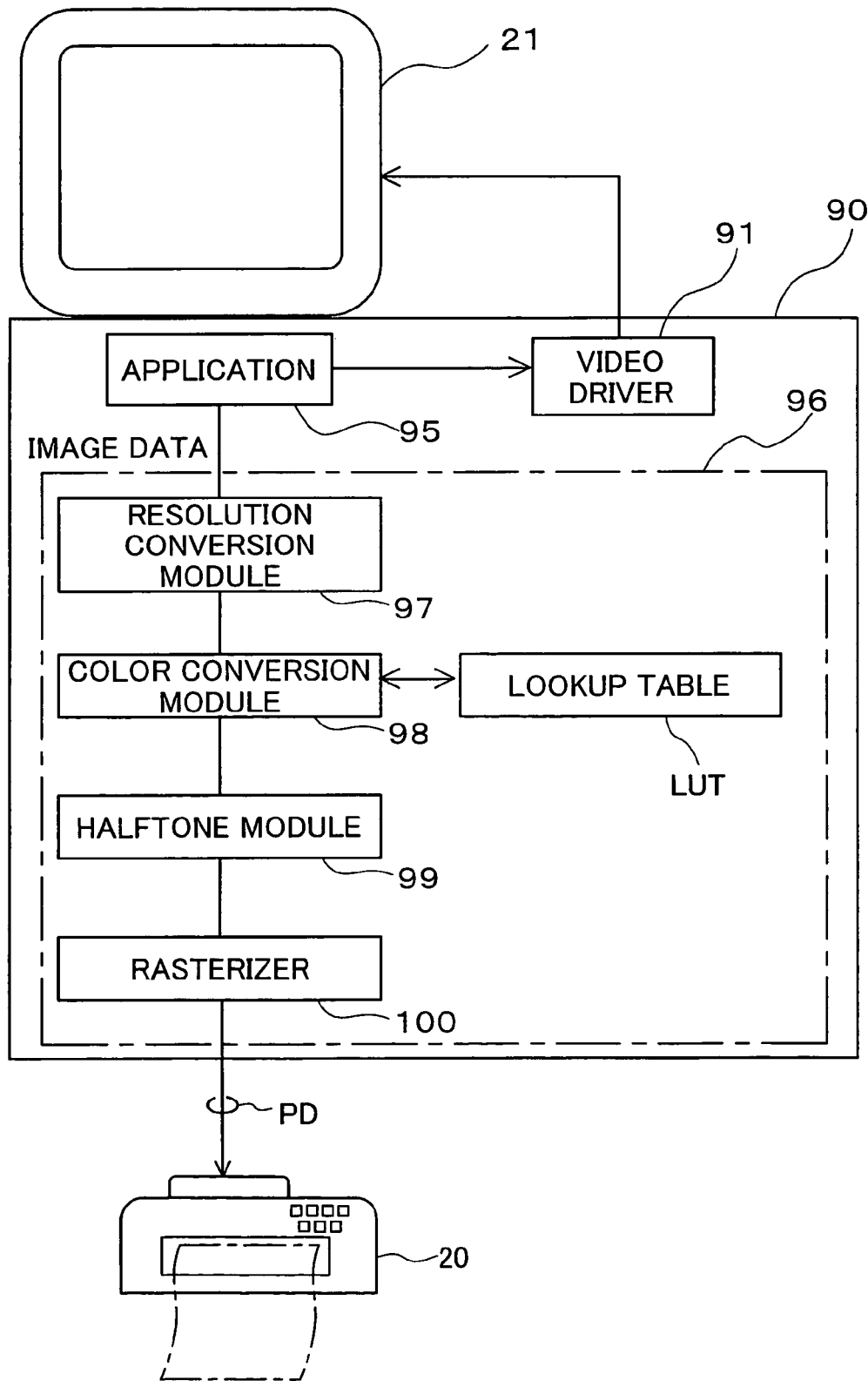
FIG. 1 is a block diagram of a printing system arrangement.

FIG. 1 is a block diagram showing the arrangement of a printing system in a first embodiment of the invention. This printing system comprises a computer 90 as a image data processing device, and a color printer 20 as a printer portion. Computer 90 and color printer 20 can together be termed a "printing device", in a broader sense.

On computer 90, an application program 95 runs on a predetermined operating system. This operating system includes inter alia a video driver 91, and a printer driver 96; the application program 95 sends print data PD to printer 20 via these drivers. Application program 95, which performs functions such as image retouching, also performs desired processing of images to be processed, as well as displaying images on a CRT 21 via the video driver 91.

When the application program 95 issues a print command, the printer driver 96 of computer 90 receives image data from the application program 95, and converts this into print data PD to be supplied to the printer 20. In the example shown in FIG. 1, printer driver 96 includes a resolution conversion module 97, a color conversion module 98, a halftone module 99, a rasterizer 100, and a color conversion lookup table LUT.

Resolution conversion module 97 has the function of converting the resolution (i.e. the number of pixels per unit of distance) of color image data produced by the application program 95 into print resolution. The resolution-converted image data is information for an image still composed of three color components RGB. Color conversion module 98, while making reference to the color conversion lookup table LUT, converts the RGB image data (input color image data) for each pixel into multitone data (second color image data) of a plurality of ink colors utilizable by the printer 20.

The color-converted multitone data has gray level value for 256 tones, for example. Halftone module 99 executes a so-called "halftone" process to generate halftone image data. The halftone image data is arranged by rasterizer 100 in the order in which the data will be sent to the printer 20, for output as final print data PD. Print data PD includes raster data that indicates dot recording status during each main scan, and data that indicates sub scan feed distance.

The printer driver 96 corresponds to a program for performing the function of generating print data PD. The program for performing the function of printer driver 96 is provided recorded in computer-readable form on a recording medium. Typical recording media include flexible disks; CD-ROM; magnetooptical disks; IC cards; ROM cartridges; punch cards; printed matter imprinted with symbols such as bar codes; computer internal storage devices (e.g. RAM, ROM or other type of memory) and external storage devices; and other such computer-readable storage media.

Figure 2:
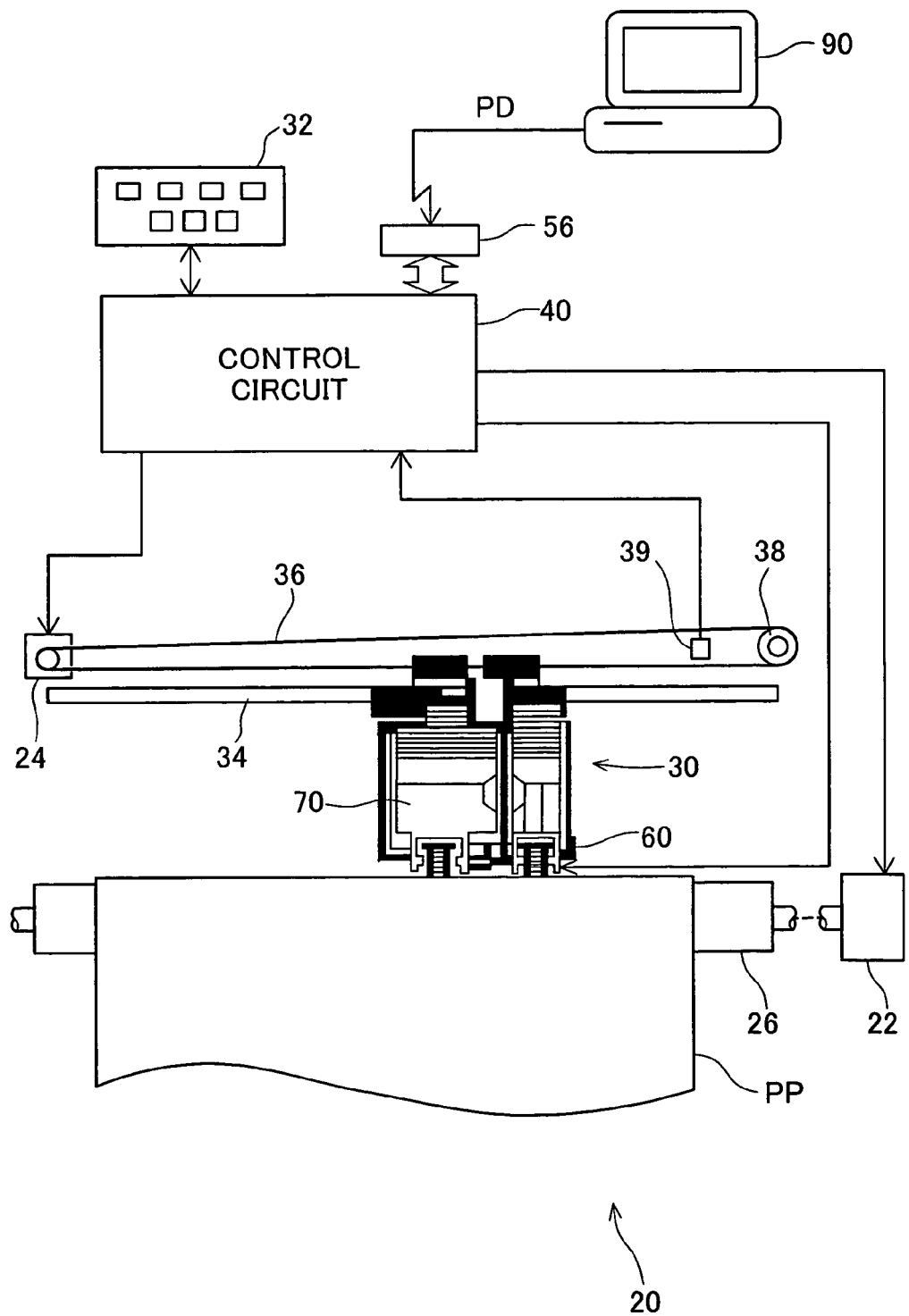
FIG. 2 is a simplified schematic of printer 20.

FIG. 2 is a simplified schematic of printer 20. Printer 20 comprises a sub-scan feed mechanism for advancing printing paper PP in the sub-scanning direction by means of a paper feed motor 22; a main scan feed mechanism for reciprocating a carriage 30 in the axial direction of a platen 26 (i.e. main scanning direction) by means of a carriage motor 24; a head drive mechanism for driving a print head unit 60 carried on carriage 30, and controlling ink ejection and dot formation thereby; and a control circuit 40 for exchange signals with the paper feed motor 22, carriage motor 24, print head unit 60 and a control panel 32. The control circuit 40 is connected to computer 90 via a connector 56.

The sub-scan feed mechanism for advancing print paper PP in the sub-scanning direction comprises a gear train (not shown) for transmitting rotation of the paper feed motor 22 to the platen 26 and paper feed rollers (not shown). The main scan feed mechanism for reciprocating the carriage 30 comprises a slide rail 34 extending parallel to the axis of platen 26, for slidably retaining the carriage 30; a pulley 38 around which is passed an endless belt 36 that extends to the carriage motor 24; and a position sensor 39 for sensing the home position of the carriage 30.

Figure 3:
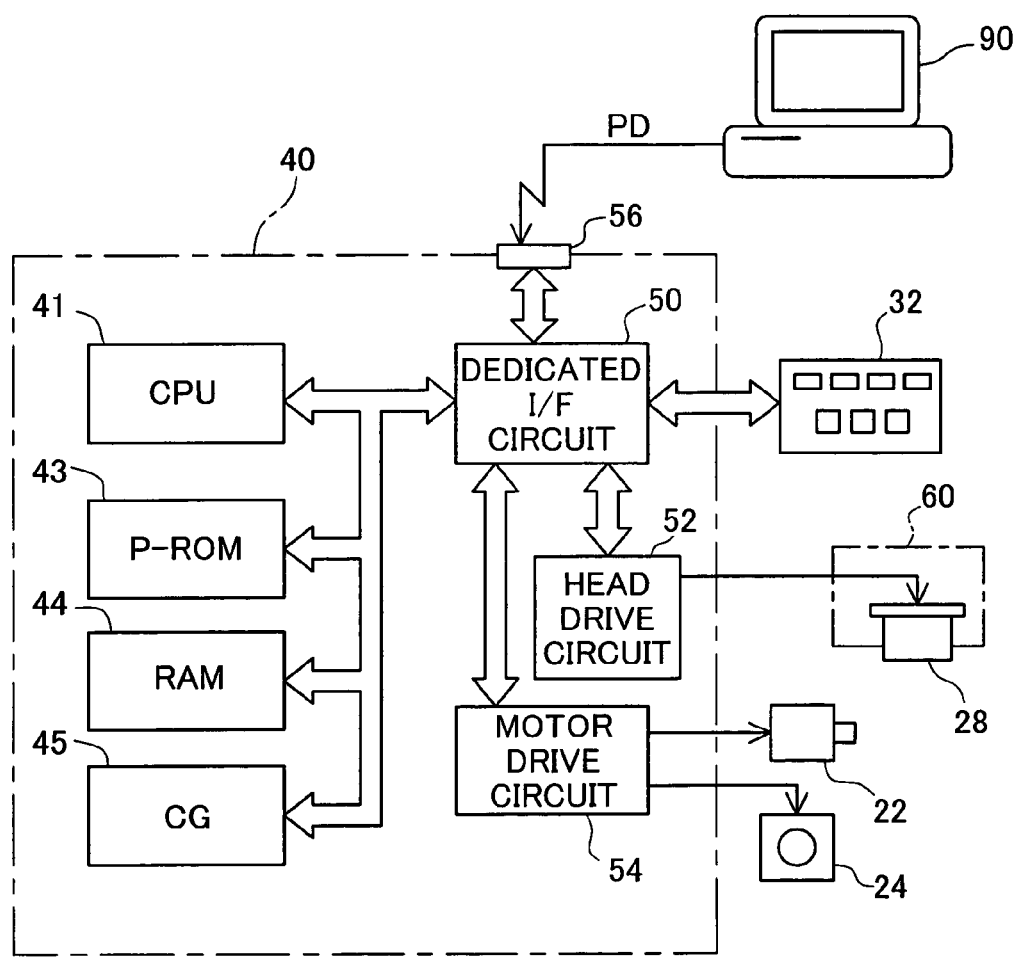
FIG. 3 is a block diagram of printer 20 arrangement.

FIG. 3 is a block diagram of the printer 20 arrangement, focusing on the control circuit 40. The control circuit 40 constitutes an arithmetic/logic circuit comprising a CPU 41, programmable ROM (PROM) 43, RAM 44, and a character generator (CG) for storing character dot matrices. The control circuit 40 additionally comprises a dedicated I/F circuit 50 dedicated exclusively to interface with external motors, etc.; a head drive circuit 52 connected to the dedicated I/F circuit 50, for driving the print head unit 60 to eject ink; and a motor drive circuit 54 for actuating the paper feed motor 22 and carriage motor 24. The dedicated I/F circuit 50 includes a parallel interface circuit allowing it to receive print data PD supplied by computer 90 via connector 56. Circuitry within dedicated I/F circuit 50 is not limited to a parallel interface circuit; in view of ease of connection to computer 90, communication speed, etc., a universal serial bus interface circuit or the like could be used instead. Printer 20 executes printing in accordance with the print data PD. RAM 44 functions as a buffer memory for temporarily storing raster data.

Print head unit 60 has a print head 28, and accommodates installation of ink cartridges containing compatible inks. Print head unit 60 detachably installs onto printer 20 as a single unit. That is, to replace print head 28, the entire print head unit is replaced.

Figure 4:
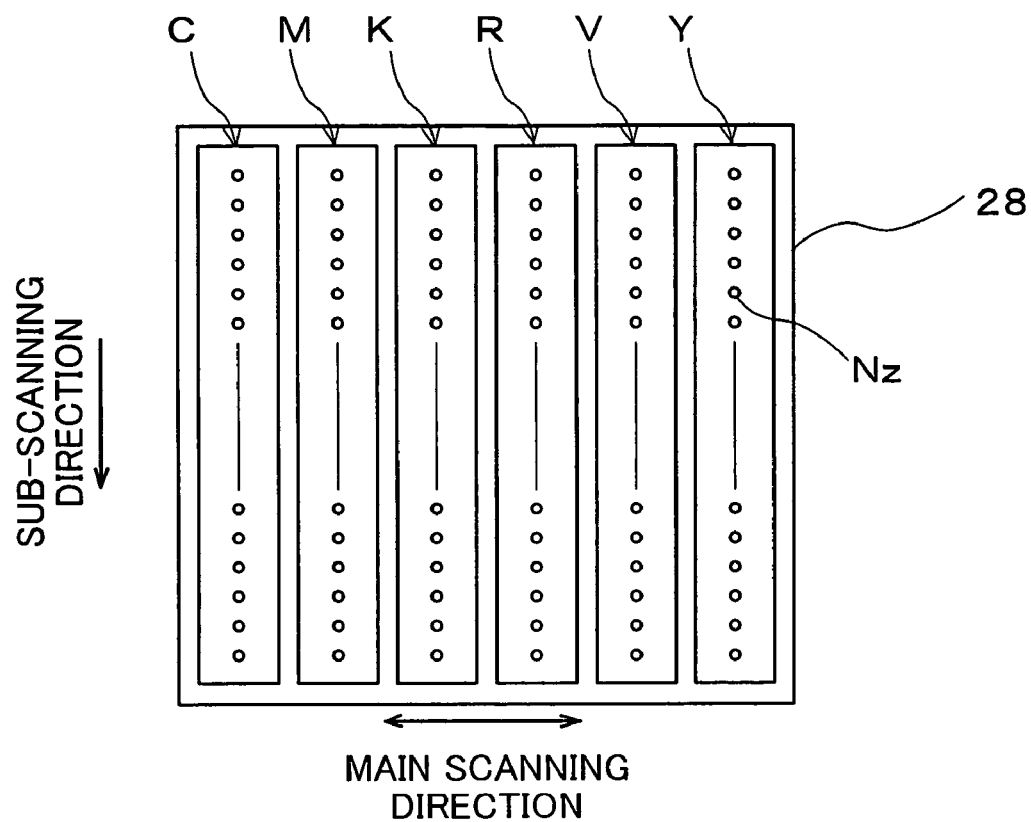
FIG. 4 illustrates ink nozzle arrangement on the lower face of print head 28.

FIG. 4 illustrates ink nozzle arrangement on the lower face of print head 28. On the lower face of print head 28 are arranged a nozzle group for ejecting cyan ink C, a nozzle group for ejecting magenta ink M, a nozzle group for ejecting black ink K, a nozzle group for ejecting red ink R, a nozzle group for ejecting violet ink V, and a nozzle group for ejecting yellow ink Y. In this embodiment, it is possible to use an ink set composed of the six inks C, M, Y, R, V, and K. In the example of FIG. 4, the plurality of nozzles Nz of a single nozzle group are arranged in a line in the sub-scanning direction SS, but could instead be arranged in a zigzagged configuration.

FIG. 5(a) depicts ink components of the C, My, Y, R, V and K color inks of the ink set. Each color ink is ion exchange water-based, containing various kinds of colorant consisting of dyes or pigments to impart the desired color, or a mixed solution additionally containing a suitable amount of ethylene glycol or the like added to modify viscosity. The type of colorant is indicated by the color index (CI) of the colorant.

Cyan ink C, magenta ink M, and yellow ink Y may be used in combination to reproduce gray (achromatic color), and correspond to chromatic primary color inks. Red ink R and violet ink V are different in hue from any of the chromatic primary color inks (CMY), and correspond to spot color inks. The red ink R has a hue between those of the yellow ink Y and magenta ink M; the violet ink V has a hue between those of the magenta ink M and cyan ink C.

Mixed colors of the chromatic primary color inks C, M, Y can reproduce hue and saturation substantially identical to the colors of the spot color inks R, V. Here, each ink quantity of chromatic primary color ink in a color mixture, relative to the ink quantity of a spot color ink, i.e., each ink quantity of chromatic primary color ink when the ink quantity of a spot color ink is designated as 1, is termed substitution ink quantity. Inks of each of the colors C, M, Y and inks of each of the colors R, V can reproduce substantially the same colors when substituted on the basis of substitution ink quantities.

FIGS. 5(b) and 5(c) each show an experimental result of measuring substitution ink quantities utilizing the ink set shown in FIG. 5(a). This experimental result was obtained by calorimetric measurement and comparison of a color patch created with a color mixture of the chromatic primary color inks C, M, Y with color patches of the spot color inks R, V respectively. FIG. 5(b) gives substitution ink quantities for red ink R, with substitution ink quantities of the colors CMY being denoted by the symbols wCR, wMR, wYR. FIG. 5(c) gives substitution ink quantities for violet ink V, with substitution ink quantities of the colors CMY being denoted by the symbols wCV, wMV, wYV. In the right column of each table is given the total value of substitution ink quantities.

In this way, substitution ink quantities for each of the spot color inks R, V are values in which two of the three ink quantities are greater than zero, with the one remaining ink quantity being zero. That is, each spot color ink R, V can be separated into two chromatic primary color components. In the ink set given in FIGS. 5(a)-5(c), a color mixture of chromatic primary color inks can be substituted by a spot color ink, in an amount smaller than the total value for the ink quantities. As a result, by actively employing the spot color inks, it becomes possible to reproduce substantially identical hue and saturation with smaller quantities of ink. By reducing ink quantity it is also possible to reproduce higher lightness. Additionally, by employing a spot color ink in an ink quantity substantially equal to that of a chromatic primary color ink color mixture, it is possible to reproduce higher saturation. Thus, even where a limit is imposed on the total value of ink quantity used (i.e., an ink duty limit, described in detail later), by using a spot color ink, it is nevertheless possible to reproduce higher saturation than would be possible when reproduced with a chromatic primary color ink color mixture. By utilizing chromatic primary color ink and spot color ink in this way, it becomes possible to reproduce a wider range of color than would be reproducible with chromatic primary color inks only.

The two spot color inks R, V also have hues different from one another. Additionally, these inks R, V have different principal component primary color inks from one another; the principal component primary color inks denote the two inks that have the largest values of the substitution ink quantities among the color inks CMY. In the example of FIGS. 5(b) and 5(c), the principal component primary color inks of the red ink R are magenta ink M and yellow ink Y. The principal component primary color inks of the violet ink V are cyan ink C and magenta ink M. In this example, the difference in the principal component primary color inks is the yellow ink Y and cyan ink C. As a result, the two spot color inks R, V can extend their color reproduction range in areas of mutually different hue. Thus, a wider range of color can be reproduced, as compared to the case where spot color inks of mutually similar hue are used.

In the ink set shown in FIG. 5(a), the spot color inks R, V contain different colorant than the chromatic primary color inks C, M, Y. Thus, by using the spot color inks in place of color mixtures of the chromatic primary color inks C, M, Y, reproduction of hues similar to those of the spot color inks can be improved.

Printer 20 having the hardware configuration described above advances the printer paper PP by means of the paper feed motor 22 while reciprocating the carriage 30 by means of the carriage motor 24, while at the same time actuating the piezo elements of print head 28 to eject drops of ink of each color, to produce ink dots and form a multicolor, multitone image on the printer paper PP.

B. Method for Creating Color Conversion Lookup Table

FIG. 6 is a flowchart depicting the color reproduction processing routine in the first embodiment of the invention. In Steps S10-S70, a color conversion lookup table LUT (FIG. 1) is created for the purpose of carrying out color reproduction.

First, in Step S10, one combination of a print medium and an ink set for use in printing is selected. It is assumed that for typical printing, one print medium selected by the user from among several types of print media (plain paper, gloss paper, matte paper etc.). In certain types of printer, the ink set to be used can be selected from among a number of types of ink set (for example, a dye ink set and a pigment ink set). Color reproduction of printed matter depends on the print medium and the ink set. Accordingly, in this embodiment, the processes of Steps S10-S60 are executed for each combination of print medium and ink set, and a color conversion lookup table LUT appropriate for each combination is created. The type of print medium and type of ink set assumed to be used in printer 20 are typically displayed on a screen (not shown) for setting the print parameters of the printer driver 96.

In Step S20, a color separation process to convert a primary color tone value set expressed in a primary color system into a second tone value set expressed in a reproduction color system is executed. The primary color system is a color system represented by color ink quantities of the chromatic primary color inks CMY; the reproduction color system is a color system represented by ink quantities of the color inks used during printing. This primary color tone value set is composed of ink quantities of the each of the plurality of chromatic primary color inks C, M, Y. Ink quantities of the chromatic primary color inks C, M, Y are values representing a range from the minimum possible value (zero) to the maximum value (ink quantity reproducing a completely solid area) in 256 levels from 0 to 255, for example. In this embodiment, a solid area is reproduced by ejecting ink onto all pixels. Thus, ink quantity when reproducing such a solid area may be assigned a value of 100%.

In this Step S20, first, a plurality of primary color tone value sets are prepared. Ink quantities of each of the chromatic primary color inks C, M, Y in these primary color tone value sets are preferably distributed over the entire possible range (0%-100%), and in especially preferred practice will be distributed uniformly throughout the entire range. As a plurality of value for ink quantity, it would be possible to use the eleven values of 0, 25, 50, 75, 100, 125, 150, 175, 200, 225, and 255, for example. Apparent change in reproduction color versus the change in tone values of ink quantities may differ depending on ink tone value in some instances. In such instances, it is preferable to prepare ink quantities of inks using smaller intervals in the range of tone values that have greater apparent change in color. By so doing, it is possible to create a color conversion lookup table LUT corresponding to finer changes in apparent color change.

Next, the plurality of primary color tone value sets are converted to second tone value sets expressed in the reproduction color system. The reproduction color system is a color system represented by ink quantities of the ink set employed at the time of printing, for example, color ink quantities for the chromatic primary color inks CMY and the spot color inks RV. A second tone value set consists of values representing a range of minimum (0%) to the maximum (100%) possible for CMYRV color ink quantities, in 256 levels from 0 to 255, for example. A detailed description of the color separation process from the primary color system to the reproduction color system will be made later.

Figure 7:
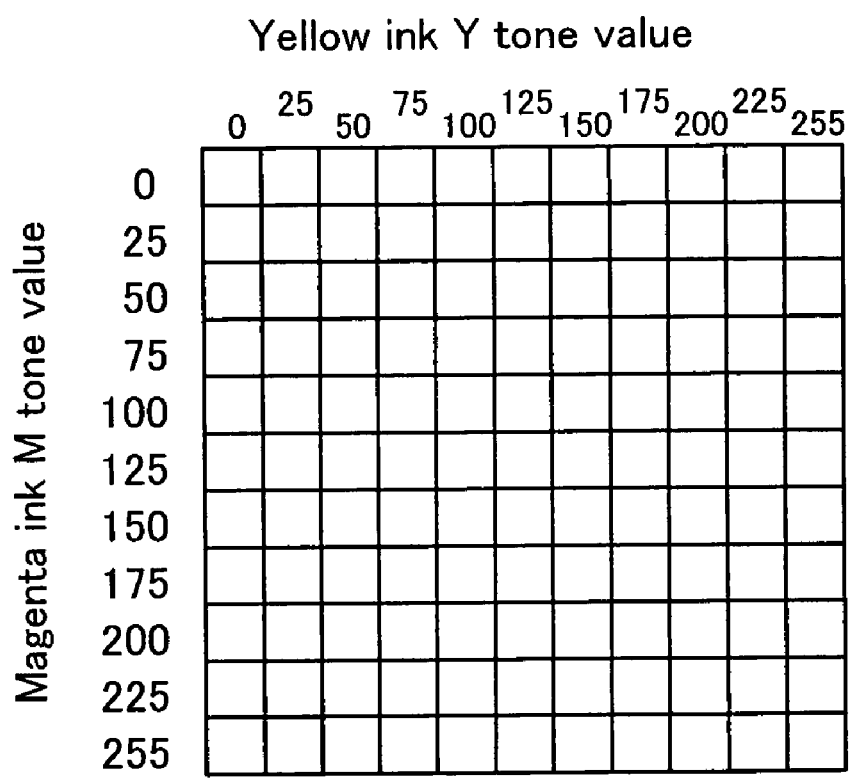
FIG. 7 depicts color patches.

In Step S30, a plurality of kinds of color patches corresponding to the plurality of primary color tone value sets are created. FIG. 7 depicts exemplary color patches created in the embodiment. The vertical axis is the tone value of magenta ink M in the primary color tone value sets prepared in Step S20 above; the horizontal axis is yellow ink Y tone value. Each color patch is reproduced by ink quantities derived by conversion of a tone value set according to the color separation process of Step S20. The example of FIG. 7 shows a case in which the tone value for cyan ink C in the primary color tone value sets has been set to zero. In actual practice, a plurality of kinds of color patches corresponding to a plurality of tone values for cyan ink C would be created, but are not shown in the drawing. In this way, in Step S30, a plurality of kinds of color patches corresponding to the plurality of primary color tone value sets prepared in Step S20 are created.

In Step S40 (FIG. 6), using a colorimeter, the plurality of color patches created in Step S30 are subjected to calorimetric measurement. The data obtained as a result of colorimetric measurement is expressed in a color system that is independent of any device (i.e., a printer, monitor, etc.), for example, the L*a*b color system or XYZ color system. In this way, by subjecting each color patch to colorimetric measurement in Step S40, it is possible to determine "primary color/device-independent color system correspondence relationships" for primary color systems and device-independent color systems. Also, as a result of calorimetric measurement it is possible to verify a color gamut reproducible by printer 20, in a device-independent color system.

In Step S50, a correspondence relationship between an arbitrary first color system and a primary color system is established on the basis of the "primary color/device-independent color system correspondence relationships" derived in Step S40. The first color system is the color system of input color image data of the color conversion lookup table LUT; the sRGB color system could be used, for example. "First color system/device-independent color system correspondence relationships" for such first color systems and device-independent color systems have been pre-established. Thus, employing the "first color system/device-independent color system correspondence relationships" and the "primary color/device-independent color system correspondence relationships" derived in Step S40, it is possible to establish a correspondence relationship between a first color system and a primary color system. The color reproduction range in the first color system and the color reproduction range of the printer may in some instances have non-overlapping portions. In such cases, preferred practice is to effectively utilize the entire gamut of each by establishing appropriately expanded or reduced correspondence relationships.

Once a first correspondence relationship between a first color system and primary color system (Step S50) and a second correspondence relationship between a primary color system and a reproduction color system (Step S20) have been established in this way, in Step S60, a color conversion lookup table LUT (FIG. 1) for reproducing the established correspondence relationships is created. The color conversion lookup table LUT in this embodiment has RGB image data as input, and outputs multitone image data for the six ink colors shown in FIG. 4. Accordingly, when creating the color conversion lookup table LUT, first, a primary color tone value set, represented by CMY depending on tone values of the RGB image data, is calculated. Next, a second tone value set, i.e., ink quantity for each ink, depending on this first tone value set is determined by means of a color separation process, described later. Correspondence relationships having RGB image data values as input and ink quantity of each ink as output are then stored in the color conversion lookup table LUT.

In Step S70 in FIG. 6, a decision is made as to whether the processes of Steps S10-S60 have been completed for all combinations of ink set and print medium assumed to be used by printer 20. In the event that not all processing has been completed, the processes of Steps S10-S60 are repeated; if completed, the system moves to the next Step S80.

In Step S80, the plurality of created color conversion lookup tables LUT are incorporated into printer driver 96 (FIG. 1). Printer driver 96 is a computer program for realizing on computer 90 the function of creating print data PD to be sent to printer 20. Color conversion lookup tables LUT are installed together with printer driver 96 on computer 90, as data to which printer driver 96 refers. A printer driver 96 incorporating color conversion lookup tables LUT is typically provided by the vendor of the printer 20.

In Step S90 in FIG. 6, the user executes printing using printer 20. At this time, a lookup table suitable for the particular combination of print medium and ink set used for actual printing is selected from among the color conversion lookup tables LUT for all combinations of print media and ink sets, and printing is executed. The combination of print medium and ink set used for actual printing is selected by the use from a screen (not shown) for setting print parameters of printer driver 96.

C. Embodiment 1

C1: Example 1 of Color Separation Process in Embodiment 1

Figure 8:
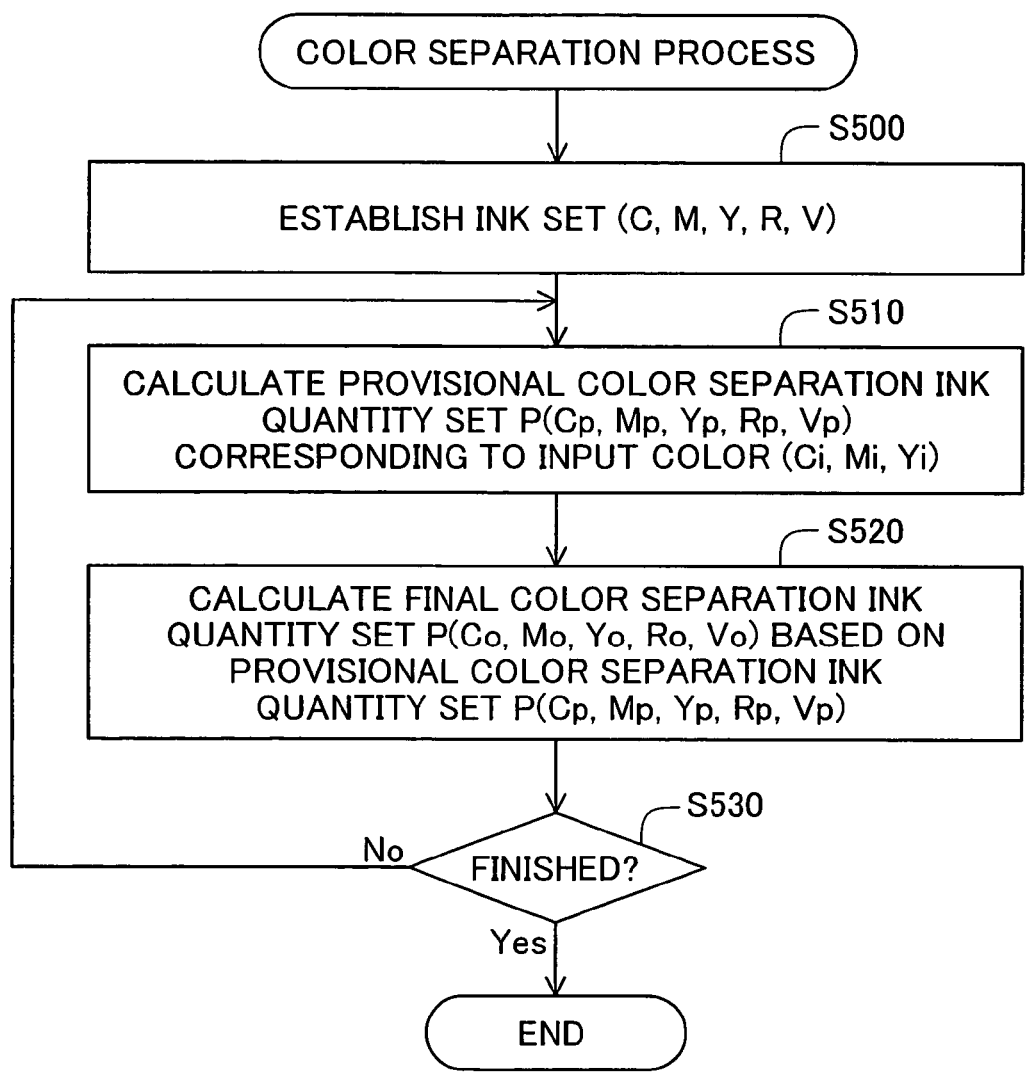
FIG. 8 is a flowchart depicting a color separation process processing routine.

FIG. 8 is a flowchart depicting the color separation process processing routine in Example 1. In this color separation process, a process to convert from a primary color system to a reproduction color system is executed. In Step S500 in FIG. 8, an ink set composed of the chromatic primary color inks C, M, Y and the spot color inks R, V as useable inks is established.

In Step S510, a provisional color separation ink quantity set I(Cp, Mp, Yp, Rp, Vp) for reproducing on a print medium a reproduction color corresponding to an input color I(Ci, Mi, Yi) is calculated. In Example 1, it is assumed that input color I(Ci, Mi, Yi) matches a reproduction color to be reproduced. As there are innumerable color separation ink quantity sets that can give an arbitrary reproduction color, the provisional color separation ink quantity set is determined by establishing a certain specific condition. For example, in this Example, the provisional color separation ink quantity set P(Cp, Mp, Yp, Rp, Vp) is determined so as to minimize total ink quantity.

As depicted in FIGS. 5(a)-5(c), a spot color ink color component may be separated into two chromatic primary color ink color components. Accordingly, total ink quantity is smaller the greater the ink quantity of spot color ink. The provisional color separation ink quantity set P of this Example is uniquely selected because it is that which, of all provisional color separation ink sets able to reproduce an input color I with a given reproduction color, has the smallest total ink quantity. As will be understood from other examples described later, the provisional color separation ink quantity set P may also be determined according to other criteria.

In Step S520, a final color separation ink quantity set O(Co, Mo, Yo, Ro, Vo) is determined on the basis of this provisional color separation ink quantity set P(Cp, Mp, Yp, Rp, Vp) (described in more detail later). In Step S530, a decision is made as to whether the processes of Steps S510, 520 have been completed for all reproduction colors needed to create a lookup table; the processes of Steps S510, 520 are repeated until processing for all reproduction colors has been completed.

Figure 9:
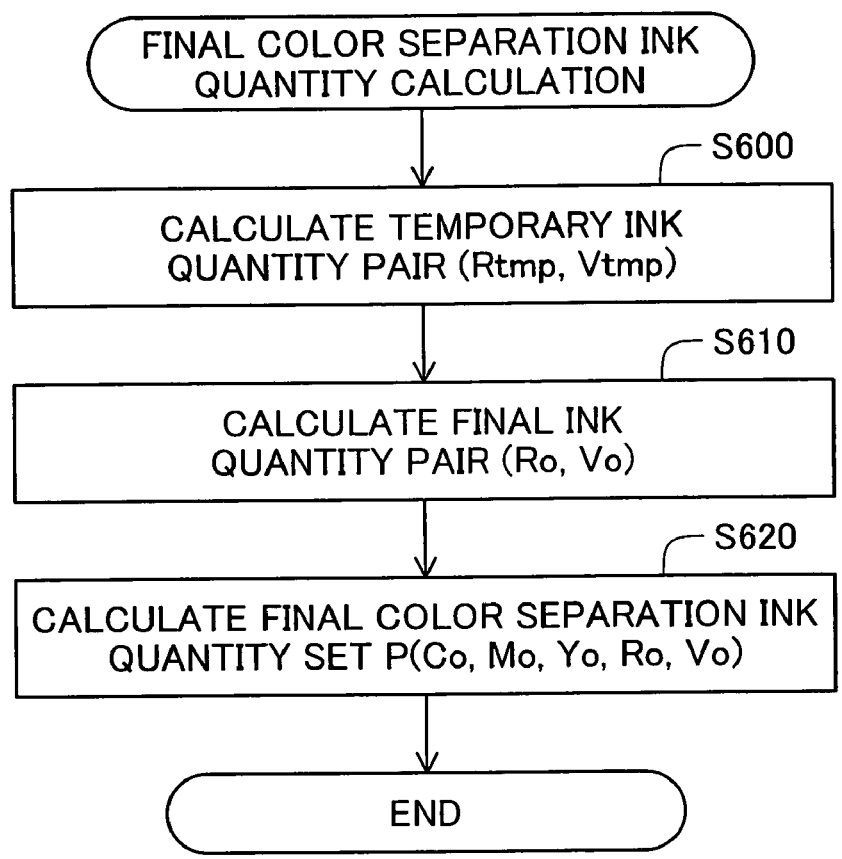
FIG. 9 is a flowchart depicting the processing routine for calculating a final color separation ink quantity set.
Figure 10A:
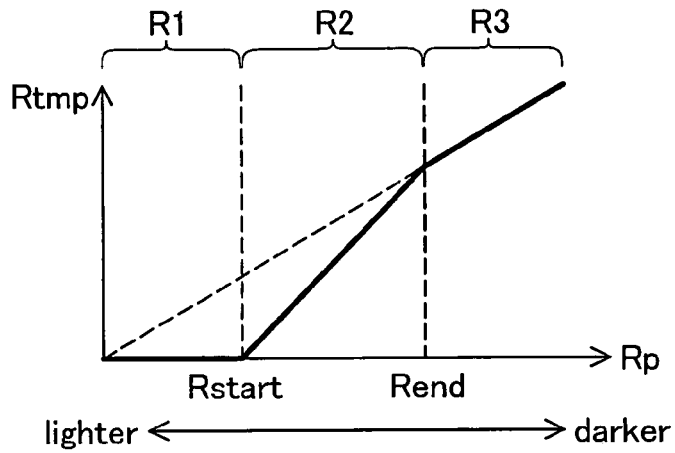
FIGS. 10(a), 10(b) show temporary ink quantities.

FIG. 9 is a flowchart depicting in detail the procedure of Step S520. In Step S600, two temporary ink quantities Rtmp, Vtmp for the two spot color inks R, V from provisional color separation ink quantity set P are determined. FIG. 10(a) is a graph for calculating a temporary ink quantity Rtmp from the provisional color separation ink quantity Rp of the red ink component R. Over a first range R1 in which provisional color separation ink quantity Rp goes from zero to a first value Rstart, temporary ink quantity Rtmp is set to zero. Over a second range R2 in which provisional color separation ink quantity Rp goes from the first value Rstart to a second value Rend, temporary ink quantity Rtmp rises from zero in linear fashion. However, over this second range R2, the temporary ink quantity Rtmp is maintained at a value smaller than the provisional color separation ink quantity Rp. Over a third range R3 in which provisional color separation ink quantity Rp goes above the second value Rend, temporary ink quantity Rtmp is set to a value equal to the provisional color separation ink quantity Rp.

Figure 10B:
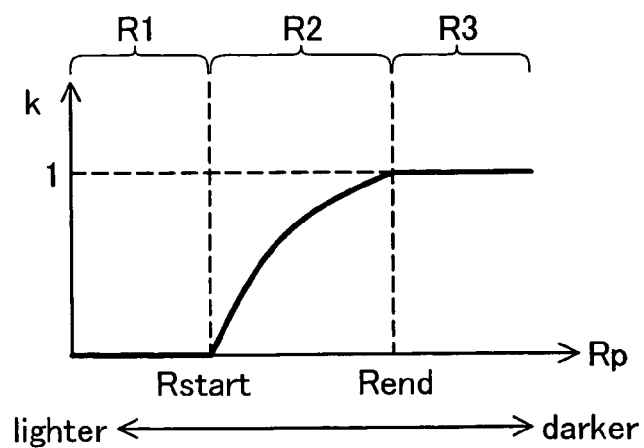

FIG. 10(b) is a graph for calculating the proportion k of temporary ink quantity Rtmp to provisional color separation ink quantity Rp. As will be understood from the graph, over the first range R1 proportion k is zero, with proportion k increasing monotonically from zero to 1 over the second range R2. Over the third range R3, proportion k is constant at 1.

The reason for setting temporary ink quantity Rtmp in the manner of FIGS. 10(a) and 10(b) is as follows. When provisional color separation ink quantity Rp is small, in most cases the image reproduced by the reproduction colors thereof is an image of a so-called highlight areas (high lightness areas). A feature of the spot color inks R, V is that their saturation and density are higher than those of the chromatic primary color inks. Since dots of spot color inks have higher saturation and density, they will tend to stand out in highlight areas, and may possibly worsen graininess in the image. Accordingly, the use of smaller ink quantity of spot color ink in highlight areas is preferable. Also, since reducing the ink quantity of spot color ink increases the ink quantity of chromatic primary color ink, the total number of ink dots increases. In this aspect as well, reducing ink quantity of spot color ink in highlight areas can improve graininess in an image. Accordingly, by setting ink quantity Rtmp of spot color ink to zero over the first range R1 of FIG. 10(a), formation of dots of spot color ink in highlight areas can be avoided. By so doing, it is possible to significantly improve image graininess in highlight areas.

On the other hand, over the third range R3 in which provisional color separation ink quantity Rp is large, it is preferable for ink quantity of spot color ink to be larger so as to give high image saturation. Accordingly, over this range R3, provisional color separation ink quantity Rp per se is set as the temporary ink quantity Rtmp. In the second range R2, temporary ink quantity Rtmp increases in linear fashion, so that over the three ranges R1-R3, temporary ink quantity Rtmp changes smoothly, rather than changing in stepwise fashion. Alternatively, temporary ink quantity Rtmp may change along a curve, instead of changing in linear fashion. Typically, it is preferable for temporary ink quantity Rtmp to change continuously at a constant rate of increase.

Since the red ink provisional color separation ink quantity Rp relating to a given reproduction color represents the density of the red ink component of that reproduction color, this ink quantity Ro can be thought of as an index indicating lightness in relation to the red ink component. When red ink provisional color separation ink quantity Rp relating to a given reproduction color is large, lightness of the reproduction color tends to be low. Accordingly, the provisional color separation ink quantity Rp can be thought of as a lightness parameter value correlated to lightness of the reproduction color.

As regards violet ink V as well, a temporary ink quantity Vtmp can be determined from the provisional color separation ink quantity Vp, by the same method as for red ink R.

In Step S610 in FIG. 9, final color separation ink quantities Ro, Vo are determined from temporary ink quantities Rtmp, Vtmp. The final color separation ink quantities Ro, Vo are determined by correcting the temporary ink quantities Rtmp, Vtmp as needed in order to meet ink duty limits. Herein, ink duty limit refers to a limit relating to ink quantity useable per unit of area of a print medium. Ink duty limits include ink-by-ink limits, limits as to total ink quantity for two kinds of ink, limits as to total ink quantity for all inks, or the like.

When executing Step S610, first, temporary ink quantities for the chromatic primary color inks C, M, Y, which in conjunction with the temporary ink quantity pair Rtmp, Vtmp are needed to reproduce desired reproduction color, are calculated. A decision is then made as to whether the temporary ink quantity set meets ink duty limits.

Figure 11A:
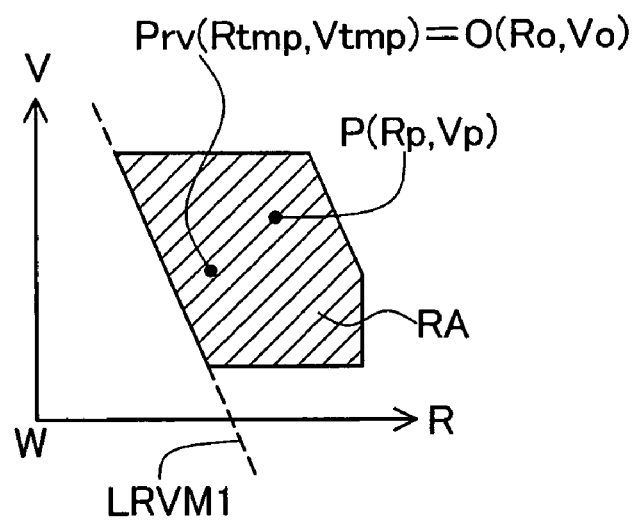
FIGS. 11(a), 11(b) are simplified illustrations of calculating final color separation ink quantity of spot color ink.
Figure 11B:
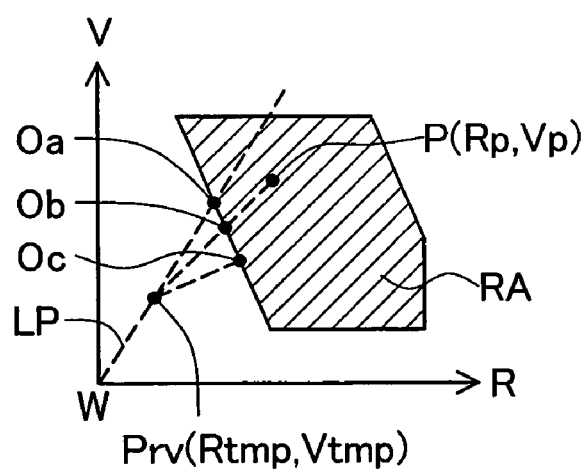

FIG. 11(a) depicts an exemplary permissible ink duty limit range RA drawn on a two-dimensional color space defined by two spot color inks R, V. In the drawing are also shown an exemplary coordinate point P(Rp, Vp) of a provisional color separation ink quantity pair and coordinate point Prv(Rtmp, Vtmp) of a temporary ink quantity pair. Outside edges of the permissible area RA are defined not only by boundary lines determined by independent duty limits for the spot color inks, but also by boundary lines determined by duty limits for other inks. For example, boundary line LRVM1 at the lower left of permissible area RA corresponds to the ink duty limit for magenta ink. As described in FIGS. 5(a)-5(c), the two spot color inks each include a magenta component, and thus if ink quantities of the spot color inks are reduced, the ink quantity of magenta ink M will increase. Accordingly, in order to meet the duty limit for magenta ink M, ink quantities of the spot color inks must be to the right of and above the boundary line LRVM1. As will be understood from the preceding description, the issue of whether ink duty limits are met takes into consideration ink quantities of all inks that make up an ink set. For convenience, in the description hereinbelow, it will be assumed that all ink duty limits are met when the temporary ink quantity pair Rtmp, Vtmp lie within permissible area RA.

Where the color coordinate point Prv of a temporary ink quantity pair lies within permissible area RA as shown in FIG. 11(a), the temporary ink quantity pair Rtmp, Vtmp per se is adopted as the final color separation ink quantity pair Ro, Vo. On the other hand, where the coordinate point Prv of a temporary ink quantity pair color falls outside permissible area RA as shown in FIG. 11(b), the final color separation ink quantity pair Ro, Vo is determined by means of correcting the temporary ink quantity pair Rtmp, Vtmp so as to meet ink duty limits. At this time, a point located within the permissible area RA of the two-dimensional color space, and situated in proximity to the color coordinate point Prv of the temporary ink quantity pair, is selected as the color coordinate point of the final color separation ink quantity pair Ro, Vo. In the example depicted in FIG. 11(b), there are drawn three such points Oa, Ob, Oc that could be selected as such a color coordinate point of the final color separation ink quantity pair. The first point Oa(Ro, Vo) is a point that equalizes the ratio of the temporary ink quantity pair Rtmp:Vtmp with the ratio of the final color separation ink quantity pair Ro:Vo. The second point Ob is a point at which a straight line connecting the color coordinate point P of the provisional color separation ink quantity pair (Rp, Vp) with the color coordinate point Prv of the temporary ink quantity pair intersects a boundary line of the permissible area RA. The third point Oc is the point closest to the color coordinate point Prv of the temporary ink quantity pair within the permissible area RA.

While any of these three points Oa, Ob, Oc could be selected as the color coordinate point of the final color separation ink quantity pair, selecting the first point Oa is especially preferred. The reason is that since the temporary ink quantity pair Rtmp, Vtmp is determined according to the relationships of FIGS. 10(a) and 10(b) by way of preferred ink quantities for improving graininess in an image, if the ratio thereof. Rtmp:Vtmp is maintained, it is possible to achieve a good balance whereby dots of neither of the two spot color inks will stand out, with resultant high probability of being able to improve graininess in the image.

Further, since ink duty limits function as limits only when the quantity of ink producing an image is considerable, they are a problem mainly in image areas of low lightness (i.e., image areas of high density). Accordingly, in highlight areas having high lightness, ink duty limits are not a problem, and temporary ink quantities Rtmp, Vtmp established on the basis of the relationships of FIGS. 10(a) and 10(b) are adopted per se as the final color separation ink quantities Ro, Vo. Accordingly, since the number of ink dots of the spot color inks R, V in highlight areas is fairly small, it is possible to improve graininess in the image.

In Step S620 in FIG. 9 are determined ink quantities Co, Mo, Yo for the other inks which, in conjunction with the final color separation ink quantity pair Ro, Vo, are needed to reproduce desired reproduction color. As a result, a final color separation ink quantity set (Co, Mo, Yo, Ro, Vo) for reproducing desired reproduction color is determined.

In this way, in Example 1, for each of the spot color inks R, V, final color separation ink quantity Ro, Vo is smaller in association with smaller lightness parameter values (provisional color separation ink quantities) Rp, Vp thereof, whereby numbers of ink dots of the spot color inks is reduced in highlight areas, with a corresponding increase in the number of ink dots of the chromatic primary color inks. A resultant advantage is that image graininess in highlight areas is improved. In particular, since over a first range R1 (FIG. 10(a)) in which provisional color separation ink quantities Rp, Vp assume relatively small values, temporary ink quantities Rtmp, Vtmp are set to zero, in highlight areas final color separation ink quantities Ro, Vo will also be set to zero, significantly improving image graininess. However, it would also be possible to set temporary ink quantities Rtmp, Vtmp to relatively small, non-zero values over this first range R1.

C2. Example 2 of Color Separation Process in Embodiment 1

Figure 12:
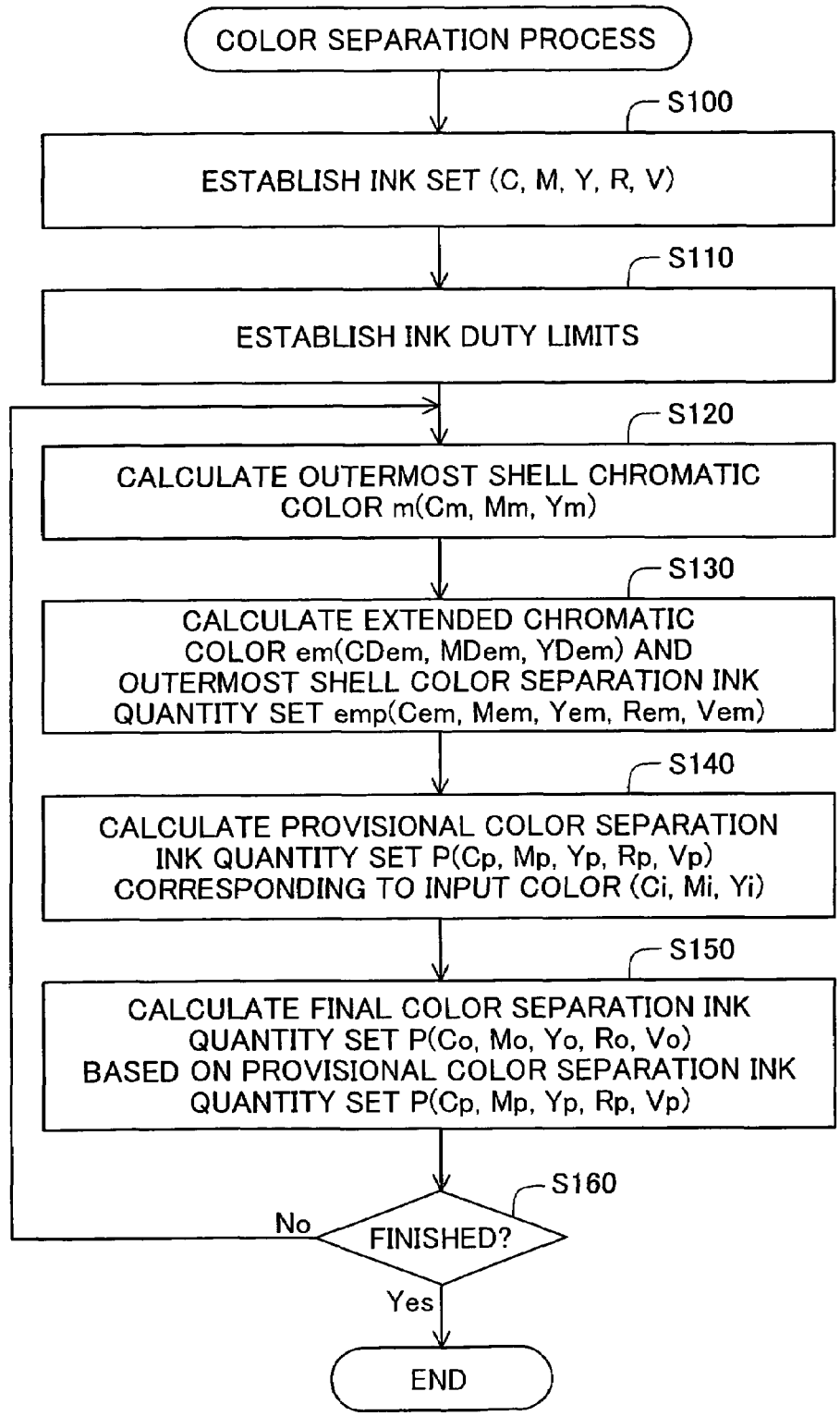
FIG. 12 is a flowchart depicting a color separation process processing routine.

FIG. 12 is a flowchart depicting a processing routine in a second Example. In Example 1 described previously, primary color system input values per se are employed as the reproduction colors (the colors of the reproduction color system); in Example 2, however, colors of higher saturation than input colors are employed as the reproduction colors. The reason this is possible lies in the fact that the spot color inks R, V included in the reproduction color system can achieve higher levels of saturation as regards to red color and violet color than color mixtures of chromatic primary color inks.

In Step S100 in FIG. 12, an ink set composed of the chromatic primary color inks C, M, Y and the spot color inks R, V as useable inks is established.

Next, in Step S110, an ink duty limit, which limits ink quantity, is established for each color of the ink set. Ink duty limit is established with reference to type of ink and print medium (described in detail later).

Input colors in the primary color space are represented using tone values in the possible range (0%-100%) for CMY color ink quantities, in 256 levels from 0 to 255. The color separation ink quantity set in the reproduction color system is represented using tone values in the possible range (0%-100%) for CMYRV color ink quantities, in 256 levels from 0 to 255.

Figure 13A:
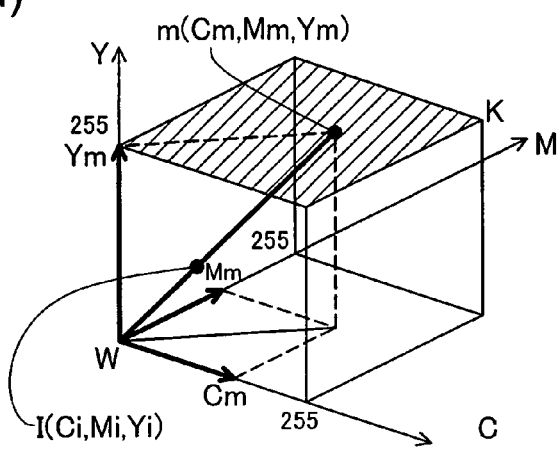
FIGS. 13(a)-13(c) depict a primary color space.

FIGS. 13(a), (b) depict a primary color space having CMY color ink quantities as base vectors. Colors expressed in the primary color space are depicted as points of a cube represented by CMY tone values of 0-255 in the primary color space. The cube is the area of values that can be assumed by ink quantities of the CMY colors of the chromatic primary color inks. Hereinafter, this cube will be referred to as a "color solid", and, of the six faces of the color solid, the three faces facing the origin W (the three faces surrounding K(C=M=Y=100%)) will be termed type 1 outer shell planes. In other words, type 1 outer shell planes are composed of points of colors having at least one chromatic primary color ink quantity that is at 100%, and having at least one chromatic primary color ink quantity that is at less than 100%. Where the line connecting the origin W with point K is termed a "achromatic color line", the distance between any particular point in the primary color space and the achromatic color line can be used as an index of saturation of the particular point. Where a point projected on the achromatic color ling from the particular point is termed a "projection point", the distance between the projection point and the origin W can be used as an index of lightness of the particular point. The direction from the projection point to the particular point in the primary color space can be used as an indicator of hue of the particular point.

Figure 13B:
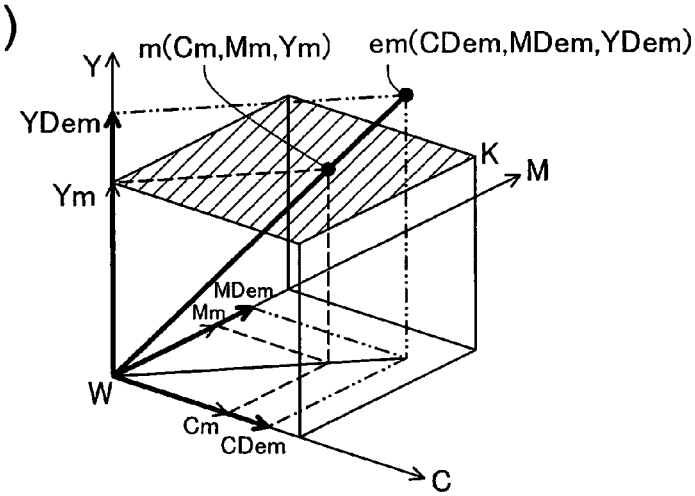

In FIGS. 13(a), 13(b), the type 1 outer shell plane having Y at maximum (Y=255) is depicted with hatching. A single color m is noted on the hatched type 1 outer shell plane. This color m is established as the outermost shell chromatic color m in Step S120 of FIG. 12. In the example of FIGS. 13(a), 13(b), outermost shell chromatic color m is established on the outer shell plane having the Y component at maximum, with tone values for the colors CMY designated, in CMY order, as Cm, Mm, and Ym (in this example, Ym=255).

In the color separation process of this Example, by sequentially executing the processes of Steps S130-S150 described later, it is possible to derive a color separation ink quantity set associated with an input color I on a line connected the origin W with the outermost shell chromatic color m. Also, in this Example, in order to execute color separation processing for a plurality of input colors I, a plurality of outermost shell chromatic colors are provided, and a series of processes (S130-S150) is executed on each outermost shell chromatic color.

In Step S130 in FIG. 12, there is also calculated an extended chromatic color em situated on the outer shell of the gamut reproducible using the CMYRV color inks of the ink set (FIG. 13(b)).

Figure 14A:
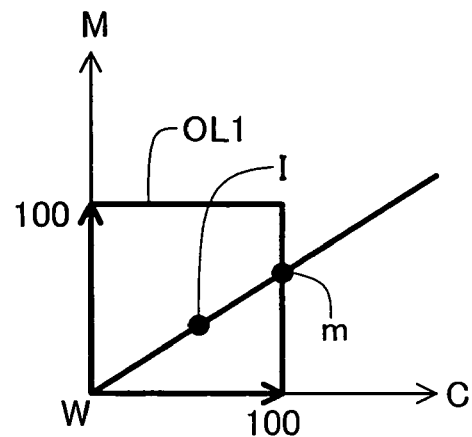
FIGS. 14(a), 14(b) are simplified illustrations of calculation of extended chromatic color.
Figure 14B:
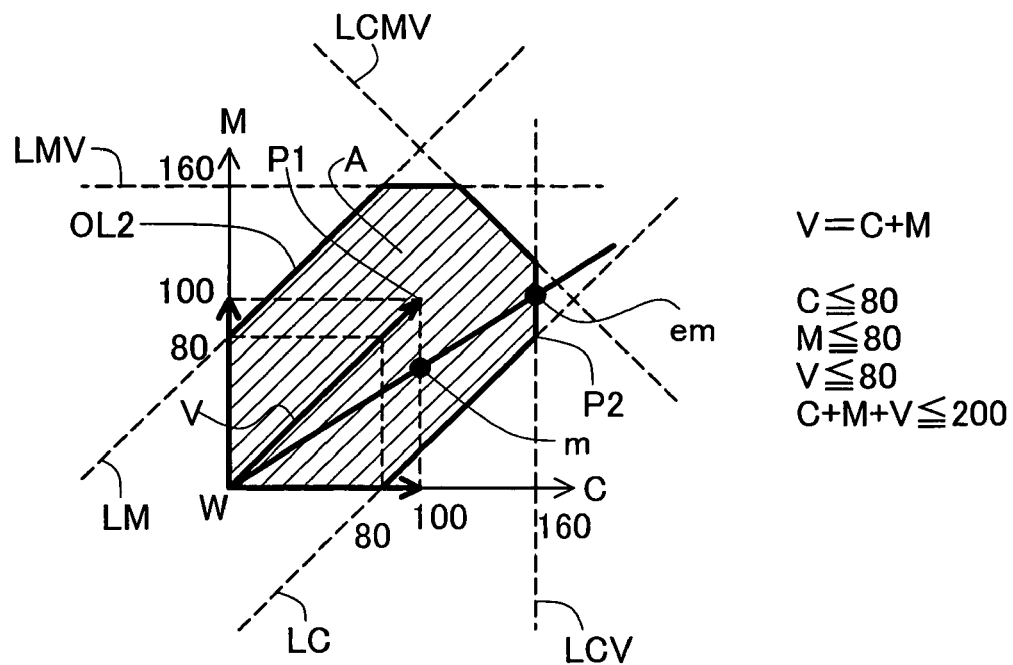

FIGS. 14(a) and 14(b) show calculation of extended chromatic color em. In the example of FIGS. 14(a) and 14(b), in order to simplify the description, it is assumed that two types of ink, namely, cyan ink C and magenta ink M, are useable as chromatic primary color inks, and one type of ink, namely violet ink V, is useable as spot color ink.

FIG. 14(a) depicts a primary color space. In this example, CMV color tone values can assume values in the range 0-100. Thus, an input color expressed in the primary color space is represented as a point inside a square whose sides have length of 100. This square corresponds to the color solid described earlier. In the drawing, the type 1 outermost shell OL1 of the square is denoted by a thick line. This type 1 outermost shell OL1 corresponds to the type 1 outermost shell described earlier. On a line on which the cyan C of type 1 outermost shell OL1 is at maximum (C=100) there is established an outermost shell chromatic color m.

FIG. 14(b) depicts the range of possible values for hypothetical ink quantities for each color, when colors reproducible using a spot color ink V in addition to chromatic primary color inks CM are expressed in a primary color system. Here, it is assumed that a 1:1 mixture of cyan ink C and magenta ink M can reproduce substantially identical hue and saturation as an violet ink V in an equal amount. That is, for both cyan ink C and magenta ink M, ink quantity substitutable for violet ink V is 1. For example, color P1 in FIG. 14(b) is the color reproducible when CM color tone values are each 100. It is also possible to reproduce substantially the same color by substituting a V tone value for CM color tone values. For example, even if only the tone value of V is 100, i.e., a V tone value is substituted for all CM color tone values, it is nevertheless possible to reproduce substantially the same color. Here, the tone value obtained by substituting tone values of chromatic primary color inks CM for all tone values of spot color ink V (in this example, C=100, M=100) can be used as a hypothetical tone value for representing in a primary color space colors reproducible using the colors CMV.

In this example, the following limitations are imposed with regard to tone value of each ink.

(Condition 1-a) Tone value of each ink is 80 or less.

(Condition 1-b) The sum of the tone values of the inks is 200 or less.

Limitations imposed on tone values by Conditions 1-a, 1-b can be explained as follows. Basically, there is a limit as the quantity of ink that can be absorbed by a print medium per unit of area. If a quantity of ink in excess of this limit is ejected, the unabsorbed excess ink may produce bleeding, or wrinkling of the print medium. Thus, it is desirable to establish a limit for ink quantity used. Such an upper limit for ink quantity, i.e. upper limit as to tone value, is termed the ink duty limit. In some instances, appropriate values for ink duty limit will differ depending on the type of ink. In such instances, picture quality of printed images can be improved by establishing a different limit value for each color. By establishing a limit value for the sum of the tone values of inks of each color (i.e. the sum of ink quantities), as does Condition 1-b, it is possible to avoid ejection of ink in a quantity exceeding the ink absorbing capacity of the print medium. Additionally, it is preferable to establish a limit value for the sum of ink quantities of any two types of ink, for areas that are reproduced by two-color mixtures. It is also is preferable to establish a limit value for the sum of quantities of many types of ink. By varying these limit values according to the type of print medium, it is possible to improve picture quality of a printed image depending on the type of print medium.

Such ink duty limits are represented in terms of tone values for the colors of the useable inks CMV, but could instead be expressed in a primary color space by using hypothetical tone values for each of the colors CM derived using substitution ink quantities. In the example of FIG. 14(b), since ink duty limit relationships among the CMV colors are represented linearly, they are represented as straight lines in the primary color space. Thus, the area in which reproduction is possible using inks of the CMV colors within ranges that satisfy ink duty limits is shown as an area enclosed by straight lines that correspond to the ink duty limits. In FIG. 14(b), straight line LC is the straight line for which C=80. The fact that it is sloped with respect to the C axis is because the use of violet ink V will allow the hypothetical tone values of the CM colors to have greater values. Thus, the area meeting the condition C≦80 lies to the inside of this straight line LC. Straight line LCV is the straight line for which C+V=160. This straight line corresponds to the limit C+V≦160, derived from the two limits C≦80 and V≦80. The area meeting the condition C+V≦160 lies to the inside of this straight line LCV.

The intersection point P2 of straight lines LC and LCV represents a C tone value of 160 and a M tone value of 80. Since this color P2, in terms of the tone value of C, does not fulfill ink duty limits (Condition 1-a), it cannot be reproduced when only inks of the two colors CM are used. Here, of the tone values for the colors CM, the value of 80 is converted to a V tone value, whereupon tone values for the colors CMV, i.e. color separation ink quantities, become 80, 0, 80, so that ink duty limits are met. That is, color P2 can be reproduced using chromatic primary color inks CM and spot color ink V.

Also depicted in FIG. 14(b) are the following straight lines corresponding to ink duty limits. Straight line LCMV is the straight line for which C+M+V=200, straight line LMV is the straight line for which M+V=160, and straight line LM is the straight line for which M=80. As a result, color within area A enclosed by these straight lines is a color that meets ink duty limits, and that is reproducible using spot color ink V. That is, where a hypothetical tone value derived by substituting chromatic primary color ink for spot color ink tone value lies within area A, it can be reproduced using chromatic primary color ink and spot color ink.

Distances between the origin W and these straight lines LCV, LCMV, LMV are values that vary depending on substitution ink quantity of spot color ink. That is, the greater substitution ink quantity is, the greater the distance between the origin W and the straight line corresponding to each ink duty limit. As a result, greater substitution ink quantity means a larger area reproducible using chromatic primary color ink and spot color ink. Thus, from the standpoint of extending reproducible area, a total value for substitution ink quantity of greater than 1 is preferred, with 1.5 or above being especially preferred. In the example of FIG. 14(b), the substitution ink quantity of violet ink V is 1 for each of the colors CM, so total substitution ink quantity is 2. In the example of the ink set of FIGS. 5(b) and 5(c), red ink R substitution ink quantities, in the order CMY, are 0.0, 0.71, and 2.86, for a total of 3.57. Violet ink V substitution ink quantities, in the order CMY, are 0.68, 2.89, and 0.0, for a total of 3.57. Since each of the totals of substitution ink quantities of the two inks RV is above 1.5, a wider color reproduction range can be obtained through the use of these inks R, V. Where the total of substitution ink quantities of chromatic primary color inks is greater than 1, spot color ink, used in an ink quantity about equal to that of a chromatic primary color ink color mixture, makes it possible to reproduce high color saturation. By so doing, through the use of chromatic primary color ink and spot color ink, it is possible to reproduce a wider range of color than is reproducible using chromatic primary color inks alone.

The outer shell in an area meeting ink duty limits in this way is referred to herein as a "reproduction color outer shell plane". While a reproduction color outer shell plane is represented by a reproduction color system for ink quantities of an ink set, it could be mapped into a primary color system by substituting ink quantities of chromatic primary color ink for ink quantities of spot color inks according to substitution ink quantities. In the example of FIG. 14(b), an outer shell line OL2 constituting the outer shell of area A corresponds to a reproduction color outer shell plane when mapped to a primary color system (hereinafter, outer shell line OL2 will be referred to as reproduction color outer shell line OL2). As regards the condition that V≦80, since this condition is met anywhere within area A, a corresponding straight line diagram is not shown.

In FIG. 14(b), area A is shown hatched, and reproduction color outer shell line OL2 is depicted as a thick line. An extended chromatic color em is established on reproduction color outer shell line OL2. Extended chromatic color em is a color located on the intersection point of reproduction color outer shell line OL2 with a line segment passing through the origin W and the outermost shell chromatic color m. That is, the extended chromatic color em is a color represented by the longest extended chromatic color vector having the same direction as the outermost shell chromatic color vector representing the outermost shell chromatic color m in the primary color space; furthermore an outermost shell color separation ink quantity set for reproducing the extended chromatic color em lies within ink duty limits.

Extended chromatic color described above can be established in the same manner as when increasing the number of kinds of ink. FIG. 13(b) shows extended chromatic color em in a primary color space based on ink quantities of the colors CMY. Extended chromatic color em is a color reproducible using chromatic primary color inks C, M, Y and spot color inks R, V.

Here, hypothetical tone values for reproducing extended chromatic color em in the primary color space are designated CDem, MDem, and YDem, in the color order CMY. Ink quantities of the color separation ink quantity set corresponding to the extended chromatic color em (this set corresponds to the outermost shell color separation ink quantity set) are designated Cem, Mem, Yem, Rem, and Vem in the order CMYRV. Thus, the hypothetical CMY tone values CDem, MDem, YDem can be represented by the following equations, using the substitution ink quantities indicated in FIGS. 5(b) and 5(c).

$$CDem = Cem + wCR \times Rem + wCV \times Vem$$

$$MDem = Mem + wMR \times Rem + wM \times Vem$$

$$YDem = Yem + wYR \times Rem + wYV \times Vem \qquad \text{[Equation 1-1]}$$

In this Example, the extended chromatic color em is calculated so that the outermost shell color separation ink quantities Cem, Mem, Yem, Rem, and Vem meet the following conditions.

(Condition 1-1) The CMYRV color separation ink quantity set meets ink duty limits.

As ink duty limits, there may be established, for example, a limit as to the total ink quantity of all inks; limits as to ink quantities of individual inks; limits as to ink quantities for color mixtures of two colors, or the like.

A limit as to the total ink quantity of all inks may be given by the following equation, for example.

$$C+M+Y+R+V \leq \text{Duty\_T} \qquad \text{[Equation 1-2]}$$

In the Equation, C, M, Y, R and V respectively represent ink quantities of the colors CMYRV (this convention is also used in other equations hereinbelow). Duty_T is a limit value that has been preset with reference to type of ink and print medium.

Limits as to ink quantities of individual inks may be given by the following equations, for example.

$$C \leq \text{Duty\_C}$$

$$M \leq \text{Duty\_M}$$

$$Y \leq \text{Duty\_Y}$$

$$R \leq \text{Duty\_R}$$

$$V \leq \text{Duty\_V} \qquad \text{[Equation 1-3]}$$

Duty_C-Duty_V are limit values preset for each color, with reference to type of ink and print medium.

Limits as to ink quantities for color mixtures of two colors may be given by the following equations, for example.

$$C+M \leq \text{Duty\_CM}$$

$$C+Y \leq \text{Duty\_CY}$$

$$C+R \leq \text{Duty\_CR}$$

$$C+V \leq \text{Duty\_CV}$$

$$M+Y \leq \text{Duty\_MY}$$

$$M+R \leq \text{Duty\_MR} \qquad \text{[Equation 1-4]}$$

While these limits are imposed for combinations of any two inks, examples are given for six of these combinations. Duty_CM-Duty_MR are limit values preset for combinations of inks, with reference to type of ink and print medium.

As ink duty limits, there may also be established limits regarding combinations of any kinds of inks, such as mixtures of three colors, mixtures of four colors, etc.

Ink duty limits such as the above (Condition 1-1) can be represented by planes (not shown) in the primary color space depicted in FIG. 13(b), using hypothetical tone values for the colors CMY derived using substitution ink quantities. The area enclosed by the planes is an area in which ink duty limits are met. Thus, provided that hypothetical tone values for CMY for a particular color which is to be reproduced by ink quantities for the colors CMYRV lie within the area enclosed by these planes, each of the ink quantities meets the ink duty limits, whereby reproduction is possible using chromatic primary color inks C, M, Y and spot color inks R, V. In this Example, a mixture of chromatic primary color inks C, M, Y can be substituted by spot color inks R, V in quantities smaller than total ink quantity for each ink, based on the substitution ink quantities indicated in FIGS. 5(b), 5(c). That is, the use of spot color inks R, V can reproduce higher saturation with comparable ink amount as that of a mixture of chromatic primary color inks C, M, Y. As a result, by utilizing chromatic primary color inks CMY and spot color inks RV, it becomes possible to reproduce a wider range of color than that reproducible with chromatic primary color inks CMY only.

Extended chromatic color em is depicted in FIG. 13(b). Extended chromatic color em is located in the outer shell plane that meets ink duty limits (Condition 1-1), i.e., the reproduction color outer shell plane (not shown). Extended chromatic color em is also situated on a line passing through the origin W and the outermost shell chromatic color m. That is, the extended chromatic color em is situated at the intersection of the reproduction color outer shell plane with a line segment line passing through the origin W and the outermost shell chromatic color m. In other words, the extended chromatic color em is a color represented by the longest extended chromatic color vector having the same direction as the outermost shell chromatic color vector representing the outermost shell chromatic color m in the primary color space; furthermore an outermost shell color separation ink quantity set for reproducing the extended chromatic color em lies within ink duty limits.

Such extended chromatic color em may be calculated by any of various methods. For example, sequential approximation may be made by repeating the processes of selecting a color in the primary color space, converting chromatic primary color ink into spot color ink, calculating a color separation ink quantity set, and judging whether the color separation ink quantity set meets ink duty limits (Condition 1-1). Alternatively, calculation can be performed using a so-called linear programming method, on the basis of substitution ink quantity and ink duty limit (Condition 1-1) equations or the like. In this case the series of steps S120-S130 (FIG. 12) would be executed one time.

In this way, by calculating extended chromatic color em whose outermost shell color separation ink quantity set meets ink duty limits (Condition 1-1), extended chromatic color em situated in the same direction as the outermost shell chromatic color and having the largest tone value can be derived within a range of good picture quality when the color is printed.

In Step S140 in FIG. 12, calculation of a color separation ink quantity set P corresponding to input color I (FIG. 13(a)) is performed. In this Step S140, first, calculation is performed to derive an outermost shell color separation ink quantity set emp for extended chromatic color em. Outermost shell color separation ink quantity set emp consists of values previously calculated for the purpose of determining whether ink duty limits (Condition 1-1) are met, when calculating extended chromatic color em. In the event of numerous printable inks, there is a high degree of freedom in substitution between chromatic primary color inks and spot color inks. Thus, in some instances it may be possible to select combinations of a plurality of types of ink in the range meeting ink duty limits (Condition 1-1), for the outermost shell color separation ink quantity set emp corresponding to the extended chromatic color em. In this Example, in such instances, the combination having the smallest total ink quantity is selected from among the plurality of combinations, for use as the outermost shell color separation ink quantity set emp.

Figure 13C:
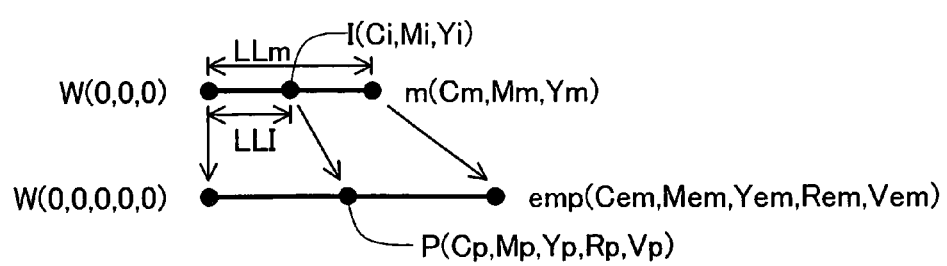

Next, calculations are performed to derive a provisional color separation ink quantity set P on the basis of the outermost shell color separation ink quantity set. FIG. 13(c) is a simplified illustration of relationships between input color I and a provisional color separation ink quantity set P. In this Example, a value obtained by multiplying the outermost shell color separation ink quantity set emp by the ratio of the length LLI of the vector indicating input color I to the length LLm of the vector indicating the outermost shell chromatic color m is used as the provisional color separation ink quantity set P. At this time, the color separation ink quantity set corresponding to the outermost shell chromatic color m is the outermost shell color separation ink quantity set emp. Any colors between the origin W and the outermost shell color separation ink quantity set emp are reproducible by the specific combinations of print medium and ink set. Thus, the range of color reproducible with a specific combination of print medium and ink set can be utilized effectively. By calculating provisional color separation ink quantity set P so as to be proportional to length LLI in this way, provisional color separation ink quantity set P can be calculated readily for input color I. In addition to relationships among input color I and lengths LLI, LLm, provisional color separation ink quantity set P can also be calculated directly by a linear programming method, on the basis of the substitution ink quantity and ink duty limit (Condition 1-1) equations, or the like. In this case, the series of Steps S120-S140 (FIG. 12) will be executed all at once. Color to be reproduced by the provisional color separation ink quantity set P corresponds to a reproduction color (i.e. color to be reproduced on a print medium) associated with the input color I.

In Step S150 in FIG. 12, calculation of a final color separation ink quantity set O is performed on the basis of the provisional color separation ink quantity set P. The final color separation ink quantity set O is derived by performing substitution of chromatic primary color inks with spot color inks in accordance with substitution ink quantities. Accordingly, color reproduced by the final color separation ink quantity set O will substantially match a color to be reproduced by the provisional color separation ink quantity set P. Here, substitution of chromatic primary color inks with spot color inks is executed in consideration of improving graininess. Any of the processing methods described earlier (FIG. 9-FIGS. 11(a), 11(b)) or the various methods described hereinafter can be used as the process for calculating final color separation ink quantity set.

Sequentially execution of the processes of Steps S100-S150 provides a final color separation ink quantity set O expressed in a reproduction color system that is associated with an input color I expressed in a primary color system. The final color separation ink quantity set O derived in this manner can be used as the second tone value set in Step S20 of FIG. 6.

In Step S160 of FIG. 12, a decision is made as to whether final color separation ink quantity sets have been calculated for all input colors. In the event that calculation of all final color separation ink quantity sets has not been completed, the processes of Step S120-S150 are repeated; if completed, the process terminates.

In order to reduce further the time required for the color separation process, it is preferable to limit the number of outermost shell chromatic colors for executing the series of processes. At this time, in the event that there is no outermost shell chromatic color corresponding to an input color on which it is desired to perform a color separation process, a plurality of final color separation ink quantity sets that approximate input color can be interpolated, and a corresponding final color separation ink quantity set calculated. At this time, it is preferable to prepare in advance a number of outermost shell chromatic colors, such that straight lines connecting outermost shell chromatic colors and the origin W are distributed throughout the entire range of the color solid. By so doing, large interpolation error of a color separation ink quantity set in specific areas of a color solid can be reduced.

In the manner described above, in this Example, determinations of extended chromatic color em and outermost shell color separation ink quantity set are made so as to meet the following three conditions:

(1-i) outermost shell color separation ink quantity set is within ink duty limits;

(1-ii) length of the extended chromatic color vector is the greatest length within the range reproducible by the ink set; and (1-iii) total ink quantity of the outermost shell color separation ink quantity set for reproducing the extended chromatic color em is the smallest possible.

Even where not all of these conditions are met, the color reproduction range can nevertheless be extended if an extended chromatic color em has higher saturation than an outermost shell chromatic color m. For example, even where condition (1-ii) is not met, so that the extended chromatic color vector is not the longest, if it is configured so as to be longer than the outermost shell chromatic color vector, the color reproduction range can be extended.

In order to extend color reproduction range over a wider range of hue, it is preferable to make the extended chromatic color vector longer than the outermost shell chromatic color vector, in a wider hue range. Here, the hue range over which an extended chromatic color vector can be lengthened is a range that varies depending on hue of the useable spot color inks. For a spot color ink, the color reproduction range of area having hue close to the hue of the spot ink can be extended. Thus, by enabling use of a larger number of spot color inks of mutually different hues, extended chromatic color vector can be made longer than the outermost shell chromatic color vector, in a wider hue range.

As described hereinabove, in this Example, there is performed a color separation process that effectively utilizes a reproducible color range using chromatic primary color inks and spot color inks. Thus, printing with an extended color reproduction range can be carried out. Also, since the color separation process is carried out on the basis of an extended chromatic color situated at the intersection point of the reproduction color outer shell plane with a straight line connecting the origin and outermost shell chromatic color, color separation process results may be derived readily, even with an increased number of types of useable inks.

C3. Examples 1-3 of Final Color Separation Ink Quantity Calculation Process in Embodiment 1

C3-1. Example 1 of Final Color Separation Ink Quantity Calculation Process in Embodiment 1:

In this final color separation ink quantity set calculation process, a final color separation ink quantity set O is calculated using the provisional color separation ink quantity set P for an input color I. The final color separation ink quantity set O is calculated such that substantially identical color to provisional color separation ink quantity set P is reproduced in a range meeting ink duty limits (Condition 1-1). In order to reproduce substantially identical color to provisional color separation ink quantity set P, a combination of ink quantities derived by substituting some ink quantities of the provisional color separation ink quantity set P according to the substitution ink quantities is used as the final color separation ink quantity set O. Here, the degree of freedom of ink substitution is higher the greater the number of types of ink that can be used. Thus, there exist a number of ink quantity combinations possible for use as the final color separation ink quantity set O. In such instances, calculation of the final color separation ink quantity set O is carried out with consideration to improving graininess of the image.

Figure 15:
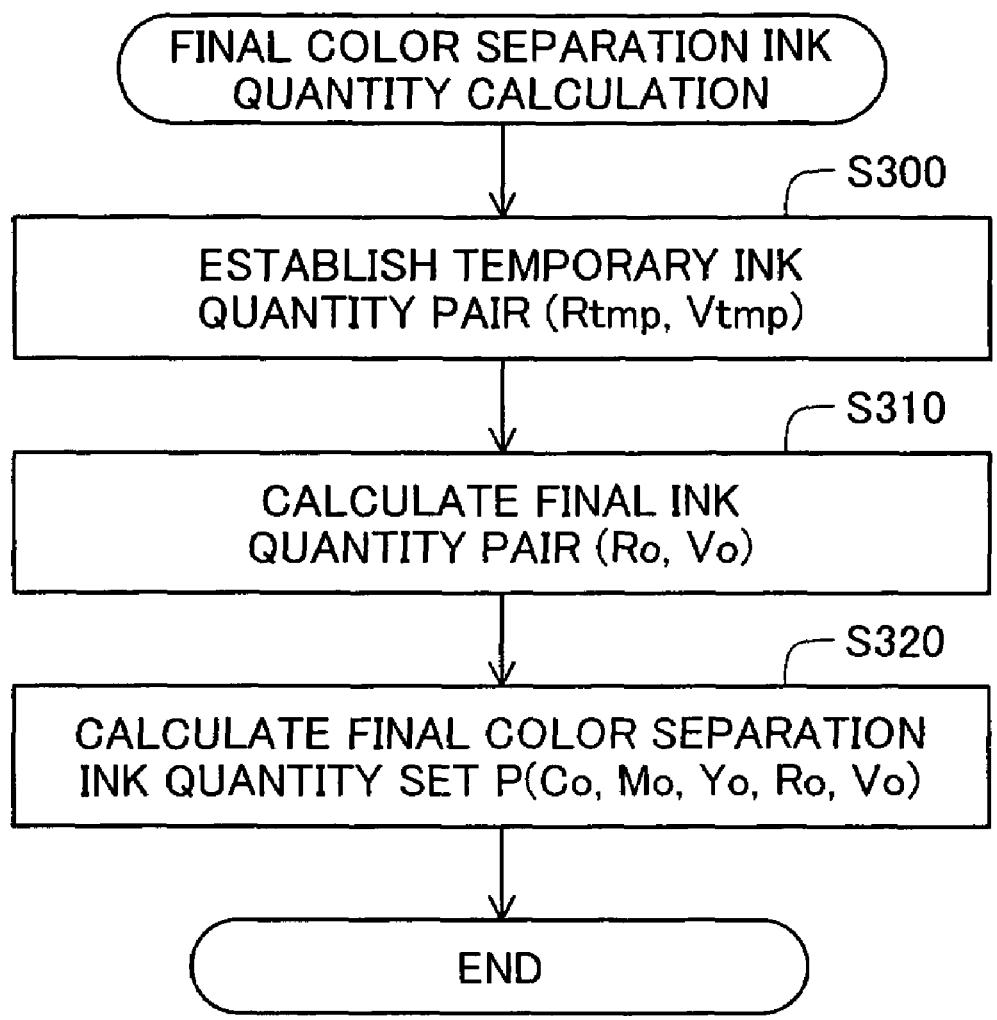
FIG. 15 is a flowchart depicting the processing routine for calculating a final color separation ink quantity set.

FIG. 15 is a flowchart depicting the processing routine for calculating a final color separation ink quantity set in this Example. In the initial Step S300, temporary ink quantities Rtmp, Vtmp for the spot color inks R, V are established. The temporary ink quantities Rtmp, Vtmp are used as indices for calculating final color separation ink quantities Ro, Vo of the spot color inks R, V in Step S310, described later.

FIG. 16($a$) is a graph depicting a relationship between temporary ink quantity Rtmp and maximum ink quantity Rmax. FIG. 16($b$) is a graph depicting a relationship between the proportion k of temporary ink quantity Rtmp to maximum ink quantity Rmax, and maximum ink quantity Rmax.

Maximum ink quantity Rmax is the maximum value that can be assumed by ink quantity of red ink R when ink quantities of a provisional color separation ink quantity set P is substituted with red ink R on the basis of the substitution ink quantities. In this Example, maximum ink quantity Rmax represents maximum value when ink duty limits are not taken into consideration. Accordingly, in some instances the maximum value of the red ink R in the final color separation ink quantities will be smaller than maximum ink quantity Rmax. A maximum value taking ink duty limits into consideration could be used instead.

In this Example, the design is such that temporary ink quantity Rtmp is smaller, the smaller the value of maximum ink quantity Rmax, as shown in FIG. 16($a$). Also, the design is such that the proportion k of temporary ink quantity Rtmp to maximum ink quantity Rmax is smaller, the smaller the value of maximum ink quantity Rmax, as shown in FIG. 16($b$). In this example, two specific values Rstart, Rend are set for the maximum ink quantity Rmax. Over a first range R11 in which Rmax≦Rstart, the setting is Rtmp=0 (k=0). Over a third range R13 in which Rend≦Rmax, the setting is Rtmp=Rmax (k=1). Over a second range R12 in which Rstart<Rmax<Rend, temporary ink quantity Rtmp is set so as to change in linear fashion.

These settings in relation to temporary ink quantity Rtmp may be understood as follows. Spot color ink is substitutable for a plurality of chromatic primary color inks. Thus, where spot color ink is used preferentially, ink quantities of the plurality of chromatic primary color inks according to the substitution ink quantities are reduced, so that a smaller total number of ink dots is recorded onto the print medium. On the other hand, where chromatic primary color ink color mixtures are used preferentially, the total number of ink dots is greater. Such difference in the number of ink dots depending on ink quantity combination is particularly marked in instances where a chromatic primary color ink color mixture may be substituted by spot color ink in a smaller quantity than the total value of the substitution ink quantities. Also, graininess in a reproduced area (roughness of an image) tends to stand out more the smaller the number of ink dots. Thus, it is preferable in terms of improving image graininess to increase the number of ink dots in areas having smaller ink quantity, i.e., fewer ink dots, by means of using chromatic primary color ink mixtures in place of spot color ink. In the example of FIGS. 16($a$) and 16($b$), the proportion k is designed to be smaller in association with smaller levels of maximum ink quantity Rmax. Thus, by making ink quantity of red ink R as small as the temporary ink quantity Rtmp, it is possible to improve graininess in a reproduced area.

In the example of FIG. 16($a$), Rtmp is kept zero over the first range R11. That is, over the range of small ink quantity, temporary ink quantity Rtmp is set to a value (namely zero) that maximizes the number of ink dots without the use of spot color ink. By setting the ink quantity of red ink R to zero in this way, standing out of ink dots of red ink R can be avoided.

Here, the first value Rstart refers to an ink quantity such that, as long as the maximum ink quantity is equal to or greater than this value, ink dots will not readily stand out even if red ink R is used. Such a first value Rstart could be established, for example, based on a sensory test such as the following. First, a gradation pattern in which red ink R ink quantity per unit of area varies from 0 to 100% is reproduced with a mixture of chromatic primary color inks C, M, Y. Ink dots of red ink R are then printed at appropriate intervals in the pattern. In the small ink quantity range, red ink R dots tend to stand out, but in the large quantity range, red ink R dots tend not to stand out. The ink quantity at which dots begin to not stand out can be designated as Rstart.

In the example of FIG. 16($a$), the setting Rtmp=Rmax is used in the third range R13. That is, over a range in which ink quantity is particularly large, temporary ink quantity Rtmp is set to a value that preferentially uses red ink R (i.e., the maximum ink quantity Rmax). By setting the ink quantity for red ink R to a large value in this way, total ink quantity used can be minimized. As a result, savings in quantity of ink used are provided, and wrinkling of print media can be avoided.

The second value Rend could be established, for example, based on a sensory test such as the following. First, a gradation pattern in which red ink R ink quantity per unit of area varies from 0 to 100% is reproduced with a mixture of chromatic primary color inks C, M, Y. In the same manner, a gradation pattern in which red ink R quantity per unit of area varies from 0 to 100% is reproduced using red ink R. In the small ink quantity range, the gradation pattern produced with the color mixture has more dots and accordingly improved graininess. In the large ink quantity range, the number of ink dots is large in either of the two gradation patterns, so differences in graininess become less apparent. The two gradation patterns are compared, and the ink quantity at which difference in graininess between the two begins to disappear is designated as the second value Rend.

The maximum ink quantity Rmax can be considered as an index value indicative of lightness of input color I, that is, a lightness parameter value correlated to reproduction color lightness. In a bright area, the ink quantity to reproduce each color is small. Thus, maximum ink quantity Rmax of red ink R is small as well. On the other hand, in a dark area, the ink quantity to reproduce each color is large. Thus, in areas where red ink R is used, maximum ink quantity Rmax of red ink R is large as well. That is, a smaller value of maximum ink quantity Rmax indicates a lighter area, and a large value indicates a darker area. Thus, the temporary ink quantity Rtmp and proportion k given in FIGS. 16(a) and 16(b) can be considered as being set so as to be smaller in association with higher lightness of an input color I.

Temporary ink quantity Rtmp is designed to vary continuously over the entire range for maximum ink quantity Rmax. By so doing, over gradation areas in which ink quantity varies continuously, sharp changes in ink quantity of each color component, and resulting standing out of boundaries, can be avoided. Temporary ink quantity Rtmp is not limited to an arrangement whereby it varies in linear fashion with respect to maximum ink quantity Rmax; it could instead be designed to vary smoothly using a curve, for example.

Figure 16A:
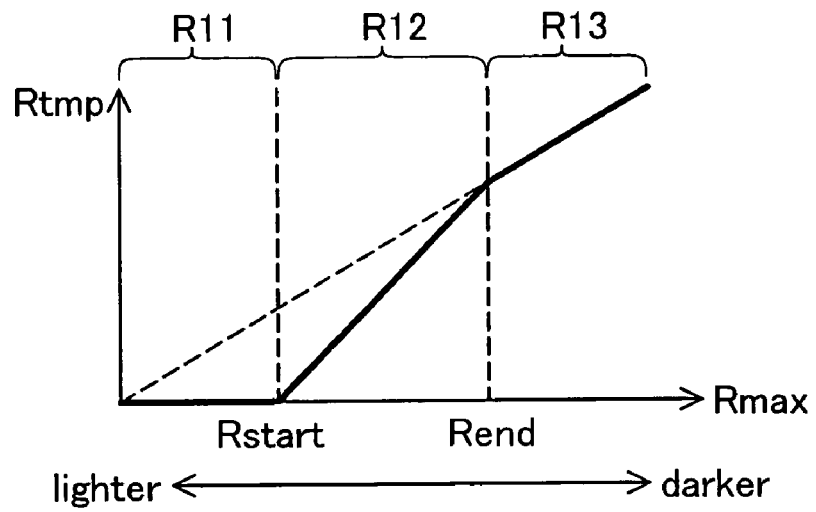
FIGS. 16(a), 16(b) show temporary ink quantities.
Figure 16B:
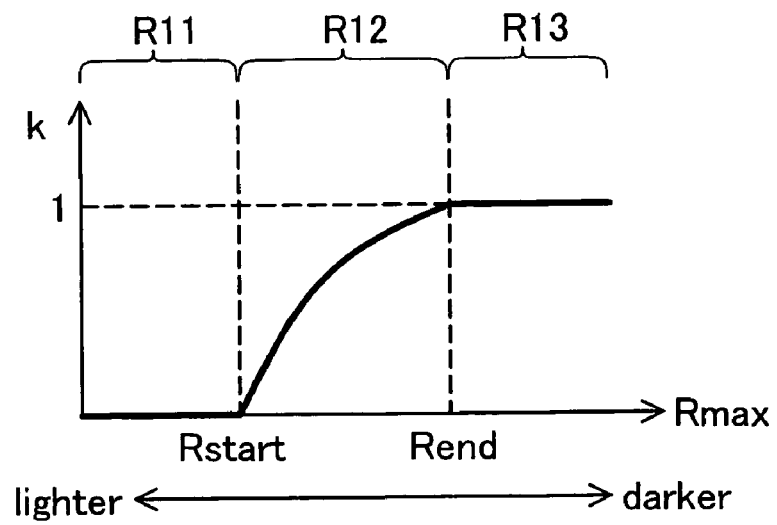

In the example of FIG. 16(a), temporary ink quantity Rtmp of red ink R is calculated; however, temporary ink quantity of other types of spot color ink can be calculated in the same manner. In any case, the design is such that the proportion of temporary ink quantity to maximum ink quantity decreases with smaller maximum ink quantity. By so doing, the number of ink dots can be increased by preferentially using chromatic primary color ink in place of spot color ink so that graininess can be improved.

In Step S310 in FIG. 15, calculation of final color separation ink quantities Ro, Vo of the spot color inks R, V is performed on the basis of the temporary ink quantities Rtmp, Vtmp of the spot color inks R, V established in Step S300 described earlier. As noted, temporary ink quantities Rtmp, Vtmp are ink quantities calculated giving consideration mainly to graininess. Thus, in some instances, a combination of ink quantities using Rtmp, Vtmp may not meet ink duty limits (Condition 1-1). Also, where temporary ink quantities Rtmp, Vtmp are used, in some instances it may not be possible to reproduce the provisional color separation ink quantity set P derived in Step S140 of FIG. 12. In such a case, in Step S310, ink quantities close to temporary ink quantities Rtmp, Vtmp in a range meeting these limits are used as final color separation ink quantities Ro, Vo.

FIGS. 17(a)-17(d) illustrate calculation of a color coordinate point Prv(Ro, Vo) for a final color separation ink quantity pair. FIGS. 17(a)-17(d) show a two-dimensional color space representing ink quantities for the colors RV as base vectors. The horizontal axis represents red ink R quantity and the vertical axis represents violet ink V quantity. Ink quantity combinations of red ink R and violet ink V are show as dots in the drawings.

Figure 17A:
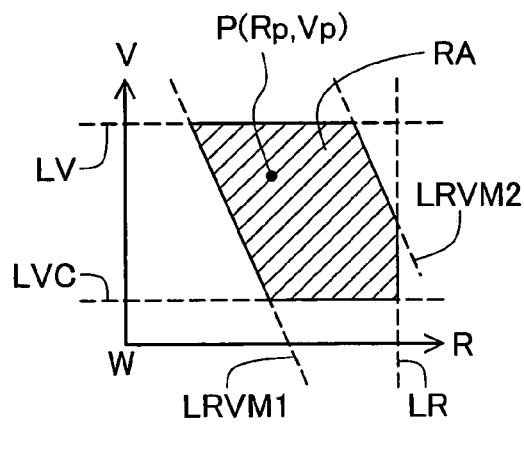
FIGS. 17(a)-17(d) are simplified illustrations of calculating final color separation ink quantities of spot color inks.

FIG. 17(a) illustrates a range of values assumable by final color separation ink quantities Ro, Vo. Final color separation ink quantities Ro, Vo are set within a permissible range meeting the following conditions.

(Condition 1-1b) Final color separation ink quantities for the colors CMYRV meet ink duty limits.

(Condition 1-2b) Final color separation ink quantities for the colors CMYRV are combinations of ink quantities that can be derived from provisional color separation ink quantity set P by substituting ink on the basis of substitution ink quantities (FIGS. 5(b) and 5(c)).

(Condition 1-3b) As regards color components with temporary ink quantity smaller than provisional color separation ink quantity, final color separation ink quantity is equal to or less than provisional color separation ink quantity.

"Condition 1-1b" is the same as "Condition 1-1" described earlier. This condition can be represented by straight lines in FIG. 17(a). Accordingly, the permissible range can be represented by an area enclosed by lines corresponding to this condition. In the example of FIG. 17(a), to simplify the description, an area enclosed by five straight lines LR-LRVM2 described hereinbelow will be designated as permissible area RA.

Straight line LR is a line corresponding to the upper limit of red ink R. The ink quantity of red ink R can be increased by substituting each ink according to substitution ink quantities (FIG. 5). However, the upper limit value therefor is subject to the restriction of the ink duty limit for red ink R, and to the restriction of the maximum ink quantity for red ink R which is determined by provisional color separation ink quantity set P and the substitution ink quantities. Straight line LR corresponds to the upper limit meeting these restrictions.

Straight line LV is a line corresponding to the upper limit for violet ink V. The meaning of this line is the same as for line LR described above.

Straight line LVC is a line corresponding to the lower limit for violet ink V. It is possible to decrease the ink quantity of violet ink V by substituting the same with the two chromatic primary color inks C, M; this, however, increases the ink quantities of the chromatic primary color inks. Accordingly, the lower limit for violet ink V is subject to the restriction of ink duty limits for the chromatic primary color inks. Straight line LVC corresponds to the lower limit meeting these restrictions.

Straight line LVRM1 is a line corresponding to a common lower limit for the two inks R, V. Ink quantities of red ink R and violet ink V can both be decreased by substitution with two chromatic primary color inks. Instead of this, the ink quantity of the principal component primary color ink common to both inks R, V (FIGS. 5(b), 5(c); in this example, magenta M) increases. The ink quantity of magenta ink M is subject to the restrictions of the ink duty limit for magenta ink M, and the maximum ink quantity for magenta ink M determined by provisional color separation ink quantity set P and substitution ink quantities. Accordingly, the lower limit for ink quantity of the two inks R, V is restricted to a range in which it is possible to share the upper limits for magenta ink M quantity with one another. Under such a restriction, lower limits for the two inks R, V are inversely proportional. Straight line LRVM1 corresponds to the lower limit of the two inks R, V determined in this manner.

Straight line LVRM2 is a line corresponding to a common upper limit for the two inks R, V. Ink quantities of red ink R and violet ink V can both be increased by substitution them for two chromatic primary color inks. Instead of this, the ink quantity of the principal component primary color ink common to both inks R, V (magenta M) decreases. The upper limit for ink quantity of the two inks R, V is restricted to a range in which it is possible to share the maximum ink quantity of magenta ink M with one another. Under such a restriction, upper limits for the two inks R, V are inversely proportional. Straight line LRVM2 corresponds to the upper limit of the two inks R, V determined in this manner.

In this Example, among the spot color inks, the one whose temporary ink quantity is less than its provisional color separation ink quantity are subject to the restriction that its final color separation ink quantity is equal to or less than its provisional color separation ink quantity (Condition 1-3b). For example, in the event that the temporary ink quantity Rtmp of red ink R is smaller than the provisional color separation ink quantity Rp, final color separation ink quantity Ro is limited to a value equal to or less than the provisional color separation ink quantity Rp. A small temporary ink quantity means that adjusting the ink quantity of that color to a low level is desirable in terms of improving graininess. Of a plurality of color separation ink quantity sets derived by substituting some ink quantities according to the substitution ink quantities on the basis of provisional color separation ink quantity sets, those color separation ink quantity sets having small ink quantities of spot color inks will have less readily apparent graininess, due to the greater total number of ink dots. Accordingly, for inks whose temporary ink quantity is smaller than the provisional color separation ink quantity, final color separation ink quantity is prevented from becoming larger than provisional color separation ink quantity.

In Step S310 in FIG. 15, in permissible range RA derived in the above manner, a combination of ink quantities close to the color coordinate point Prv(Rtmp, Vtmp) of the temporary ink quantity pair are used as the final color separation ink quantities Ro, Vo. The following description of calculation of final color separation ink quantities Ro, Vo assumes the relationship between permissible range RA and temporary ink quantity pair color coordinate point Prv(Rtmp, Vtmp) to fall under three separate cases.

(Case 1-1) The temporary ink quantity pair color coordinate point Prv is located inside permissible range RA.

(Case 1-2) The temporary ink quantity pair color coordinate point Prv is located outside permissible range RA, and a line connecting the origin W and the temporary ink quantity pair color coordinate point Prv passes through permissible range RA.

(Case 1-3) The temporary ink quantity pair color coordinate point Prv is located outside permissible range RA, and a line connecting the origin W and the temporary ink quantity pair color coordinate point Prv does not pass through permissible range RA.

Figure 17B:
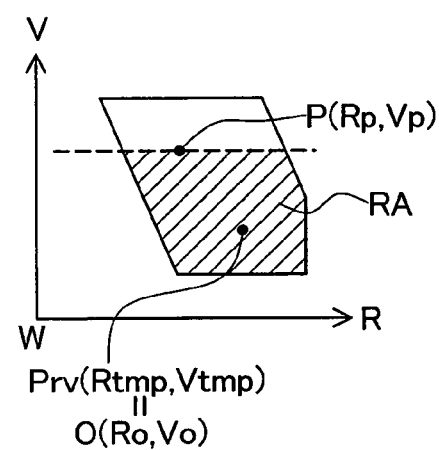

(Case 1-1):

FIG. 17(b) depicts a case in which temporary ink quantity pair color coordinate point Prv is located inside permissible range RA. In this case, temporary ink quantities Rtmp, Vtmp are used as-is as final color separation ink quantities Ro, Vo. By so doing, final color separation ink quantities Ro, Vo that are favorable in terms of improving graininess can be obtained. In the example of FIG. 17(b), since the violet ink V temporary ink quantity Vtmp is smaller than the provisional color separation ink quantity Vp, the permissible range RA is restricted to the range Vo≦Vp.

Figure 17C:
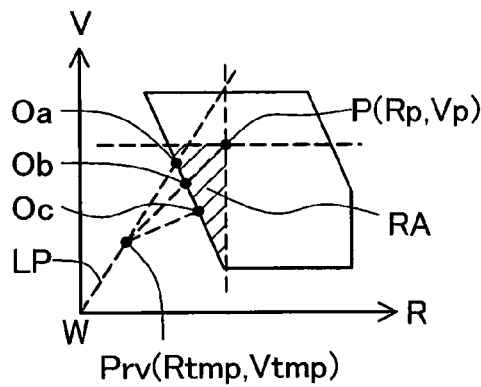

(Case 1-2):

FIG. 17(c) depicts a case in which temporary ink quantity pair color coordinate point Prv is located outside permissible range RA, and a straight line LP connecting the origin W and the temporary ink quantity pair color coordinate point Prv passes through permissible range RA. In this case, an ink quantity combination represented by, of the intersection points of line LP with the boundaries of permissible range RA, the point Oa closest to the temporary ink quantity pair color coordinate point Prv is used for the final color separation ink quantities Ro, Vo. Line LP is a straight line maintaining a constant ratio of temporary ink quantities Rtmp, Vtmp. By using a point on such a line LP, ink quantity of one of the spot color inks R, V can be reduced appropriately, while preventing the other ink quantity from not becoming sufficiently small. In other words, by using a point on line LP, final color separation ink quantities Ro, Vo can be calculated while taking into consideration adverse effects of each spot color ink on graininess.

The ink combination used as the final color separation ink quantity set is not limited to the combination represented by point Oa described above. Any combination represented by a point situated at a location inside permissible range RA and close to temporary ink quantity pair color coordinate point Prv can improve graininess. For example, an ink quantity combination represented by the intersection point Ob of a boundary of permissible range RA with a straight line connecting provisional color separation ink quantity set P and temporary ink quantity pair color coordinate point Prv could be used. It is also possible to use a combination represented by a point Oc situated at a location inside permissible range RA, and closest to temporary ink quantity pair color coordinate point Prv. In any event, by using a combination of ink quantities represented by a point situated at a location inside permissible range RA and close to temporary ink quantity pair color coordinate point Prv, calculation of final color separation ink quantities Ro, Vo can be carried out in consideration of improving graininess.

Figure 17D:
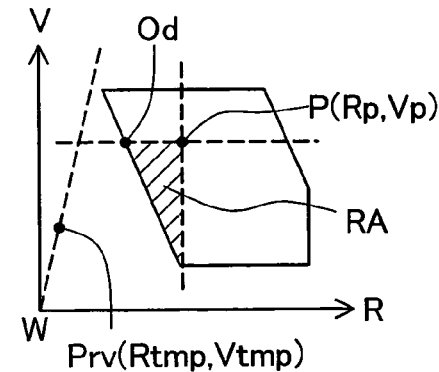

(Case 1-3):

FIG. 17(d) depicts a case in which temporary ink quantity pair color coordinate point Prv is located outside permissible range RA, and a straight line LP connecting the origin W and the temporary ink quantity pair color coordinate point Prv does not pass through permissible range RA. In this case, an ink quantity combination represented by a point Od—which is a point inside the permissible range RA that minimizes the final color separation ink quantity Ro relating to the red ink R which, of the temporary ink quantities Rtmp, Vtmp, has the smaller value Rtmp—is used as the final color separation ink quantities Ro, Vo. Ink having the smallest temporary ink quantity has the greatest effect on graininess. Accordingly, by using the point Od at which the ink quantity of this ink is minimized, it is possible to improve graininess in the reproduced image area.

The combination of inks used as the final color separation ink quantity set is not limited to the combination represented by the aforementioned point Od. Any combination represented by a point situated inside the permissible range RA and close to the temporary ink quantity pair color coordinate point Prv can improve graininess.

In the event that all temporary ink quantities Rtmp, Vtmp of the spot color inks are zero, graininess can be improved with any combination represented by a point situated inside the permissible range RA and close to the origin W. As such a point, it would be possible, for example, to use the intersection point (not shown) of a permissible range RA boundary with a straight line connecting the color coordinate point P of the provisional color separation ink quantity set and the origin W. A point that minimizes distance from the origin W may also be used.

In Step S320 in FIG. 15, calculation of a final color separation ink quantity set for all inks making the ink set is performed. The ink quantities calculated in Step S310 are used as the final color separation ink quantities Ro, Vo for the spot color inks. Final color separation ink quantities Co, Mo, Yo for the chromatic primary color inks are calculated on the basis of the provisional color separation ink quantity set P and substitution ink quantities.

As described hereinabove, the final color separation ink quantity set calculation process of this Example is carried out in consideration of improving graininess. Where an image area it is desired to reproduce is bright, ink quantity of each color of ink is smaller. At this time, since less spot color ink is used and more chromatic primary color ink is used, graininess can be improved.

In an area of particularly high lightness, the magnitude of each ink quantity of an ink set is smaller relative to ink duty limits. Accordingly, ink duty limits are met by a combination of greater ink quantities. As a result, where temporary ink quantities Rtmp, Vtmp of the spot color ink are zero, final color separation ink quantities Ro, Vo can be brought to zero. That is, in an area of particularly high lightness, color is reproduced without the use of spot color ink, and thus in such particularly bright areas, standing out of ink dots of spot color ink can be avoided.

In this Example, the final color separation ink quantity set calculation process is performed according to temporary ink quantities Rtmp, Vtmp established independently for each of the spot color inks, i.e. depending on the effect of each ink on graininess. As a result, graininess can be improved appropriately in consideration of effect of each spot color ink on graininess.

This sort of final color separation ink quantity set calculation process may be carried out in similar fashion even where more types of spot color ink are used. For example, where three spot color inks are used, first, a temporary ink quantity is calculated for each ink. Next, a combination of ink quantities represented by a point situated within a permissible range (represented by a solid in a color space in which the three ink quantities are represented by base vectors) and close to a point represented by a temporary ink quantity set is used as a final color separation ink quantity set of spot color ink. In this case as well, where a final color separation ink quantity set is calculated according to the positional relationship of the permissible range and a straight line passing through a point represented by a temporary ink quantity set, the final color separation ink quantity set can be calculated in consideration of the balance of effect of each spot color ink on graininess.

As described hereinabove, the final color separation ink quantity set calculation process of this Example is carried out in consideration of improving graininess, whereby roughness of images in bright areas thereof can be reduced.

Figure 18:
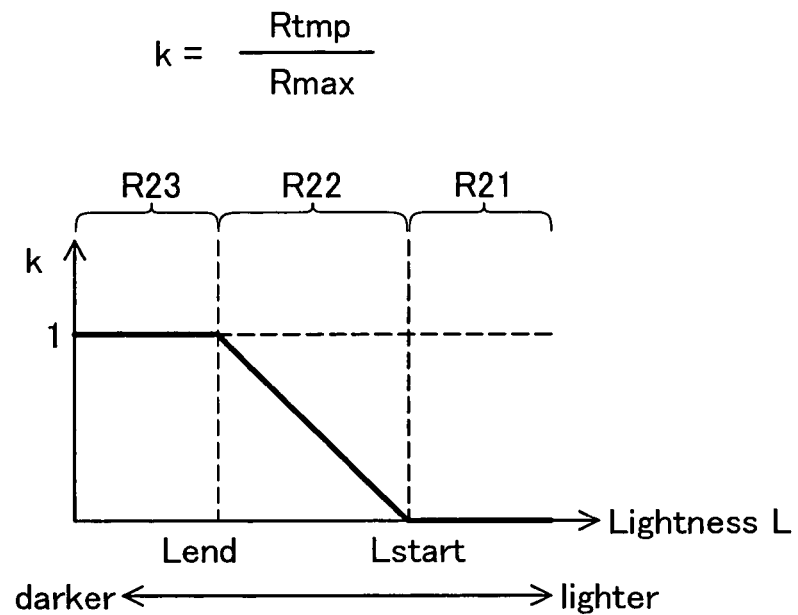
FIG. 18 is a graph of the relationship between lightness and the proportion of temporary ink quantity versus maximum ink quantity.

C3-2. Example 2 of Final Color Separation Ink Quantity Calculation Process in Embodiment 1:

A point of difference from Example 1 described hereinabove is that temporary ink quantity Rtmp is set depending on lightness L of a color to be reproduced. FIG. 18 is a graph showing a relationship of lightness L to the proportion k of temporary ink quantity Rtmp to maximum ink quantity Rmax.

Where provisional color separation ink quantity set P is expressed in a primary color space (FIG. 13(*a*)), for example, the distance between a point produced by projecting the point P onto the achromatic color axis (the straight line connecting the origin W and a point K) and the origin W may be used as lightness L of the color to be reproduced. Here, greater distance from the origin W indicates lower lightness. As the maximum ink quantity Rmax, there may be used the maximum value assumable by the value of ink quantity of red ink R, among combinations of ink quantities able to reproduce color substantially identical to the color to be reproduced by provisional color separation ink quantity set P.

In this Example, as shown in FIG. 18, the proportion k of temporary ink quantity Rtmp to maximum ink quantity Rmax is set so as to be smaller the higher the lightness L of the color to be reproduced, i.e. the brighter it is. Temporary ink quantity for the other spot color ink is set similarly. Accordingly, in an image area of high lightness L and small ink quantities of each ink, less spot color ink is used, and chromatic primary color ink is used preferentially to increase the number of ink dots, so that graininess can be improved.

In the brightest range R21 wherein Lstart≦L, the setting Rtmp=0 is used. As a result, in areas of particularly high lightness, colors are reproduced without the use of spot color ink, so that standing out of ink dots of spot color ink can be prevented. In the darkest range R23 wherein L≦Lend, the setting Rtmp=Rmax is used. As a result, in areas of particularly low lightness, colors are reproduced using spot color ink preferentially, thereby providing savings in quantity of ink used, and also preventing wrinkling of the print medium.

The values Lstart, Lend used to indicate specific magnitudes of lightness L can be set in the same manner as Rstart, Rend in FIG. 16(*a*). For example, they can be set on the basis of a sensory test by comparing a spot color ink gradation pattern reproduced while varying lightness L from minimum to maximum value, with a gradation pattern produced by mixture of chromatic primary color inks.

In this Example, as regards violet ink V, temporary ink quantity Vtmp depending on lightness L is established using the same method as for red ink R. Where even more spot color inks are used, temporary ink quantities can be established in similar fashion.

Figure 19:
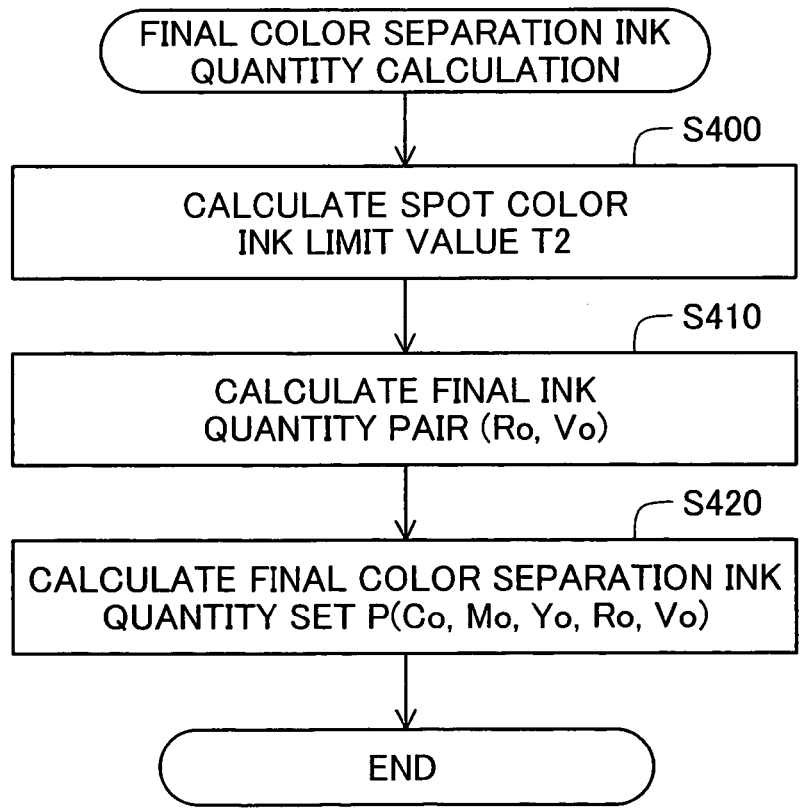
FIG. 19 is a flowchart depicting the processing routine for calculating a final color separation ink quantity set.

C3-3. Example 3 of Final Color Separation Ink Quantity Calculation Process in Embodiment 1:

FIG. 19 is a flowchart depicting the processing routine for calculating a final color separation ink quantity set in this Example. A point of difference from the preceding Examples is that the range of possible values of final color separation ink quantities of spot color inks is limited depending on lightness of input color (or reproduction color). In this Example, final color separation ink quantities Ro, Vo are established within a permissible range meeting the following conditions.

(Condition 1-1c) Final color separation ink quantities for the colors CMYRV meet ink duty limits.

(Condition 1-2c) Final color separation ink quantities for the colors CMYRV are combinations of ink quantities that can be derived from provisional color separation ink quantity set P by substituting inks on the basis of substitution ink quantities.

(Condition 1-4c) The sum of final color separation ink quantities of spot color inks is equal to or less than a spot color ink quantity limit value T2.

Conditions 1-1c, 1-2c are the same as conditions 1-1b, 1-2b described previously. The addition of Condition 1-4c is a point of difference from the earlier Examples.

Figure 20:
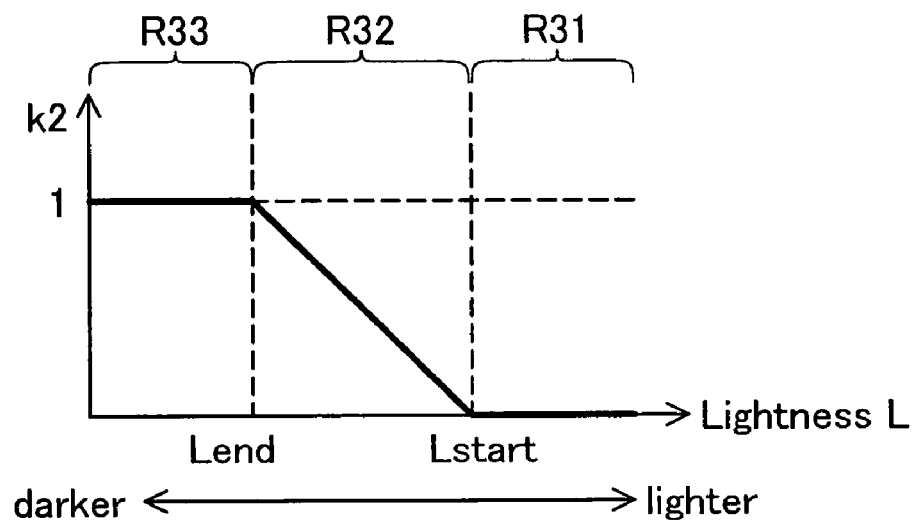
FIG. 20 is a graph of the relationship between lightness and the proportion of limit value to the maximum value assumable by the spot color ink quantity parameter.

In Step S400 in FIG. 19, a spot color ink quantity limit value T2 is established. FIG. 20 is a graph of the relationship between reproduction color lightness L and the proportion k2 of limit value T2 to the maximum value T2max assumable by the sum of final color separation ink quantities of spot color inks; the sum corresponds to a spot color ink quantity parameter in the invention.

As the maximum value T2max there may be used the maximum value possible for the sum of ink quantities of spot color inks R, V, among combinations of ink quantities able to reproduce color substantially identical to the color to be reproduced by provisional color separation ink quantity set P (for example S510 in FIG. 8 or S140 in FIG. 12). Alternatively, the maximum value possible for the sum of ink quantities of spot color inks R, V, among combinations of ink quantities able to reproduce lightness substantially identical to the lightness L of reproduction color to be reproduced by provisional color separation ink quantity set P.

A point of difference from the example of FIG. 18 is that instead of establishing a temporary ink quantity for each of the spot color inks R, V, an upper limit (limit value) T2 is established for the sum of ink quantities of spot color inks R, V (spot color ink quantity parameter). In the example of FIG. 20, proportion k2 is set so as to be smaller the higher the lightness L of the reproduction color, i.e. the brighter it is. Accordingly, in an image area of high lightness L and small ink quantities of each ink, the sum of ink quantities of spot color ink is smaller, and chromatic primary color ink is used preferentially to increase the number of ink dots, so that graininess can be improved.

In the brightest range R31 wherein Lstart≦L, the setting k2=0, i.e. T2=0, is used. As a result, in areas of particularly high lightness, colors are reproduced without the use of spot color inks, so that standing out of ink dots of spot color inks can be prevented. In the darkest range R33 wherein L≦Lend, the setting k2=1, i.e., T2=T2Max, is used. As a result, in areas of particularly low lightness, colors are reproduced using spot color inks preferentially, thereby providing savings in quantity of ink used, and also preventing wrinkling of the print medium.

In Step S410 of FIG. 19, calculation of final color separation ink quantities Ro, Vo of spot color inks R, V is performed on the basis of the spot color ink limit value T2 established in the aforementioned Step S400 of FIG. 19. In this Example, final color separation ink quantities Ro, Vo are determined on the basis of provisional color separation ink quantity P and spot color ink limit value T2, without calculating a temporary ink quantity pair Rtmp, Vtmp (FIG. 15, S300).

Figure 21A:
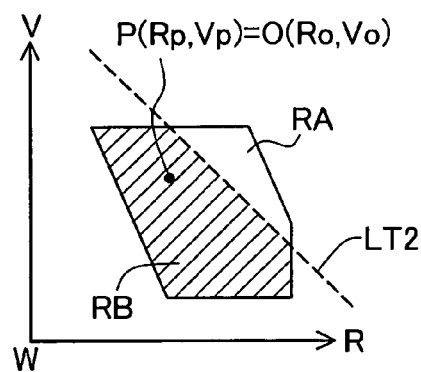
FIGS. 21(a)-21(c) are simplified illustrations of calculating final color separation ink quantities of spot color inks.

FIGS. 21(a)-12(c) illustrate calculation of final color separation ink quantities Ro, Vo of spot color inks. In the drawing, area RA is a permissible area meeting the aforementioned Conditions 1-1c and 1-2c. Also shown in the drawing is a straight line LT2 representing the aforementioned Condition 1-4c. A permissible area RB meeting the three conditions 1-1c, 1-2c, and 1-4c is indicated by hatching.

FIG. 21(a) depicts an instance in which a provisional color separation ink quantity set coordinate point P lies within permissible area RB. In this case, provisional color separation ink quantities Rp, Vp are used as final color separation ink quantities Ro, Vo.

Figure 21B:
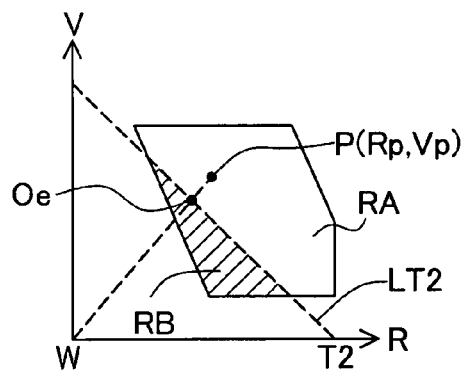

FIG. 21(b) depicts an instance in which a provisional color separation ink quantity set coordinate point P lies outside permissible area RB. In this case, an ink quantity combination represented by, of the intersection points of a straight line connecting provisional color separation ink quantity set coordinate point P to origin W, with the boundaries of permissible range RB, the point Oe closest to the provisional color separation ink quantity set coordinate point P is used for the final color separation ink quantities Ro, Vo. In this way, using a combination of ink quantities inside a permissible area RB that meets condition 1-4c, graininess can be improved.

The ink combination used as the final color separation ink quantity set is not limited to the combination represented by point Oe described above; any combination represented by a point situated inside permissible range RB can improve graininess.

Figure 21C:
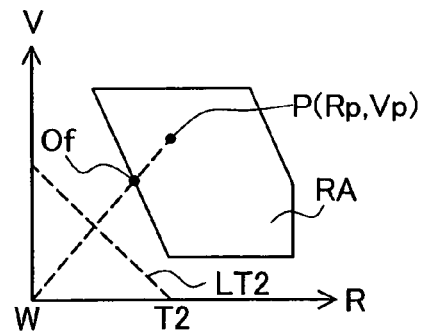

FIG. 21(c) depicts an instance in which there is no permissible area RB that meets all of the conditions 1-1c, 1-2c, and 1-4c. In this case, an ink quantity combination represented by, of the intersection points of a straight line connecting provisional color separation ink quantity set coordinate point P to origin W, with the boundaries of permissible range RA, the point Of closest to the origin W is used for the final color separation ink quantities Ro, Vo. By using a point close to the origin in this way, graininess can be improved.

The ink combination used as the final color separation ink quantity set is not limited to the combination represented by point Of described above; any combination represented by a point situated inside permissible range RA and close to the origin W can improve graininess.

In Step S420 of FIG. 19, calculation of a final color separation ink quantity set of all inks making up the ink set is performed. The ink quantities calculated in Step S410 are used as final color separation ink quantities Ro, Vo for the spot color inks. Final color separation ink quantities Co, Mo, Yo for the chromatic primary color inks are calculated on the basis of the provisional color separation ink quantity set P and substitution ink quantities.

In the manner described above, in the final color separation ink quantity set calculation process in this Example, a restriction on spot color ink quantity parameter is adjusted depending on input color (or reproduction color) lightness. Accordingly, since the possible range of values assumed by final color separation ink quantities of spot color inks is restricted depending on lightness of the input color (or reproduction color), final color separation ink quantities can be calculated with consideration to improving graininess. The lightness-dependent permissible range restriction is not limited to Condition 1-4c; any restriction of permissible range to a smaller range of ink quantity with lighter input color (or reproduction color) would be acceptable. For example, in a color space in which spot color ink quantities are represented as base vectors, distance from the origin to a point represented by the final color separation ink quantities Ro, Vo could be used as a spot color ink quantity parameter. By imposing on this parameter the restriction of being smaller in association with greater lightness of input color (or reproduction color), graininess can be improved. Additionally, a weighted average value or weighted average distance, weighted according to the tendency of ink dots of ink of each color to stand out, could be used as a spot color ink quantity parameter, restricting the magnitude thereof depending on lightness. The spot color ink quantity parameter is not limited to sum of ink quantities, distance, weighted average value, or weighted average distance as mentioned above; any characteristic that increases in magnitude with greater ink quantities of spot color inks would be acceptable. In this way, by imposing a condition that limits a spot color ink quantity parameter to a smaller range in association with greater lightness as represented by a lightness parameter value, it is possible to improve graininess more appropriately. This final color separation ink quantity set calculation process can be carried out in similar fashion even when a greater number of spot color inks are used.

As the final color separation ink quantity set calculation process S150 of the color separation process of this Example (FIG. 12), the method (FIG. 9-FIG. 11) employed in the final color separation ink quantity set calculation process S520 of the color separation process shown in FIG. 8 may be used instead of the various methods depicted in FIGS. 15-17, FIG. 18, and FIGS. 19-21. Similarly, as the color separation ink quantity set calculation process S520 of the color separation process shown in FIG. 8, any of the various methods (FIGS. 15-17, FIG. 18, and FIGS. 19-21) employed in the final color separation ink quantity set calculation process S150 of the color separation process of this Example (FIG. 12) may be used instead of the method depicted in FIG. 9-FIG. 11.

C4. Example 3 of Color Separation Process in Embodiment 1

Figure 22:
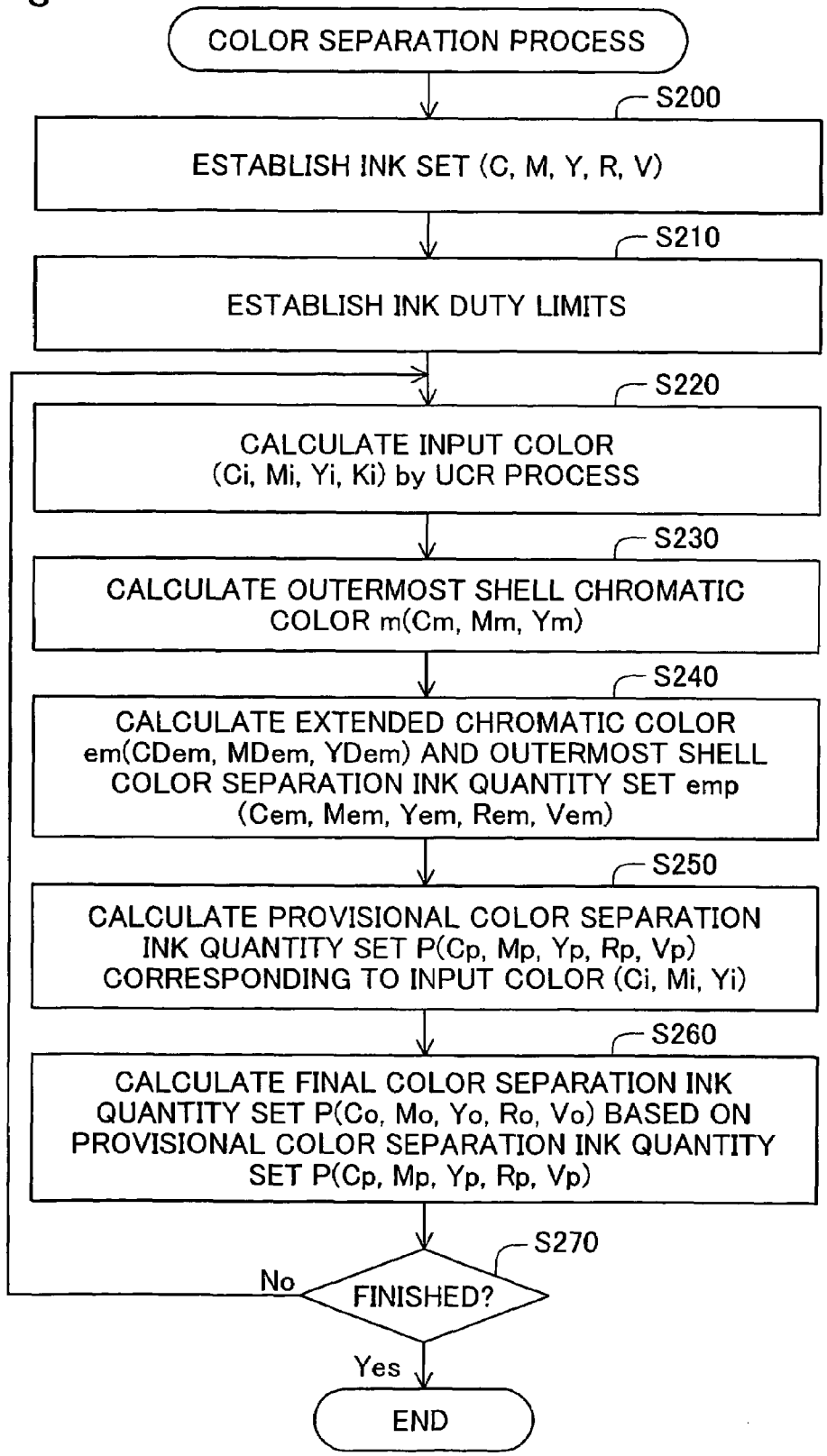
FIG. 22 is a flowchart depicting a color separation process processing routine.

FIG. 22 is a flowchart depicting a processing routine of a third Example of the color separation process in Embodiment 1. A point of difference with the color separation process example of FIG. 12 earlier is that an under color removal (UCR) process S220 using black ink K is executed. The UCR process of this Example is a process wherein some chromatic primary color ink C, M, Y tone values are substituted with black ink K tone values. As the UCR process may be implemented by various widely known methods, a detailed description will not be provided here.

In Step S200, an ink set composed of the chromatic primary color inks C, M, Y, the spot color inks R, V, and black ink K is established as the useable ink set.

Next, in Step S210, ink duty limits, which are limits as to ink quantity for each color of the ink set, are established. A difference with the ink duty limits in the Example shown in FIG. 12 is that they are established with consideration to the ink quantity of black ink K (described in detail later).

Next, in Step S220, the UCR process is executed on an input color targeted for color separation processing (for example, in Step S20 in FIG. 6, one represented by a primary color tone value set). As a result, an input color I represented by tone values Ci, Mi, Yi, Ki of the colors CMYK is obtained. Of these tone values, tone values Ci, Mi, Yi of the colors CMY are subjected to a color separation process using extended chromatic color em. The series of processes S230-S270 is the same as processes S120-S160 of the Example shown in FIG. 12. As a result, there are obtained color separation ink quantities Co, Mo, Yo, Ro, Vo for the tone values Ci, Mi, Yi of the colors CMY. For the black ink K, the tone value Ki obtained as the result in UCR process 220 is used as the color separation ink quantity Ko.

In this way, in the color separation process of Example 3, there is performed a color separation process that effectively utilizes the range of color possible to reproduce using black ink K in addition to chromatic primary color inks CMY and spot color inks RV. This makes it possible to perform printing with an additionally extended color reproduction range.

In this Example, it is preferable for the ink duty limit (Condition 1-1) described earlier to also include a limit that takes into consideration ink quantity of black ink K. For example, as regards limits on quantity of all inks, given in Equation 1-2, the sum of ink quantities of the colors CMYRV in conjunction with the ink quantity Ki of black ink K derived in Step S220 can be set so as to be equal to or less than Duty_T. By so doing, ejection of ink in quantities exceeding the limit of ink absorbency of the print medium can be avoided. As regards limits on ink quantity in the case of mixtures of several colors as well, limits can be established using ink quantity Ki of black ink K. As regards limits on ink quantity of black in K alone, these are preferably taken into consideration when calculating ink quantity Ki during the UCR process 220.

When the color separation process of this Example is implemented in Step S20 of the color conversion lookup table creation process illustrated in FIG. 6, the second tone value set consists of tone values represented by ink quantities of the chromatic primary color inks CMY, spot color inks RV, and black ink K. Thus, in Step S30, color patches reproduced using the colors CMYRVK are created.

D. Embodiment 2

The device arrangement described in FIG. 1-FIG. 5 and the color conversion lookup table creation process described in FIGS. 6 and 7 may also be implemented in Embodiment 2. Embodiment 2 differs from Embodiment 1 in terms of the color separation process method, described hereinbelow.

Figure 23:
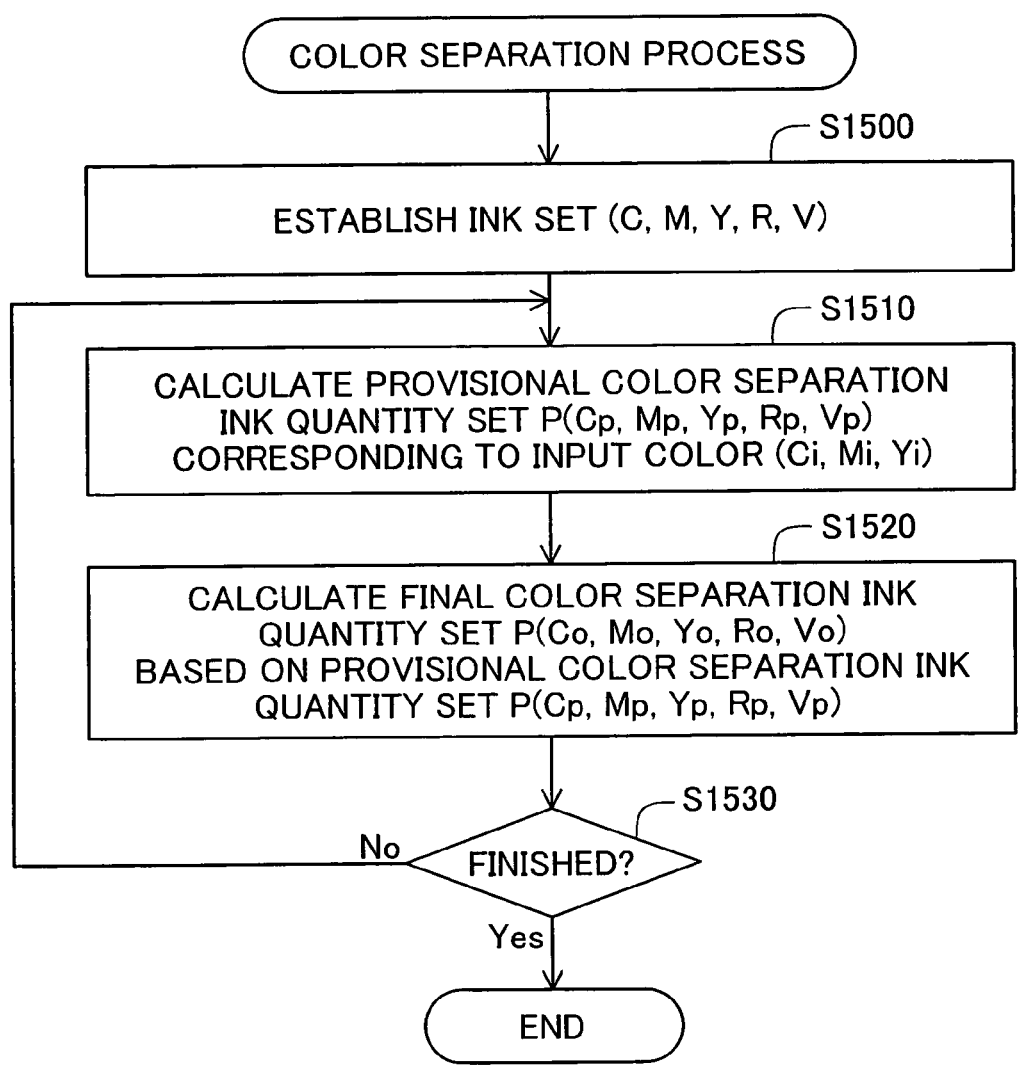
FIG. 23 is a flowchart depicting a color separation process processing routine.

D1. Details of Example 1 of Color Separation Process in Embodiment 2:

FIG. 23 is a flowchart depicting the processing routine of Example 1 of the color separation process in Embodiment 2. Steps S1500-S1530 in FIG. 23 are similar to Steps S500-S530 in FIG. 8, with the exception that the details of the routine of Step S1520, described hereinbelow, differ from the details of the routine of Step S520 (FIG. 9).

Figure 24:
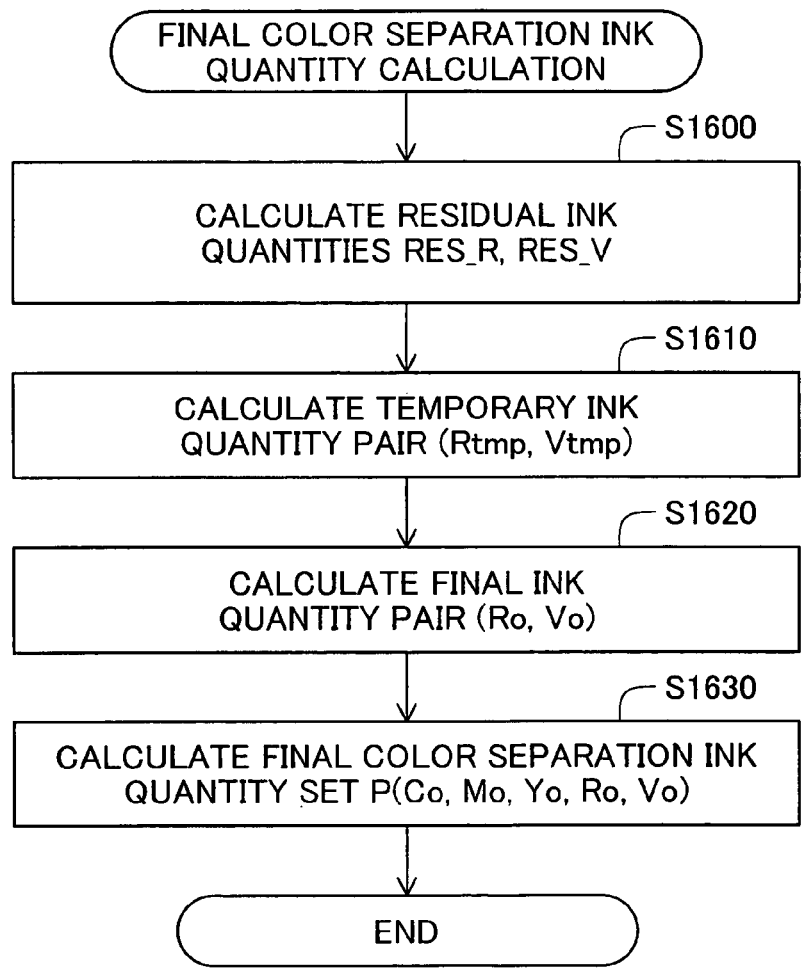
FIG. 24 is a flowchart depicting the processing routine for calculating a final color separation ink quantity set.

FIG. 24 is a flowchart depicting the details of the routine of Step S1520. In Step S1600, residual ink quantities RES_R, RES_V corresponding respectively to the two spot color inks R, V are determined from the provisional color separation ink quantity set P. Residual ink quantity is the sum of ink quantities of inks other than the spot color inks. In the next Step S1610, temporary ink quantities Rtmp, Vtmp of the spot color inks R, V are determined using residual ink quantities RES_R, RES_V.

FIGS. 25(a)-25(e) illustrate relationships between spot color ink usage rate and ink quantities of other inks. In the example of FIGS. 25(a)-25(e), in order to simplify the description, it is assumed that two types of ink, namely cyan ink C and magenta ink M, are utilizable as chromatic primary color inks, and one type of ink, namely violet ink V, is utilizable as spot color ink.

FIG. 25(a) illustrates the range of hue reproducible using cyan ink C and magenta ink M. Violet ink V has a hue between cyan ink C and magenta ink M. In FIG. 25(a), two colors ColA, ColB are shown. The two colors ColA, ColB have hues between violet ink V and cyan ink C. Color ColA has a hue close to that of violet ink V. Color ColB is a color derived by adjusting the hue of color ColA closer to cyan ink C.

FIG. 25(b) illustrates one example of ink quantities of the three inks C, M, V for reproducing color ColA. Since color ColA has a hue close to violet ink V, it is possible to reproduce using a large amount of violet ink V. Also, since color ColA has a hue between violet ink V and cyan ink C, it is reproduced with some cyan ink C. In the example of FIG. 25(b), cyan ink C quantity is 2, magenta ink M quantity is 0, and violet ink V quantity is 2. Here, ink quantity of each of the colors CMV can assume a value in the range 0-100. Ink quantity=0 means that an ink quantity is zero; ink quantity=100 means the ink quantity used to reproduce a solid area.

Violet ink V is characterized by higher saturation and density than cyan ink C or magenta ink M. Accordingly, in bright areas, if violet ink V are used preferentially as in FIG. 25(b), the ink dots would tend to stand out, with the possibility that graininess may not be adequately improved.

FIG. 25(c) illustrates another example of ink quantities of the three inks C, M, V for reproducing color ColA. The difference from FIG. 25(b) is that the violet ink V quantity is smaller, and the cyan ink C and magenta ink M quantities are larger. Specifically, cyan ink C is 11, magenta ink M is 9, and violet ink V is 11.

Here it is assumed that a mixture of equal quantities of cyan ink C and magenta ink M can reproduce hue and saturation substantially identical to those of an equivalent quantity of violet ink V. That is, substitution quantities for violet ink V are cyan ink C=1 and magenta ink M=1. The example of FIG. 25(c) is a combination of ink quantities derived on the basis of ink quantities in FIG. 25(b), by substituting an violet ink V in ink quantity=9 with cyan ink C in ink quantity=9 and magenta ink M in ink quantity=9. Accordingly, the example of FIG. 25(c) can reproduce a color ColA substantially identical to that of the example of FIG. 25(b). There are innumerable combinations of ink quantities that can be derived by substituting ink quantities according to substitution ink quantities. Of this plurality of combinations, the example of FIG. 25(b) depicts the combination having the largest ink quantity of violet ink V.

Where the ink quantity of violet ink V is reduced as in FIG. 25(c), ink quantities of the plurality of other inks C, M increase, making it unlikely that violet ink V dots will stand out. Here, it is assumed that where the total ink quantity of the other inks C, M is double or more the ink quantity of violet ink V, it is unlikely that violet ink V dots will stand out. Accordingly, by setting the violet ink V quantity usage rate (in this example, the proportion of ink quantity to maximum value) to 55% (=11/20) as in FIG. 25(c), it is possible to improve graininess.

FIG. 25(d) illustrates an example of ink quantities of the three inks C, M, V for reproducing color ColB. Since color ColB is closer in hue to cyan ink C than is color ColA, cyan ink C is used in relatively large proportion even in cases where violet ink V is used preferentially. In the example of FIG. 25(d), cyan ink C quantity is 10, magenta ink M quantity is 0, and violet ink V quantity is 15. In this example, as in FIG. 25(b), the combination having the largest violet ink V quantity is shown.

In the example of FIG. 25(d), the sum of quantities of inks other than violet ink V, which makes ten, is smaller than a value that is double the ink quantity of violet ink V, which makes 30. Accordingly, in bright areas, violet ink V ink dots will tend to stand out, possibly precluding adequate improvement of graininess.

FIG. 25(e) illustrates another example of ink quantities of the three inks C, M, V for reproducing color ColB. The difference from FIG. 25(d) is that the violet ink V quantity is smaller, and the cyan ink C and magenta ink M quantities are larger. Specifically, cyan ink C quantity is 15, magenta ink M quantity is 5, and violet ink V quantity is 10. These ink quantities are a combination of ink quantities derived on the basis of ink quantities in FIG. 25(d), by substituting an violet ink V in quantity=5 with cyan ink C in quantity=5 and magenta ink M in quantity=5.

In the example of FIG. 25(e), the sum of quantities of inks other than violet ink V, which makes 20, is about double the ink quantity of violet ink V, which makes 10. Accordingly, as relates to color ColB, graininess can be improved where the violet ink V ink quantity usage rate is 67% (=10/15).

In this way, as relates to a color ColA of hue relatively close to that of a spot color ink, reproduction using the spot color ink preferentially results in smaller quantities of other inks. Accordingly, to improve graininess, it is desirable to have a small usage rate of spot color ink. As relates to a color ColB of hue relatively close to that of a chromatic primary color ink, on the other hand, even where reproduction uses the spot color ink preferentially, ink quantities of other inks maintain relatively large values. Accordingly, graininess can be improved even with the spot color ink usage rate set to a relatively high value. Also, where spot color ink usage rate is set to a relatively high value, total ink quantity of all inks is smaller than when set to a low usage rate, thereby providing savings in ink usage.

Incidentally, this can be considered in terms of the relationship between spot color ink usage rate and quantities of inks other than spot color ink, instead of the relationship between spot color ink usage rate and hue. As shown in FIGS. 25(a)-25(e), when hue is relatively close to a chromatic primary color ink, quantities of other inks maintain relatively large values even with a large ink quantity of spot color ink. On the other hand, when hue is relatively close to a spot color ink, a larger quantity of spot color ink results in smaller quantities of other inks. Accordingly, by increasing the spot color ink usage rate when quantities of other inks are large and reducing the spot color ink usage rate when quantities of other inks are small, graininess can be improved appropriately depending on hue.

The relationship between spot color ink usage rate and quantities of inks other than spot color ink discussed above can be considered analogously even when the number of inks is increased. In such instances as well, in preferred practice the spot color ink usage rate when quantities of other inks are small will preferably be set smaller than the usage rate when quantities of other inks are large. By so doing, graininess in bright areas can be improved, and savings in ink usage obtained.

In Step S1600 in FIG. 24, residual ink quantities RES_R, RES_V corresponding to the spot color inks R, V are calculated. In this Example, residual ink quantities RES_R, RES_V are represented by the following equations, using ink quantities included in the provisional color separation ink quantity set P calculated in Step S1510 of FIG. 23.

$$RES\_R = Cp + Mp + Yp + Vp$$

$$RES\_V = Cp + Mp + Yp + Rp \qquad \text{[Eq. 2-1]}$$

In the equations, Cp, Mp, Yp, Rp and Vp are ink quantities included in the provisional color separation ink quantity set P. The residual ink quantity RES_R corresponding to red ink R is the sum of quantities of inks other than red ink R. The residual ink quantity RES_V corresponding to violet ink V is the sum of quantities of inks other than violet ink V.

Figure 26A:
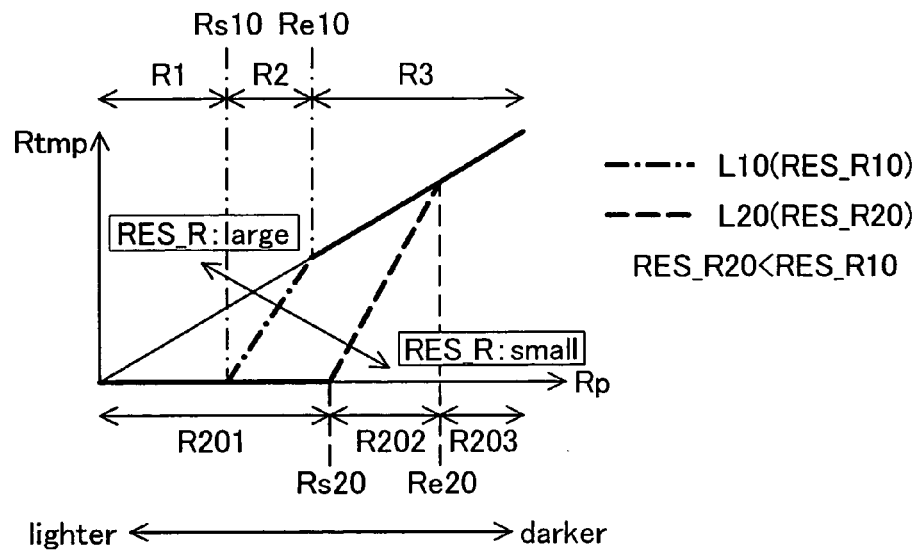
FIGS. 26(a), 26(b) show temporary ink quantities.

Next, in Step S1610, temporary ink quantities Rtmp, Vtmp for the spot color inks R, V are determined from the residual ink quantities RES_R, RES_V and the provisional color separation ink quantity set P. FIG. 26(a) shows a graph for calculating temporary ink quantity Rtmp from the provisional color separation ink quantity Rp of red ink R. Graph L10 is a graph corresponding to a relatively large residual ink quantity RES_R10, while graph L20 is a graph corresponding to a relatively small residual ink quantity RES_R20. For example, graph L10 corresponds to the case of FIGS. 25(d) and 25(e), and graph L20 corresponds to the case of FIGS. 25(b) and 25(c).

Following is a description of the relationship between temporary ink quantity Rtmp and provisional color separation ink quantity Rp, taking the example of graph L10. Over a first range R1 in which provisional color separation ink quantity Rp goes from zero to a first value Rs10, temporary ink quantity Rtmp is set to zero. Over a second range R2 in which provisional color separation ink quantity Rp goes from first value Rs10 to a second value Re10, temporary ink quantity Rtmp rises in linear fashion from zero. However, in second range R2 the temporary ink quantity Rtmp is maintained at a value smaller than the provisional color separation ink quantity Rp. Over a third range R3 in which provisional color separation ink quantity Rp is equal to or greater than second value Re10, temporary ink quantity Rtmp is set a value equal to the provisional color separation ink quantity Rp.

As in graph L10, in graph L20 corresponding to a relatively small residual ink quantity RES_R20, temporary ink quantity Rtmp is set according to a first value Rs20 and a second value Re20. However, the first value Rs20 is set to a value greater than the first value Rs10 of graph L10, and the second value Re20 is set to a value greater than the second value Re10 of graph L10. Accordingly, for a given value of provisional color separation ink quantity Rp, a relatively large temporary ink quantity Rtmp can be derived when residual ink quantity RES_R is relatively large.

FIG. 26(*b*) is a graph showing the proportion k of temporary ink quantity Rtmp with respect of provisional color separation ink quantity Rp. Taking the example of the proportion k10 corresponding to residual ink quantity RES_R10, as will be understood from the graph, proportion k10 is zero in first range R1, and in second range R2 increases at a constant rate from zero to 1. In third range R3, proportion k10 is constant at 1.

As regards the proportion k20 corresponding to residual ink quantity RES_R20 as well, the manner of change of proportion k20 in each of the first to third ranges R201-R203 is similar to the manner of change of proportion k10. For a given value of provisional color separation ink quantity Rp, a relatively large proportion k can be derived when residual ink quantity RES_R is relatively large.

The reason that the manner of change of temporary ink quantity Rtmp relative to change of provisional color separation ink quantity Rp is set as shown in FIGS. 26(*a*) and 26(*b*) is described hereinbelow, taking the example of graph L10. When provisional color separation ink quantity Rp is small, an image reproduced with reproduction color thereof will frequently be a so-called highlight area (high lightness area). The spot color inks R, V are characterized by higher saturation and density than the chromatic primary color inks. Since dots of spot color inks have high saturation and density, they tend to stand out in highlight areas, with the possibility of exacerbating graininess of the image. Accordingly, in highlight areas, it is preferable for quantities of spot color inks to be small. Since decreasing quantities of spot color inks also increases quantities of chromatic primary color inks, total ink quantity increases as well. In this aspect as well, graininess of an image can be improved by decreasing quantities of spot color inks in highlight areas. Accordingly, in first range R1 in FIG. 26(*a*), formation of dots of spot color ink in highlight areas is avoided by setting the spot color ink quantity Rtmp to zero. By so doing, graininess of an image in highlight areas can be markedly improved.

On the other hand, in third range R3 wherein provisional color separation ink quantity Rp is a large value, it is preferable to increase the quantity of spot color ink, so as to increase the saturation of the image. Accordingly, in the range R3, the provisional color separation ink quantity Rp is used as-is as the temporary ink quantity Rtmp. In the second range R2, temporary ink quantity Rtmp increases in linear fashion so that temporary ink quantity Rtmp does not change in stepwise fashion over the three ranges R1-R3, but rather changes smoothly. Alternatively, temporary ink quantity Rtmp may change along a curve, instead of changing in linear fashion. Typically, it is preferable for temporary ink quantity Rtmp to change continuously at a constant rate of increase.

Since a red component of provisional color separation ink quantity Rp relating to a given reproduction color represents the density of the red ink component of that reproduction color, this ink quantity Ro can be thought of as an index indicating lightness for the red ink component. When the red component of provisional color separation ink quantity Rp relating to a given reproduction color is large, lightness of the reproduction color tends to be low. Accordingly, the provisional color separation ink quantity Rp can be thought of as a lightness parameter value correlated to lightness of the reproduction color.

The reason that the manner of change of temporary ink quantity Rtmp relative to change of residual ink quantity RES_R is set as shown in FIGS. 26(*a*) and 26(*b*) is as follows. In many instances, when residual ink quantity RES_R is small, the hue of the reproduction color thereof is often close to that of a spot color ink. Where such reproduction color is reproduced using spot color ink preferentially, quantities of the plurality of chromatic primary color inks are reduced, so that the total number of ink dots is smaller. As a result, ink dots of spot color ink tend to stand out in bright areas, with the possibility of exacerbating graininess of the image. On the other hand, when residual ink quantity RES_R is large, the hue of the reproduction color thereof is often far from that of a spot color ink. Even where such reproduction color is reproduced using spot color ink preferentially, ink quantities of the plurality of chromatic primary color inks are maintained at relatively large values, as compared to the case when residual ink quantity RES_R is small. As a result, the total number of ink dots does not assume a small value, so that ink usage can be reduced without exacerbating graininess of the image. Accordingly, in FIGS. 26(*a*) and 26(*b*), for a given lightness parameter value Rp, it is possible to derive a larger proportion k when residual ink quantity RES_R is large. By so doing, graininess can be improved, and savings in ink usage attained.

In this Example, residual ink quantity RES_R is calculated on the basis of provisional color separation ink quantity Rp. Accordingly, where temporary ink quantity Rtmp determined on the basis of residual ink quantity RES_R is greater than the provisional color separation ink quantity Rp, chromatic primary color ink quantities will be smaller than intended, with the possibility of exacerbating graininess of the image in bright areas. Accordingly, in the example of FIGS. 26(*a*) and 26(*b*), temporary ink quantity Rtmp is set to a value that does not exceed the provisional color separation ink quantity Rp. By so doing, graininess can be improved, and savings in ink usage attained. Proportion k shown in FIG. 26(*b*) can be thought of as corresponding to spot color ink usage rate in the present invention.

In certain instances, over a portion of the entire range of possible values of residual ink quantity RES_R, the spot color ink usage rate k remains a constant value despite change of residual ink quantity RES_R. For example, in the example of FIG. 26(*b*), when the lightness parameter value Rp=Re10, the spot color ink usage rate k remains a constant value of 1 even when residual ink quantity RES_R is greater than RES_R20. Accordingly, in bright areas, the hue of reproduction color is within a range close to a chromatic primary color ink determined according to residual ink quantity RES_R. When the lightness parameter value Rp=Rs20, the spot color ink usage rate k remains a constant value of 0 even when residual ink quantity RES_R is less than residual ink quantity RES_R20. Accordingly, in bright areas, the hue of reproduction color is within a range close to a spot color ink determined according to residual ink quantity RES_R. In this way, as a result of determining spot color ink usage rate k by means of attempting to improve graininess and save ink, spot color ink usage rate k may in some instances—depending on the value of the lightness parameter value Rp—assume a constant value over a portion of the hue range. Where spot color ink usage rate k is a variable value based on hue, i.e., residual ink quantity RES_R, over at least a part of the entire range of hue in this way, graininess can be improved, and savings in ink usage attained.

In this Example, the spot color ink usage rate k is set to zero when the lightness parameter value Rp is equal to or less than a first value determined according to residual ink quantity RES_R (in range R1 or R201 in FIGS. 26(*a*), 26(*b*)). Here, when residual ink quantity RES_R has its maximum possible value, the first value is preferably set larger than zero (hereinafter referred to as first high lightness base value). By so doing, in the highest lightness area where the lightness parameter value Rp is in a partial range of lower than the first high lightness base value, the spot color ink usage rate k is set to zero regardless of the residual ink quantity RES_R, i.e., reproduction color hue. As a result, standing out of spot color ink in bright areas can be reduced, and graininess of an image improved. In preferred practice, where the range of possible values for the lightness parameter value is 0% (bright) to 100% (dark), such a first high lightness base value will be a bright range of 5% or less, preferably a bright range of 10% or less, and most preferably a bright range of 15% or less.

Also, in this Example, when the lightness parameter value Rp is in a bright range smaller than a second high lightness base value the spot color ink usage rate k is variable on the basis of hue, i.e. residual ink quantity RES_R. Here, the second high lightness base value is a second value when residual ink quantity RES_R is zero (not shown). As described above, in a range wherein the lightness parameter value Rp is smaller than the first high lightness base value, spot color ink usage rate k is set to zero irrespective of residual ink quantity RES_R. In this way, where in at least part of the entire range of the lightness parameter value Rp (in this Example, the range smaller than the second high lightness base value), spot color ink usage rate k is variable on the basis of residual ink quantity RES_R, graininess can be improved, and savings in ink usage attained.

As regards violet ink V, temporary ink quantity Vtmp can be determined from provisional color separation ink quantity Vp according to the same method as for red ink R.

The processes of Steps S1620, S1630 of FIG. 24 are identical to the processes of Steps S610, S620 of FIG. 9. That is, in Step S1620 of FIG. 24, final color separation ink quantities Ro, Vo are determined from temporary ink quantities Rtmp, Vtmp. In Step S1630, there are determined ink quantities Co, Mo, Yo for the other inks which, in conjunction with the final color separation ink quantity pair Ro, Vo determined in this manner, are needed to reproduce a desired reproduction color. As a result, a color separation ink quantity set (Co, Mo, Yo, Ro, Vo) for reproducing a desired reproduction color is determined.

In this way, in Example 1 of the color separation process in Embodiment 2, final color separation ink quantity Ro, Vo of each spot color ink R, V is designed to decrease with a smaller lightness parameter value (provisional color separation ink quantity) Rp, Vp thereof, thereby decreasing the number of ink dots of spot color ink and increasing the number of ink dots of chromatic primary color ink in highlight areas. A resultant advantage is that image graininess in highlight areas is improved. In particular, since temporary ink quantities Rtmp, Vtmp are set to zero in a first range wherein provisional color separation ink quantities Rp, Vp are relatively small (in the example of FIG. 26(a), range R1 or range R201), final color separation ink quantities Ro, Vo in highlight areas are also set to zero, and graininess of the image is markedly improved. It is also possible to set temporary ink quantities Rtmp, Vtmp to some relatively small non-zero value in this first range R1 or R201.

Figure 26B:
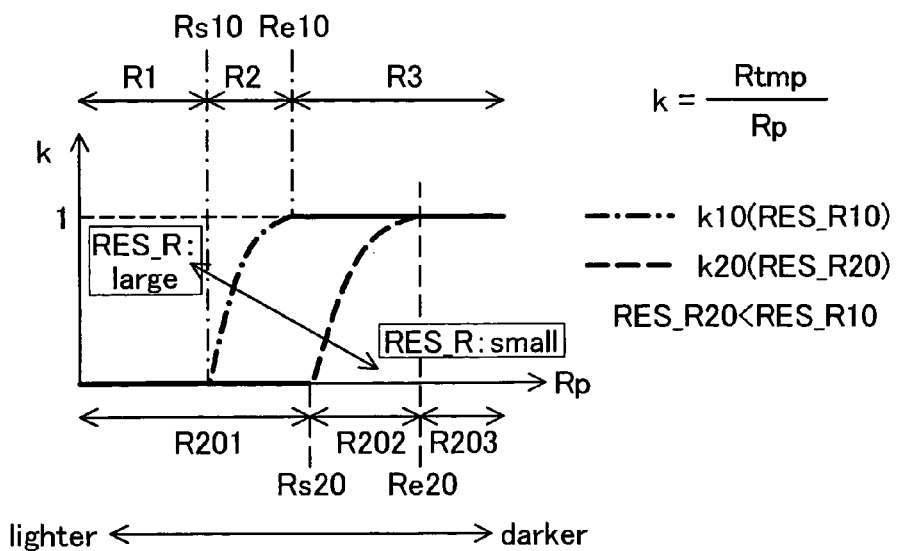

Further, the spot color ink usage rate k of the final color separation ink quantity Ro, Vo (FIG. 26(b)) of each spot color ink R, V is designed to increase with a larger residual ink quantity RES_R, RES_V, thereby improving graininess in highlight areas, as well as providing ink savings.

In some instances, the tendency of ink dots to stand out (i.e. effect on graininess) differs depending on the type of ink. Accordingly, adjustment of spot color ink usage rate depending on residual ink quantity RES_R, RES_V as in FIG. 26(a) is preferably carried out independently for each range of hues reproducible with combinations of a single given chromatic primary color ink and a single given spot color ink. For example, hues between cyan ink C and violet ink V are reproducible with combinations of cyan ink C and violet ink V. Color within this hue range is reproduced using principally cyan ink C and violet ink V when bright. Hues between magenta ink M and red ink R are reproducible with combinations of magenta ink M and red ink R. By setting usage rates of spot color inks independently depending on the combination of ink types principally used, improved graininess according to the characteristics of individual inks, as well as ink savings, are attained.

D2. Examples 1-3 of Final Color Separation Ink Quantity Calculation Process in Embodiment 2:

D2-1. Example 1 of Final Color Separation Ink Quantity Calculation Process in Embodiment 2:

In the final color separation ink quantity set calculation process, a final color separation ink quantity set O is calculated using the provisional color separation ink quantity set P for input color I. The final color separation ink quantity set O is calculated so that it reproduces a color, in a range meeting ink duty limits (Condition 1-1 described in Embodiment 1), which is substantially identical to a color reproduced by the provisional color separation ink quantity set P. In order to reproduce color substantially identical to that of the provisional color separation ink quantity set P, a combination of ink quantities derived by substituting some ink quantities of the provisional color separation ink quantity set P according to the substitution ink quantities is used as the final color separation ink quantity set O. Here, the degree of freedom in ink substitution is greater the larger the number of ink types used. Accordingly, in some instances there are a plurality of ink quantity combinations possible to use as the final color separation ink quantity set O. In such instances, calculation of the final color separation ink quantity set O is carried out with consideration to improving graininess of the image, and to saving ink.

Figure 27:
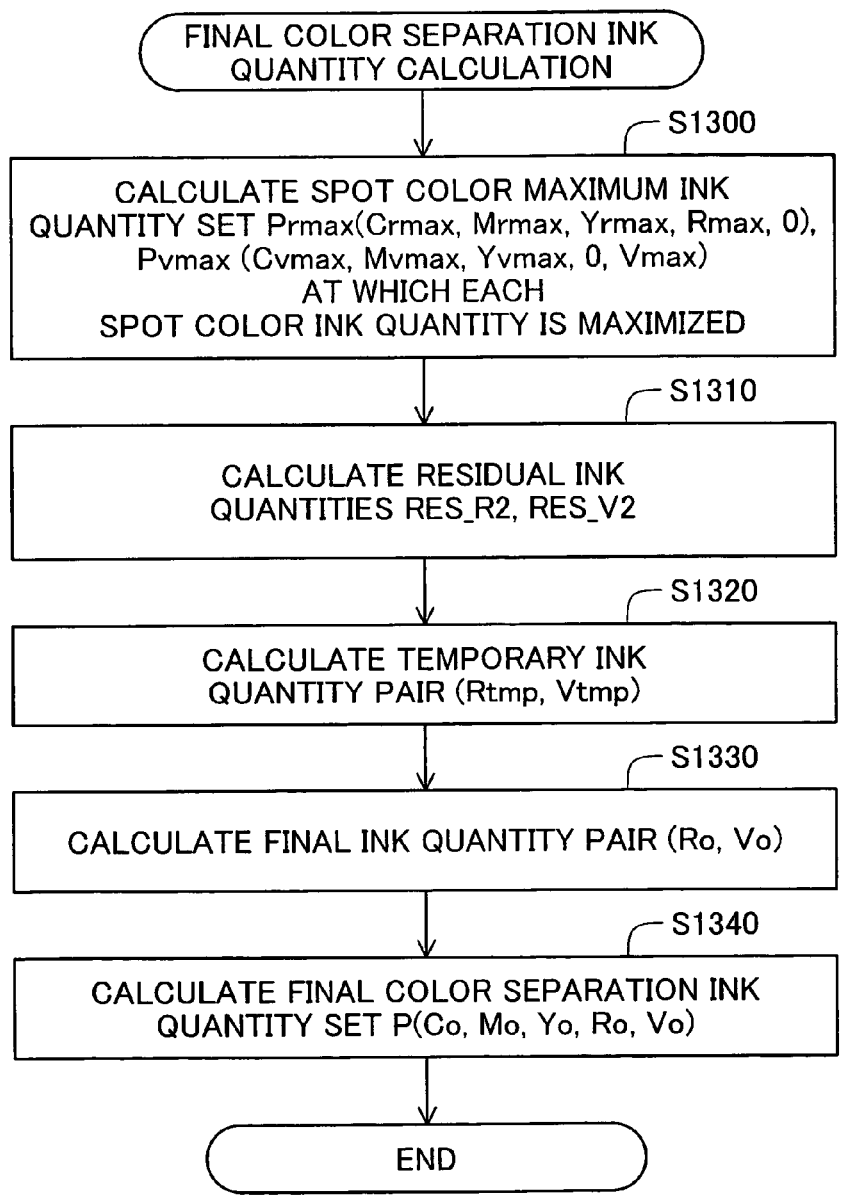
FIG. 27 is a flowchart depicting the processing routine for calculating a final color separation ink quantity set.

FIG. 27 is a flowchart depicting the processing routine for calculating a final color separation ink quantity set in this Example. A difference from the process shown in FIG. 24 is that residual ink quantities RES_R2, RES_V2 and temporary ink quantities Rtmp, Vtmp are determined on the basis of maximum ink quantities Rmax, Vmax which are quantities of the spot color inks R, V when they are used as much as possible.

In the initial Step S1300, a spot color maximum color separation ink quantity set Prmax(Crmax, Mrmax, Yrmax, Rmax, 0), Pvmax (Cvmax, Mvmax, Yvmax, 0, Vmax) for each spot color ink R, V is calculated. These spot color maximum color separation ink quantity sets Prmax, Pvmax are color separation ink quantity sets derived by substitution of some ink quantities of provisional color separation ink quantity sets P according to the substitution ink quantities.

The red ink R quantity in the spot color maximum color separation ink quantity set Prmax for red ink represents the maximum value assumable by red ink R quantity when ink quantities of the provisional color separation ink quantity set P has been substituted according to the substitution ink quantity. In this Example, maximum ink quantity Rmax is a maximum value that does not take ink duty limits into consideration. Accordingly, the maximum value assumable by red ink R of the final color separation ink quantity in actual practice may in some instances be smaller than the maximum ink quantity Rmax. A maximum value that takes ink duty limits into consideration can be used instead.

Even with red ink R quantity at its maximum value Rmax in this way, in some instances there will be a plurality of available combinations of ink quantities of violet ink and the chromatic primary color inks C, M, Y. In this Example, in such instances, a combination in which ink quantity of the other spot color ink (in this Example, violet ink V) is zero is selected from among the plurality of combinations, for use as spot color maximum color separation ink quantity set Prmax.

As regards the spot color maximum color separation ink quantity set Pvmax, calculation thereof is analogous to that for the spot color maximum color separation ink quantity set Prmax.

In the next Step S1310, residual ink quantities RES_R2, RES_V2 for the spot color inks R, V are determined from the spot color maximum color separation ink quantity sets Prmax, Pvmax. In this Example, residual ink quantities RES_R2, RES_V2 are calculated by the following equations, using ink quantities included in the spot color maximum color separation ink quantity sets Prmax, Pvmax derived in Step S1300.

$$RES\_R2 = krc \times Crmax + krm \times Mrmax + kry \times Yrmax$$

$$RES\_V2 = kvc \times Cvmax + kvm \times Mvmax + kvy \times Yvmax \quad \text{[Equation 2-2]}$$

In the equations, Crmax, Mrmax and Yrmax are ink quantities of the colors CMY included in spot color maximum color separation ink quantity set Prmax; Cvmax, Mvmax and Yvmax are ink quantities of the colors CMY included in spot color maximum color separation ink quantity set Pvmax. Coefficients krc, krm, kry and kvc, kvm, kvy are predetermined coefficients for the colors CMYRV. In this way, residual ink quantity RES_R2 is the weighted sum of ink quantities other than red ink R, and residual ink quantity RES_V2 is the weighted sum of ink quantities other than violet ink V. In Equation 2-1 given earlier, all ink coefficients are 1. However, residual ink quantity can be represented by some other coefficient for quantities of inks other than the spot color ink of interest. In general, residual ink quantity can be any parameter value relating to magnitude of quantities of inks other than the spot color ink of interest.

These coefficients krc-kry and kvc-kvy are determined according to effect on the tendency of dots of the spot color ink to stand out. For inks whose ink dots have high reflection density, the tendency of dots of the spot color ink to stand out can be avoided through smaller ink quantity. Accordingly, it is preferable for the coefficient to be greater, the higher the reflection density of an ink. The smaller the difference in color appearance from a spot color ink, the less likely dots of a spot color ink can be made to stand out with a small ink quantity, so it is preferable to set the coefficient to a larger value.

Here, comparison of reflection density of ink dots produced by a plurality of types of inks may be carried out by ejecting equal quantities of inks onto a given print medium, and measuring density with a densitometer. Comparison of color appearance may be carried out by ejecting equal quantities of inks onto a given print medium, performing colorimetric measurement of each with a calorimeter, and calculating color difference (for example, color difference ΔE in the L*a*b* color system) from the colorimetric results. As will be described later, these coefficients krc-kry and kvc-kvy can be determined on the basis of a sensory test.

Figure 28A:
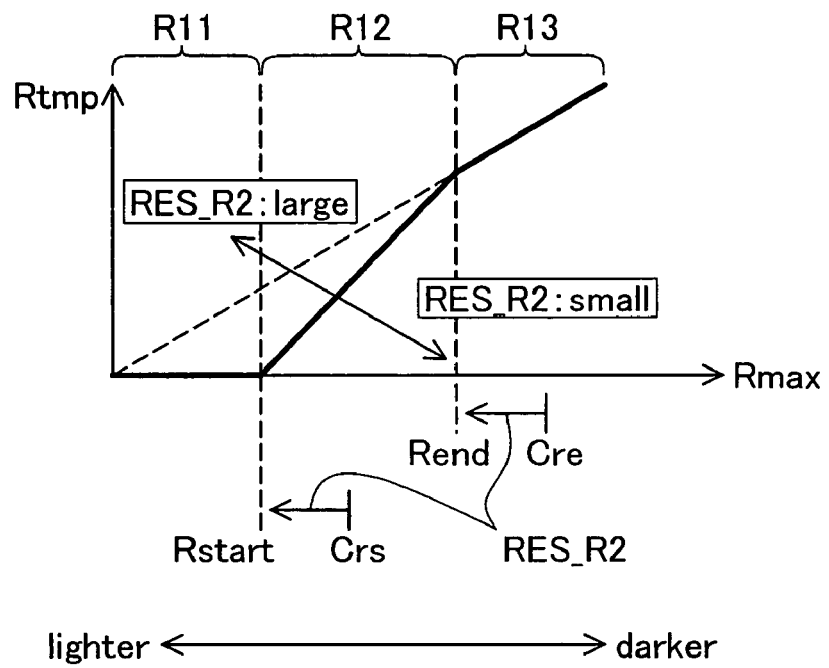
FIGS. 28(a), 28(b) show temporary ink quantities.
Figure 28B:
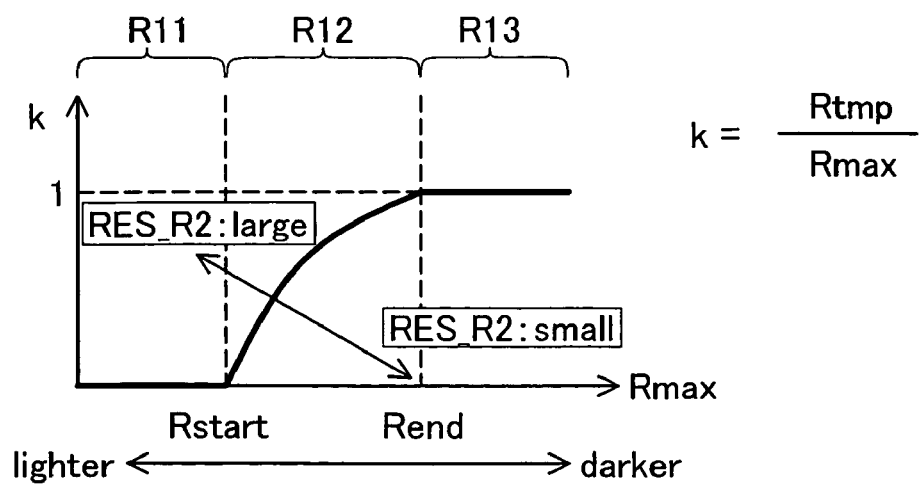

In the next Step S1320, temporary ink quantities Rtmp, Vtmp of the spot color inks R, V are determined. FIG. 28(a) is a graph of the relationship between temporary ink quantity Rtmp and maximum ink quantity Rmax. FIG. 28(b) is a graph of the relationship between the proportion k of temporary ink quantity Rtmp to maximum ink quantity Rmax (corresponds to spot color ink usage rate in the invention), and maximum ink quantity Rmax.

In this Example, as shown in FIG. 28(a), temporary ink quantity Rtmp is smaller in association with smaller values of maximum ink quantity Rmax. Also, as shown in FIG. 28(b), the proportion k of temporary ink quantity Rtmp to maximum ink quantity Rmax is smaller in association with smaller values of maximum ink quantity Rmax. In this example, two values Rstart, Rend are set for the maximum ink quantity Rmax. In a first range R11 wherein Rmax≦Rstart, the setting Rtmp=0 (k=0) is used. Over a third range R13 in which Rend≦Rmax, the setting is Rtmp=Rmax (k=1). Over a second range R12 in which Rstart<Rmax<Rend, temporary ink quantity Rtmp is set so as to change in linear fashion.

These settings in relation to temporary ink quantity Rtmp may be understood as follows. Spot color ink is substitutable for a plurality of chromatic primary color inks. Thus, where spot color ink is used preferentially, ink quantities of the plurality of chromatic primary color inks according to substitution ink quantities are reduced, so that a smaller total number of ink dots is recorded onto the print medium. On the other hand, where chromatic primary color inks are used preferentially, the total number of ink dots is greater. Such difference in the number of ink dots depending on ink quantity combination is particularly marked in instances where chromatic primary color inks may be substituted by spot color ink, in a smaller quantity than the total value of the ink quantities. Also, graininess in a reproduced area (roughness of an image) tends to stand out more the smaller the number of ink dots. Thus, it is preferable in terms of improving image graininess to increase the number of ink dots in areas having smaller ink quantity, i.e., fewer ink dots, by means of using chromatic primary color inks in place of spot color ink. In the example of FIG. 28(b), proportion k is designed to be smaller in association with smaller levels of maximum ink quantity Rmax. Thus, by making quantity of red ink R comparable to the temporary ink quantity Rtmp, it is possible to improve graininess in a reproduced area.

In the example of FIG. 28(a), Rtmp is zero over the first range R11. That is, in particularly bright areas, temporary ink quantity Rtmp is set to a value (namely zero) that increases the number of ink dots as much as possible, without the use of spot color ink. By setting the quantity of red ink R to zero in this way, standing out of dots of red ink R can be avoided.

Here, the first value Rstart refers to an ink quantity such that, as long as ink quantity is equal to or greater than this value, ink dots will not readily stand out despite the use of red ink R. Resistance to standing out of dots of red in R varies depending on residual ink quantity RES_R2. With larger residual ink quantity RES_R2, red ink R dots stand out less, making it possible to increase the quantity of red ink R. Accordingly, in this Example, Rstart is made smaller in association with larger values of RES_R2, by means of establishing Rstart on the basis of the following equation.

$$Rstart = Crs - RES\_R2 \quad \text{[Equation 2-3]}$$

In the equation, Crs is a predetermined constant. This constant Crs and the coefficients krc-kry (Equation 2-2) for residual ink quantity RES_R2 can be established on the basis of a sensory test such as the following, for example. First, a gradation pattern in which red ink R quantity per unit of area (hereinafter termed "index red ink quantity") varies from 0 to 100% is reproduced with a mixture of magenta ink M and yellow ink Y. Ink dots of red ink R are then printed at appropriate intervals in the pattern. In the range of small index red ink quantity, red ink R dots tend to stand out, but in the range of large index red ink quantity, red ink R dots tend not to stand out. The index red ink quantity at which dots begin to not stand out (hereinafter termed "first threshold red ink quantity") can be used as constant Crs.

As regards the coefficients krc-kry, these may be established as follows. A gradation pattern derived by adding a given quantity of cyan ink C to a mixture of magenta ink M and yellow ink Y based on index red ink quantity is reproduced. At this time, the first threshold red ink quantity is smaller in association with a larger quantity of cyan ink C. The change in first threshold red ink quantity relative to change in quantity of cyan ink C can be used as coefficient krc. As regards the other coefficients krm, kry, these may be arrived at in similar fashion, using gradation patterns derived by adding a given quantity of each ink.

In the example of FIGS. 28(a) and 28(b), the setting Rtmp=Rmax is used in the third range R13. That is, over a range in which ink quantity is particularly large, temporary ink quantity Rtmp is set to a value that preferentially uses red ink R (i.e., the maximum ink quantity Rmax). By setting the quantity for red ink R to a large value in this way, total ink quantity used can be minimized. As a result, savings in quantity of ink used are provided, and wrinkling of print media can be avoided.

Here, the second value Rend means an ink quantity such that, as long as ink quantity is equal to or greater than this value, there begins to be no observable difference between graininess produced by red ink R and graininess produced by mixtures of other inks. In bright areas or high saturation areas, even if red ink R quantity is set to a large value, the red ink dots do not readily stand out owing to the large number of dots. Where residual ink quantity RES_R is large, dots of red ink R are even less likely to stand out, making it possible to further increase the ink quantity of red ink R. Accordingly, in this Example, Rend is made smaller in association with larger values of RES_R2, by means of establishing Rend on the basis of the following equation.

$$Rend = Cre - RES\_R2 \qquad \text{[Equation 2-4]}$$

In the equation, Cre is a predetermined constant. This constant Cre can be established on the basis of a sensory test such as the following, for example. First, a gradation pattern in which red ink R quantity per unit of area (hereinafter termed "index red ink quantity") varies from 0 to 100% is reproduced with a mixture of magenta ink M and yellow ink Y. In similar fashion, a gradation pattern in which index red ink quantity varies from 0 to 100% is reproduced using red ink R. In the range of small index red ink quantity, the gradation pattern produced by the color mixture has more ink dots and accordingly better graininess. In the range of large index red ink quantity, each of the two gradation patterns has a large number of ink dots, so the difference in graininess starts to disappear. The index red ink quantity at which difference in graininess apparent from comparison of the two gradation patterns begins to disappear (hereinafter termed "second threshold red ink quantity") can be used as constant Cre.

As regards the coefficients krc-kry for residual ink quantity RES_R2, these may be established as follows. When determining coefficient krc, for example, a gradation pattern is printed with a given additional quantity of cyan ink C added to a mixture of magenta ink M and yellow ink Y corresponding to index red ink quantity variation, and another gradation pattern is also printed with the same additional quantity of cyan ink C to the red ink R quantities of the index red ink quantity variation. When the patterns are compared, the second threshold red ink quantity is smaller, the greater the quantity of added ink. The change in second threshold red ink quantity relative to change in quantity of added ink can be used as coefficient krc. As regards the other coefficients krm, kry, these may be arrived at in similar fashion.

In this Example, coefficients krc-kry, i.e. residual ink quantity RES_R2, are used in common for the first and second values Rstart, Rend. Where effects of inks C, M, Y on first and second values Rstart, Rend differ, it is preferable to set residual ink quantity RES_R2 independently for the first and second values Rstart, Rend.

Where a particular ink having minimal effect on the first and second values Rstart, Rend, that is, ink that, despite being increased in quantity, attains no reduction in the tendency of spot color ink dots to stand out, it is preferable to set the coefficient for that particular ink to zero. For example, where the reflection density of ink dots of yellow ink Y is low and, despite being increased in quantity, the tendency of red ink R dots to stand out is unchanged, it is preferable to set the coefficient kry for yellow ink Y to zero. By so doing, even if reproduction color hue is close to yellow ink Y, since the usage rate of red ink R (proportion k) is not large, standing out of dots of red ink R can be avoided. Where reproduction color hue is close to magenta ink M, since the usage rate of red ink R (proportion k) is set to a relatively large value, ink savings are attained. Similarly, where the tendency of violet ink V dots to stand out is unchanged despite increasing the ink quantity of yellow ink K, coefficient kry can be set to zero. When reproduction color hue is relatively close to cyan ink C or magenta ink M, since the usage rate of violet ink V is set to a relatively large value, ink savings are attained. It is also possible to set kry, kvy to relatively small, non-zero values.

By setting first and second values Rstart, Rend in the above manner, the usage rate k for a particular maximum ink quantity Rmax is relatively large when the residual ink quantity RES_R2 is relatively large. Further, residual ink quantity RES_R2 is determined in consideration of ink characteristics. Accordingly, graininess can be improved appropriately depending on ink characteristics. When residual ink quantity RES_R2 is relatively large, since usage rate k becomes relatively large, ink quantity of spot color ink can be increased, and quantities of the plurality of chromatic primary color inks can be reduced. Accordingly, ink savings can be achieved appropriately depending on ink characteristics. In this Example, usage rate k is calculated on the basis of maximum ink quantity when spot color ink is used as much as possible. Accordingly, the available range of spot color ink quantity can be utilized effectively.

Maximum ink quantity Rmax may also be thought of as an index value indicative of lightness of input color I, that is, a lightness parameter value correlated to lightness of reproduction color. In a bright area, quantity of each ink for reproducing the color is small. Accordingly, the maximum ink quantity Rmax of red ink R is small as well. In a dark area, on the other hand, quantity of each ink for reproducing the color is greater. Accordingly, in an area in which red ink R is used, the maximum ink quantity Rmax thereof will be greater. That is, a smaller value of maximum ink quantity Rmax indicates a brighter area, and a larger value indicates a darker area. Accordingly, temporary ink quantity Rtmp and proportion k in FIG. 27 may be thought of as being set so as to be smaller with greater lightness of input color I.

Temporary ink quantity Rtmp is designed to vary continuously over the entire range for maximum ink quantity Rmax. By so doing, in gradation areas over which ink quantity varies continuously, sharp changes in quantity of each color ink, and resulting standing out of boundaries, can be avoided. Temporary ink quantity Rtmp is not limited to an arrangement whereby it varies in linear fashion with respect to maximum ink quantity Rmax; it could instead be designed to vary smoothly using a curve, for example.

While FIGS. 28(*a*) and 28(*b*) show calculation of temporary ink quantity Rtmp of red ink R, temporary ink quantity of other types of spot color ink could be calculated in the same manner. In any case, the design is such that the proportion of temporary ink quantity to maximum ink quantity decreases with smaller maximum ink quantity. By so doing, the number of ink dots can be increased by preferentially using chromatic primary color ink in place of spot color ink, so that graininess can be improved.

Here, it is preferable to design the spot color ink usage rate so as to be smaller when residual ink quantity is relatively small. By so doing, graininess can be improved, and ink savings attained.

The processes of Steps S1330, S1340 in FIG. 27 are the same as the processes of Steps S310, S320 of FIG. 15. That is, in Step S1330 of FIG. 27, calculation of final color separation ink quantities Ro, Vo for spot color inks R, V is performed on the basis of temporary ink quantities Rtmp, Vtmp of spot color inks R,V established in the aforementioned Step S1320.

As described hereinabove, the final color separation ink quantity set calculation process of this Example is carried out with consideration to improving graininess. Where an image area to be reproduced is bright, quantity of each color of ink is small. Since less spot color ink is used and more chromatic primary color ink is used in such area, graininess can be improved.

In an area of particularly high lightness, each quantity of an ink set is much smaller relative to ink duty limits. Accordingly, ink duty limits can still be met with a combination of greater ink quantities. As a result, where temporary ink quantities Rtmp, Vtmp of the spot color inks are zero, final color separation ink quantities Ro, Vo can be brought to zero. That is, in an area of particularly high lightness, color is reproduced without the use of spot color inks, and thus in such particularly bright areas, standing out of ink dots of spot color ink can be avoided.

When residual ink quantities RES_R2, RES_V2 are relatively small, quantities of spot color inks R, V become relatively small; and when residual ink quantities RES_R2, RES_V2 are relatively large, quantities of spot color inks R, V become relatively large. Accordingly, it is possible to improve graininess while attaining ink savings, as well as preventing wrinkling of print media.

In this Example, the final color separation ink quantity set calculation process is performed according to the temporary ink quantity Rtmp, Vtmp established independently for each of the spot color inks, that is, to the effect of each ink on graininess. As a result, graininess may be improved appropriately in consideration of the effect of each spot color ink.

This sort of final color separation ink quantity set calculation process may be carried out in similar fashion even where more types of spot color ink are used. For example, where three spot color inks are used, first, a temporary ink quantity is calculated for each ink. Next, a combination of ink quantities represented by a point situated within a permissible range (represented by a solid in a color space in which the three ink quantities are represented by base vectors) and close to a point represented by a temporary ink quantity set is used as a final color separation ink quantity set of spot color ink. In this case as well, where a final color separation ink quantity set is calculated according to the positional relationship of the permissible range and a straight line passing through a point represented by a temporary ink quantity set, the final color separation ink quantity set can be calculated in consideration of the balance of effect of each spot color ink on graininess.

As described hereinabove, the final color separation ink quantity set calculation process of this Example is carried out in consideration of improving graininess, whereby roughness of images in bright areas thereof can be reduced.

Figure 29:
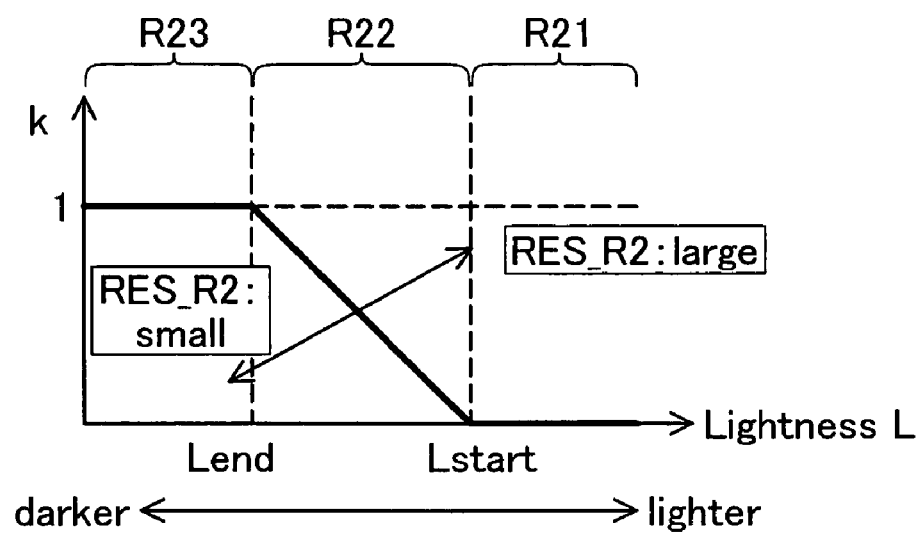
FIG. 29 is a graph of the relationship between lightness and the proportion of temporary ink quantity versus maximum ink quantity.

D2-2. Example 2 of Final Color Separation Ink Quantity Calculation Process in Embodiment 2:

Example 2 is different from the above Example 1 in that temporary ink quantity Rtmp is established depending on lightness L of reproduction color. FIG. 29 is a graph of the relationship between lightness L, and the proportion k of temporary ink quantity Rtmp versus maximum ink quantity Rmax.

When provisional color separation ink quantity set P is expressed in a primary color space (FIG. 13(*a*)), the distance between a point produced by projecting point P onto the achromatic color axis (the straight line connecting the origin W and a point K) and the origin W may be used as lightness L of the reproduction color. Here, greater distance from the origin W indicates lower lightness. As the maximum ink quantity Rmax, there may be used the maximum value assumable by the quantity of red ink R, among combinations of ink quantities able to reproduce a color substantially identical to the color to be reproduced by provisional color separation ink quantity set P.

In this Example, as shown in FIG. 29, the proportion k of temporary ink quantity Rtmp to maximum ink quantity Rmax is set so as to be smaller the higher the lightness L of the reproduction color is, i.e. the brighter it is. Temporary ink quantity for the other spot color ink is set similarly. Accordingly, in an image area of high lightness L and small ink quantities of each ink, less spot color ink is used, and chromatic primary color ink is used preferentially to increase the number of ink dots, so that graininess can be improved.

In the brightest range R21 wherein Lstart≦L, the setting Rtmp=0 is used. As a result, in areas of particularly high lightness, colors are reproduced without spot color ink, so that standing out of ink dots of spot color ink can be prevented. In the darkest range R23 wherein L≦Lend, the setting Rtmp=Rmax is used. As a result, in areas of particularly low lightness, colors are reproduced using spot color ink preferentially, thereby providing savings in quantity of ink used, and also preventing wrinkling of the print medium.

The values Lstart, Lend for lightness L can be set in the same manner as Rstart, Rend in FIG. 28(*a*) described previously. For example, they can be set on the basis of a sensory test by comparing a spot color ink gradation pattern reproduced while varying lightness L from minimum to maximum value, with a gradation pattern produced by a mixture of chromatic primary color inks.

It is preferable to establish the first and second values Lstart, Lend so that they are larger the larger the value of residual ink quantity RES_R2 is. By so doing, graininess can be improved and ink savings attained. Preferably, Lstart, Lend will be established independently for each hue range reproducible by a combination of a single chromatic primary color ink and a single spot color ink. By so doing, graininess can be improved and ink savings attained, in an appropriate manner depending on hue.

In this Example, as regards violet ink V, temporary ink quantity Vtmp depending on lightness L is established using the same method as for red ink R. Where even more spot color inks are used, temporary ink quantities can be established in similar fashion.

As the final color separation ink quantity set calculation process of the color separation process of this Example, the method employed in the final color separation ink quantity set calculation process S1520 of the color separation process shown in FIG. 23 could be used instead of the various methods depicted in FIGS. 27-28 and FIG. 29. Similarly, as the color separation ink quantity set calculation process S1520 of the color separation process shown in FIG. 23, any of the various methods (FIGS. 27-28, FIG. 29) employed in the final color separation ink quantity set calculation process of this Example could be used.

D3. Other Example of Color Separation Process in Embodiment 2:

Example 2 and Example 3 of the color separation process in Embodiment 1 described hereinabove may also be applied to Embodiment 2. However, when applying Example 3 of the color separation process in Embodiment 1 to Embodiment 2, it is preferable to add ink quantity of black ink K to residual ink quantity. For example, with regard to the residual ink quantities RES_R2, RES_V2 given in Equation 2-2 hereinabove, quantity of black ink K multiplied by a coefficient may be added in the same manner as the chromatic primary color inks C, M, Y. The coefficient for black ink K can be determined analogously to coefficients for other inks. In this way, by determining ink quantities of the spot color inks R, V taking into consideration as well the quantity of black ink K, image graininess can be improved, and ink savings attained.

When the color separation process of this Example is implemented in Step S20 of the color conversion lookup table creation process illustrated in FIG. 6, the second tone value set consists quantities of the chromatic primary color inks CMY, spot color inks RV, and black ink K. Thus, in Step S30, color patches reproduced using the colors CMYRVK are created.

E. Ink Set Variations

In the Examples described hereinabove, ink sets of various kinds other than the ink set depicted in FIGS. 5(a)-5(c) can be employed. FIGS. 30-37 illustrate ink components in additional Examples of such employable ink sets. Black ink K components and components of other color inks except their colorants are the same as in FIG. 5(a), and they are therefore not shown in the drawings. Differences from the ink set in FIG. 5(a) lie in partially different colorant type and density. As a result, these ink sets can improve reproduction of colors that are slightly different from one another. Accordingly, by selecting an ink set appropriate for the image it is desired to print, a printed result of higher picture quality can be obtained.

The ink sets of FIGS. 30-45 include substitution ink quantities for red ink R and violet ink V respectively, derived by colorimetric measurement of color patches. In this way, total substitution ink quantity in each of these ink sets is 1.7 or greater. As a result, it is possible to reproduce higher saturation by using spot color ink in comparable quantity to a mixture of chromatic primary color inks. As a result, by utilizing spot color ink and chromatic primary color ink, it is possible to reproduce a wider range of color than the area reproducible with chromatic primary color ink only.

Inks are not limited to the formulations shown in FIG. 5 and FIGS. 30-37 hereinabove; appropriate inks prepared according to other formulations may be used as well. As regards the color and number of inks as well, these are not limited to the combinations hereinabove; for example, an arrangement wherein red ink R alone can be utilized as the spot color ink, or an arrangement wherein green ink or blue ink is used as a spot color ink is acceptable as well. However, it is preferable to use inks which in combination with one another can reproduce achromatic color as chromatic primary color inks, and to use inks having hue different from any of the chromatic primary color inks as spot color inks. By using ink sets composed in this manner, it is possible to execute color separation with consideration to extending the color reproduction range.

As described hereinabove, in the preceding Examples, the final color separation ink quantity set calculation process is carried out with consideration to improving graininess, thereby reducing roughness of an image in bright areas thereof. Additionally, since quantity of spot color ink is determined on the basis of residual ink quantities, roughness of an image in bright areas thereof can be reduced, and ink savings attained. By using chromatic primary color ink and spot color ink, the color separation process can be performed on the basis of extended chromatic color of high tone value. Accordingly, it is a simple matter to perform a color separation process that takes into consideration an expanded color reproduction range.

The final color separation ink quantity set calculation process is not limited to the processes described hereinabove; generally, any process would be acceptable as far as it adjusts each ink quantity of the color separation ink quantity set for reproducing a reproduction color such that quantity of spot color ink decreases at a rate of change greater than a rate of change of a lightness parameter when the lightness parameter changes in a lighter direction.

F. Variations

The present invention is not limited to the Examples or embodiments set forth hereinabove, and may be reduced to practice in various other modes without departing from the scope and spirit thereof. The following variations are possible, for example.

F1 Variation 1:

In the preceding Examples, the hues of the inks of a useable ink set are different from one another; however, an arrangement wherein a plurality of types of ink having substantially identical hue but different densities are useable would be acceptable as well. In this case, by using inks of different densities depending on tone value of a hue, it is possible to improve graininess (image roughness) that tends to stand out more when there are small numbers ink dots, as well as to reduce banding (striped patterns) that tends to stand out more when there are large numbers of ink dots. In this case, quantity of each ink may be calculated using a so-called linear programming method, taking quantities for all inks into consideration when establishing conditions such as the aforementioned ink duty limits and substitution ink quantities. A method of calculating color separation ink quantity on a hue-by-hue basis and reassigning ink quantities so derived to a plurality of inks of substantially identical hue but different densities would also be acceptable. In this case as well, it is preferable to establish ink duty limits that take into consideration quantities of all inks, and to ensure that final ink quantities of the inks meet the ink duty limits.

In the preceding Examples, "ink quantity" refers to tone value of each ink representing a range of 0%-100% (where ink quantity for reproducing a solid area is 100%), which is output from a color conversion lookup table. Where a plurality of types of ink of substantially identical hue but different densities are useable, color separation can be accomplished by making the total value of colorant of lighter and darker inks having the same hue correspond to "ink quantity." By assigning "ink quantities" derived thusly to lighter and darker inks, appropriate color can be reproduced.

F2. Variation 2:

The present invention is applicable also to thermal transfer printers or drum scan printers. The invention may be implemented not only in so-called ink jet printers, but more generally in printing devices that reproduce color by means of mixing inks of several colors. Such printing devices include, for example, fax machines and copy machines.

G3. Variation 3:

Various values can be used as a lightness parameter value. In the Examples of color separation processes shown in FIGS. 10(a)-10(b) and FIGS. 26(a)-26(b), provisional color separation ink quantity of spot color ink is used as a lightness parameter value. In these Examples, there is determined a provisional color separation ink quantity set such that input color and reproduction color match, and reproduction color is reproduced under the condition of minimized total ink quantity. In the Examples of the final color separation ink quantity set calculation processes shown in FIGS. 16(a)-16(b) and FIGS. 28(a)-28(b), maximum ink quantity of spot color ink is used as a lightness parameter value. This maximum ink quantity represents the maximum value of ink quantity determined from the reproduction color associated with an input color, and is the maximum value of quantity of spot color ink among combinations of ink quantities that reproduce color substantially identical to that of the provisional color separation ink quantity set for reproducing reproduction color. Generally, any value that represents ink quantity of spot color ink determined from input color or reproduction color according to a predetermined condition can be used as a lightness parameter value. Lightness parameter values are not limited to those representing ink quantity of spot color ink, but could instead be values correlated with lightness of reproduction color. For example, lightness of reproduction color associated with input color, as in the Examples of the final color separation ink quantity set calculation processes shown in FIGS. 18, 20, and 29, can be used as a lightness parameter value.

Within the range of a lightness parameter value, the brightest range wherein spot color ink quantity is adjusted to zero will preferably constitute the brightest range of 5% or less, preferably the brightest range of 10% or less, and most preferably the brightest range of 15% or less, where the range of possible values for the lightness parameter value is 0% (bright) to 100% (dark).

F4. Variation 4:

In the preceding Examples, there were described cases in which spot color ink quantity is determined on the basis of residual ink quantity; however, it could instead by determined on the basis of a parameter having correlation with reproduction color hue. In this case, when hue is relatively close to a spot color ink, ink quantities are determined such that the usage rate of the spot color ink is relatively high, or when hue is relatively close to a chromatic primary color ink, ink quantities are determined such that the usage rate of the spot color ink is relatively low. By so doing, graininess can be improved appropriately depending on hue, and ink savings can be attained. Various values can be used as parameters having correlation with reproduction color hue. For example, in the primary color space depicted in FIGS. 13(a)-13(c), where the straight line connecting the origin W and point K is termed the achromatic color line and a vertical projection of a particular point in the primary color space onto the achromatic color line is termed the projected point, the direction from the projected point to the particular point in the primary color space can be used as a parameter value having correlation to hue.

F5. Variation 5:

In the preceding Examples, some arrangements realized through hardware could instead by realized by software, and conversely some arrangements realized through software could instead by realized by hardware. For example, it would be possible for some functions of printer driver 96 (FIG. 1) to be executed instead by the control circuit 40 (FIG. 3) inside the printer 20.

While the present invention has been shown and described in detail hereinabove, the descriptions are merely exemplary, and should not be construed as limiting the technical scope of the invention, which is limited only by the appended claims.

What is claimed is:

1. A color separation method for determining quantities of a plurality of color inks in order to reproduce an arbitrary color with the plurality of color inks on a printing medium, the method comprising the steps of:
   (a) defining an ink set that includes as useable inks a plurality of chromatic primary color inks that when used in combination can reproduce achromatic color, and at least one spot color ink of hue different from any of the plurality of chromatic primary color inks;
   (b) determining a plurality of reproduction colors to be reproduced on a print medium according to a plurality of input colors within a chromatic primary color space, a term "reproduction color" denoting a color to be reproduced on the print medium according to any one input color, a term "color separation ink quantity set" denoting a combination of ink quantities of the ink set for reproducing a reproduction color on the print medium, a term "chromatic primary color space" denoting a color space having base vectors representing ink quantities of the plurality of chromatic primary color inks; and
   (c) determining a plurality of color separation ink quantity sets for reproducing the plurality of reproduction colors, wherein the step (b) includes the steps of:
   (b1) determining an outermost shell color separation ink quantity set associated with outermost shell chromatic color, where the outermost shell chromatic color refers to chromatic color at an outermost shell location within the primary color space, the outermost shell color separation ink quantity set being used for reproducing extended chromatic color that is reproducible with the ink set and that has higher saturation than the outermost shell chromatic color; and
   (b2) determining the plurality of reproduction colors associated respectively with the plurality of input colors within the primary color space, based on relationship between the outermost shell chromatic color and the outermost shell color separation ink quantity set,
   wherein the step (b1) includes the steps of:
   establishing an upper limit of useable ink quantity per unit of area of the print medium as an ink duty limit; and
   determining the extended chromatic color as a color represented by an extended chromatic color vector of greater length having a same direction as an outermost shell chromatic color vector representing the outermost shell chromatic color in the primary color space, and determining the outermost shell color separation ink quantity set for reproducing the extended chromatic color;
   wherein determination of the extended chromatic color and the outermost shell color separation ink quantity set is performed so as to meet the following condition:
   (i) the outermost shell color separation ink quantity set is within the ink duty limit, wherein the step (c) includes, for each reproduction color, the steps of:

(c1) calculating a lightness parameter value correlated to lightness of the reproduction color; and (c2) adjusting an ink quantity of the spot color ink in the color separation ink quantity set in accordance with the lightness parameter value, so as to reduce the ink quantity at a rate of change greater than a rate of change of the lightness parameter value when the lightness parameter changes in a lighter direction, wherein the step (c2) includes adjusting the spot color ink quantity such that an actual ink quantity of the spot color ink is smaller than a hypothetical ink quantity of the spot color ink when the lightness parameter value is in a predetermined brightest range, the hypothetical ink quantity being defined to be ink quantity of a spot color ink included in the color separation ink quantity set for reproducing the reproduction color and being obtainable by adjusting ink quantity of each ink in the color separation ink quantity set so as to minimize a sum of ink quantities, and wherein the reproduction color is a color reproduced by a provisional color separation ink quantity set derived by multiplying the outermost shell color separation ink quantity set for the outermost shell chromatic color having a same vector as the input color in the primary color space, by a ratio of a length of the input color vector to a length of the outermost shell chromatic color vector.

2. A color separation method according to claim 1, wherein the step (c2) includes adjusting the ink quantity of the spot color ink such that decrease of the spot color ink quantity with respect to change of the lightness parameter value exceeds decrease of the chromatic primary color ink quantities with respect to the change of the lightness parameter value.

3. A color separation method according to claim 1, wherein the step (c2) includes adjusting the spot color ink quantity so as to decrease at a greater rate than a rate proportional to the lightness parameter value.

4. A color separation method according to claim 1, wherein the step (c2) includes adjusting the spot color ink quantity such that a proportion of actual ink quantity of the spot color ink to a hypothetical ink quantity of the spot color ink decreases monotonically with respect to change of the lightness parameter value in the lighter direction, the hypothetical ink quantity being defined to be ink quantity of a spot color ink included in the color separation ink quantity set for reproducing the reproduction color and being obtainable by adjusting ink quantity of each ink in the color separation ink quantity set so as to minimize a sum of ink quantities.

5. A color separation method according to claim 1, wherein the step (c2) includes adjusting the spot color ink quantity such that the ink quantity of the spot color ink is set zero in a first range which is a brightest part of an entire range of the lightness parameter value.

6. A color separation method according to claim 1, wherein the lightness parameter value is a maximum value assumable by ink quantity of the spot color ink when reproducing the reproduction color.

7. A color separation method according to claim 1, wherein the step (c2) comprises the steps of:

(c2-1) calculating a temporary ink quantity of the spot color ink from the lightness parameter value;

(c2-2) determining temporary ink quantities for the chromatic primary color inks which in conjunction with the temporary ink quantity of the spot color ink are needed to reproduce the reproduction color, thereby obtaining a temporary ink quantity set; and (c2-3) adopting the temporary ink quantity set per se as the color separation ink quantity set when the temporary ink quantity set is within ink duty limits which limit an upper value of ink quantity useable per unit of area of the print medium, and when the temporary ink quantity set exceeds the ink duty limits, correcting the temporary ink quantity set so as to meet the ink duty limits to determine the color separation ink quantity set.

8. A color separation method according to claim 7, wherein the ink set includes first and second spot color inks, the step (c1) includes calculating the lightness parameter value for each of the first and second spot color inks independently, the step (c2-1) includes determining temporary ink quantities of the first and second spot color inks based on the lightness parameter value for each of the first and second spot color inks, and the step (c2-3) includes, when the temporary ink quantity set exceeds the ink duty limits, determining the color separation ink quantity set such that, within a two-dimensional color space defined by ink quantities of the first and second spot color inks, a color coordinate point defined by color separation ink quantities of the first and second spot color inks is present inside a range that meets the ink duty limits and situated in proximity to another color coordinate point defined by the temporary ink quantities of the first and second spot color inks.

9. A color separation method according to claim 8, wherein the step (c2-3) includes, when the temporary ink quantity set exceeds the ink duty limits, determining the color separation ink quantity set such that, within the two-dimensional color space relating to ink quantities of the first and second spot color inks, a color coordinate point defined by color separation ink quantities of the first and second spot color inks is present inside a range that meets the ink duty limits, and such that a ratio of the color separation ink quantities of the first and second spot color inks is equal to a ratio of the temporary ink quantities of the first and second spot color inks.

10. A color separation method according to claim 1, wherein the ink set includes a plurality of the spot color inks, and the step (c2) includes performing adjustment of each ink quantity of the spot color inks by means of limiting a value assumable by a specific spot color ink parameter to a smaller range in association with higher lightness indicated by the lightness parameter value, the spot color ink parameter having characteristic of increasing in association with greater ink quantities of a spot color ink included in the color separation ink quantity set.

11. A color separation method according to claim 1, wherein the spot color ink contains colorant different from colorants of the plurality of chromatic primary color inks.

12. A color separation method according to claim 1, wherein the spot color ink is able to reproduce higher saturation than a mixture of the chromatic primary color inks when a hue reproducible by the spot color ink is reproduced by the mixture of the plurality of chromatic primary color inks.

13. A color separation method according to claim 1, wherein determination of the extended chromatic color and the outermost shell color separation ink quantity set is performed so as to additionally meet the following condition:

(ii) length of the extended chromatic color vector is the greatest length within a range reproducible by the ink set.

14. A color separation method according to claim 1, wherein determination of the extended chromatic color and the outermost shell color separation ink quantity set is performed so as to additionally meet the following condition:

(iii) total ink quantity of the outermost shell color separation ink quantity set for reproducing the extended chromatic color is the smallest possible.

15. A color separation method according to claim 1, wherein the ink set includes black ink, and the step (b) comprises the step of calculating a corrected input color composed of a plurality of chromatic primary color components which are decreased so as to produce a black component by means of an under color removal process for the black ink on the input color, and wherein the reproduction color is determined according to the corrected input color.

\* \* \* \* \*